United States Patent
Tahara et al.

(10) Patent No.: US 7,123,582 B2
(45) Date of Patent: Oct. 17, 2006

(54) DATA TRANSMISSION SYSTEM, AND NODE EQUIPMENT AND NETWORK MANAGEMENT EQUIPMENT USED IN THE SAME

(75) Inventors: Yasufumi Tahara, Kokubunji (JP); Hiromune Suetsugu, Ome (JP); Kenji Baba, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1068 days.

(21) Appl. No.: 09/992,017

(22) Filed: Nov. 26, 2001

(65) Prior Publication Data

US 2002/0064127 A1    May 30, 2002

(30) Foreign Application Priority Data

Nov. 27, 2000    (JP)    ............... 2000-360372

(51) Int. Cl.
*H04J 3/14*    (2006.01)
*H04L 1/00*    (2006.01)
*H04L 12/26*    (2006.01)

(52) U.S. Cl. .............. 370/228; 370/218; 370/220; 370/222

(58) Field of Classification Search .......... 370/216, 370/217, 218, 221, 222, 223, 224, 225, 242, 370/244, 439, 440
See application file for complete search history.

(56) References Cited

U.S. PATENT DOCUMENTS 5,187,706 A    2/1993    Frankel et al.
5,636,205 A *  6/1997    Suzuki et al. ............... 370/224
6,795,394 B1 * 9/2004    Swinkels et al. ........... 370/222

FOREIGN PATENT DOCUMENTS

| EP | 0 804 001 A2 | 10/1997 |
| EP | 1 014 611 A2 | 6/2000  |
| JP | 10-117175    | 5/1998  |

OTHER PUBLICATIONS

"Types and Characteristics of SDH Network Protection Architectures," ITU-T Telecommunication Standardization Sector of ITU (Jul. 10, 1995), XP 000672074, pp. 1-89.
European Search Report issued by EPO, dated Nov. 19, 2004, in European Application No. 01309941.
Notification of Reasons for Rejection issued by Japanese Patent Office, mailed Oct. 5, 2004, for Japanese Patent Appl. No. 2001-361293, and English-language translation of Notification.

* cited by examiner

*Primary Examiner*—Chi Pham
*Assistant Examiner*—Ronald Abelson
(74) *Attorney, Agent, or Firm*—Finnegan, Henderson, Farabow, Garrett & Dunner, L.L.P.

(57) ABSTRACT

Pieces of node equipment are each caused to store a management table which shows whether any resource in the system is inhibited from being switched by APS or permitted to be switched by APS. Each of the pieces of node equipment comprises not only an APS control section for realizing the APS function but also a switching inhibit control section for partially inhibiting the switching process by the APS control section on the basis of the management table, and a set request accepting section for accepting a set request message including the management table sent from network management equipment, interpreting the management table included in the message, and creating a management table to be stored in a memory unit.

41 Claims, 83 Drawing Sheets

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 0 | 0 | 0 | 0 | 0 | 0 | 0 | 0 | 0 | 0 | 0 | 0 | 0 | 0 | 0 | 0 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ··· | | | | | | | | | | | | | | | | |
| TS64 | 0 | 0 | 0 | 0 | 0 | 0 | 0 | 0 | 0 | 0 | 0 | 0 | 0 | 0 | 0 | 0 |

Timeslot

FIG. 3

| Node | | D | | | | C | | | | B | | | | A | | | |
|---|---|---|---|---|---|---|---|---|---|---|---|---|---|---|---|---|---|
| West/East | | W | | E | | W | | E | | W | | E | | W | | E | |
| Span/Ring | S | R | S | R | S | R | S | R | S | R | S | R | S | R | S | R |
| TS1 | 1 | 1 | 1 | 1 | 0 | 0 | 0 | 0 | S | R | S | R | 0 | 0 | 0 | 0 |
| TS2 | 1 | 1 | 1 | 1 | 0 | 0 | 0 | 0 | 0 | 0 | 0 | 0 | 0 | 0 | 0 | 0 |
| TS3 | 1 | 1 | 1 | 1 | 0 | 0 | 0 | 0 | 0 | 0 | 0 | 0 | 0 | 0 | 0 | 0 |
| TS4 | 1 | 1 | 1 | 1 | 0 | 0 | 0 | 0 | 0 | 0 | 0 | 0 | 0 | 0 | 0 | 0 |
| ⋮ | | | | | | | | | | | | | | | | |
| TS64 | 1 | 1 | 1 | 1 | 0 | 0 | 0 | 0 | 0 | 0 | 0 | 0 | 0 | 0 | 0 | 0 |

FIG. 12

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 0 | 0 | 1 | 1 | 1 | 1 | 1 | 1 | 1 | 1 | 0 | 0 | 0 | 0 | 0 | 0 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ⋅⋅⋅ | | | | | | | | | | | | | | | | |
| TS64 | 0 | 0 | 0 | 0 | 0 | 0 | 0 | 0 | 0 | 0 | 0 | 0 | 0 | 0 | 0 | 0 |

Timeslot

FIG. 21

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 1 | 1 | 1 | 1 | 1 | 1 | 1 | 1 | 1 | 1 | 1 | 1 | 1 | 1 | 1 | 1 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ⋮ | | | | | | | ⋯ | | | | | | | | | |
| TS64 | 0 | 0 | 0 | 0 | 0 | 0 | 0 | 0 | 0 | 0 | 0 | 0 | 0 | 0 | 0 | 0 |

Timeslot

F I G. 28

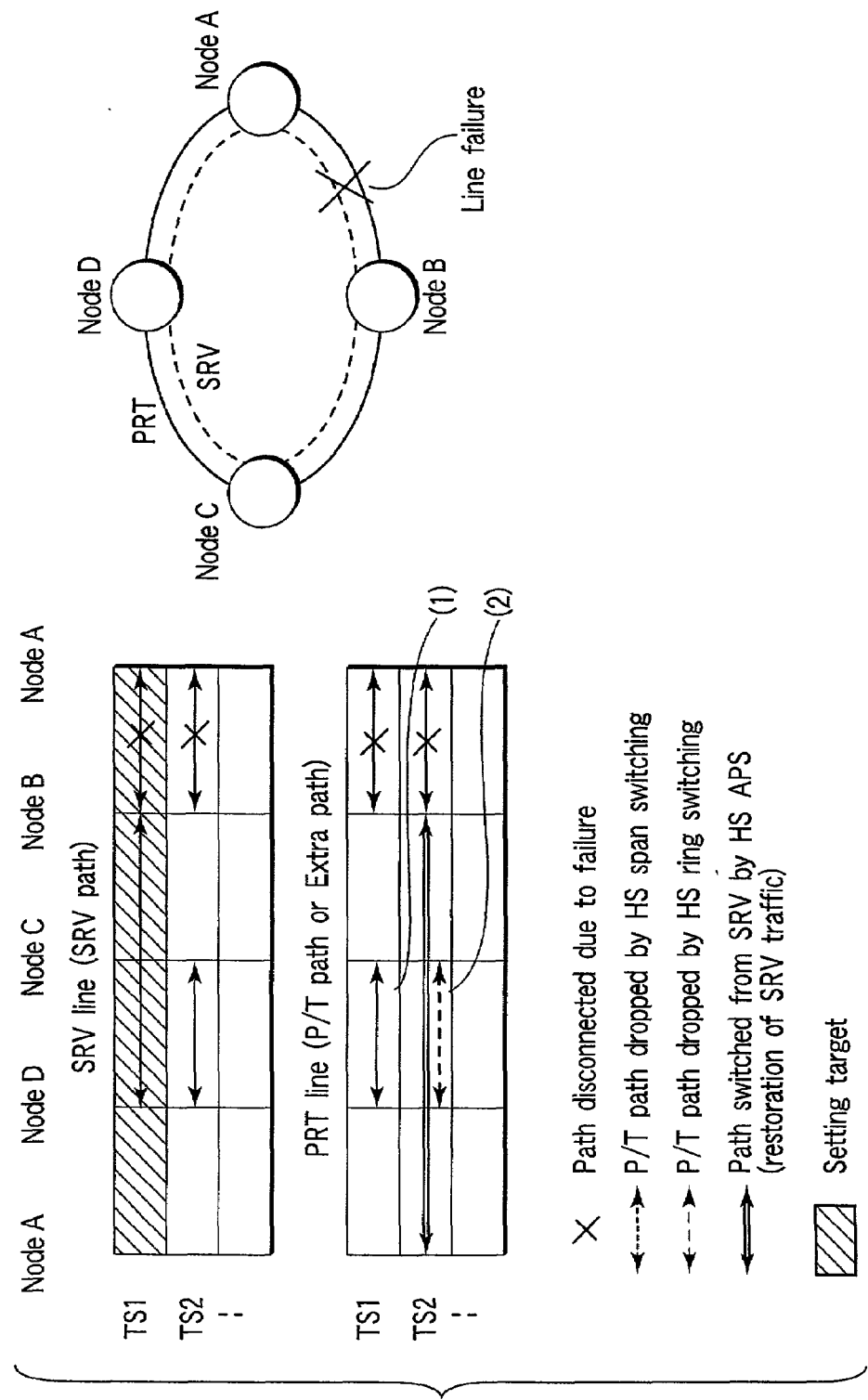
F I G. 32

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 0 | 0 | 1 | 1 | 1 | 1 | 0 | 0 | 0 | 0 | 0 | 0 | 0 | 0 | 0 | 0 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ⋮ | | | | | | | | | | | | | | | | |
| TS64 | 0 | 0 | 0 | 0 | 0 | 0 | 0 | 0 | 0 | 0 | 0 | 0 | 0 | 0 | 0 | 0 |

Timeslot

FIG. 35

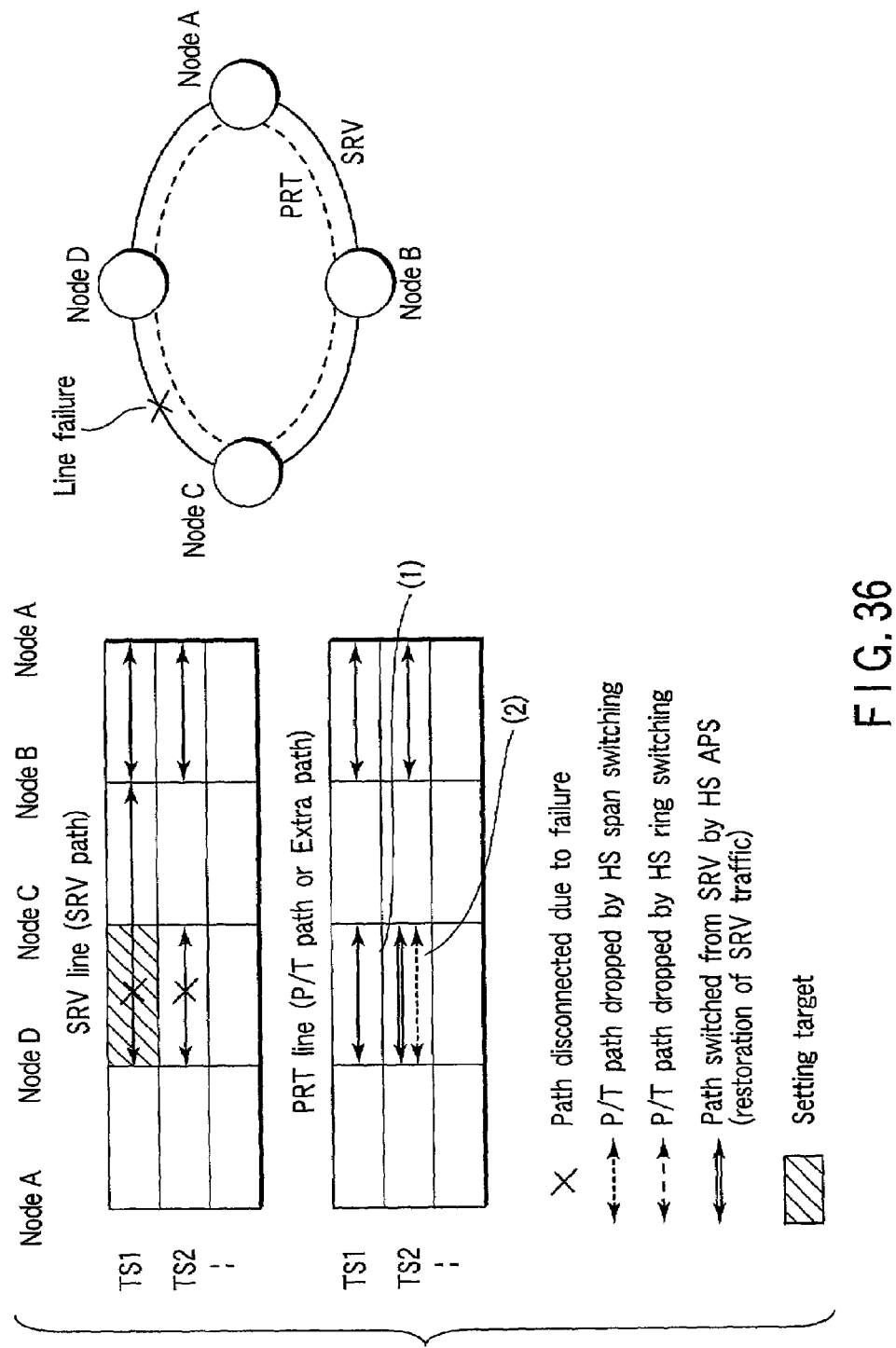
F I G. 36

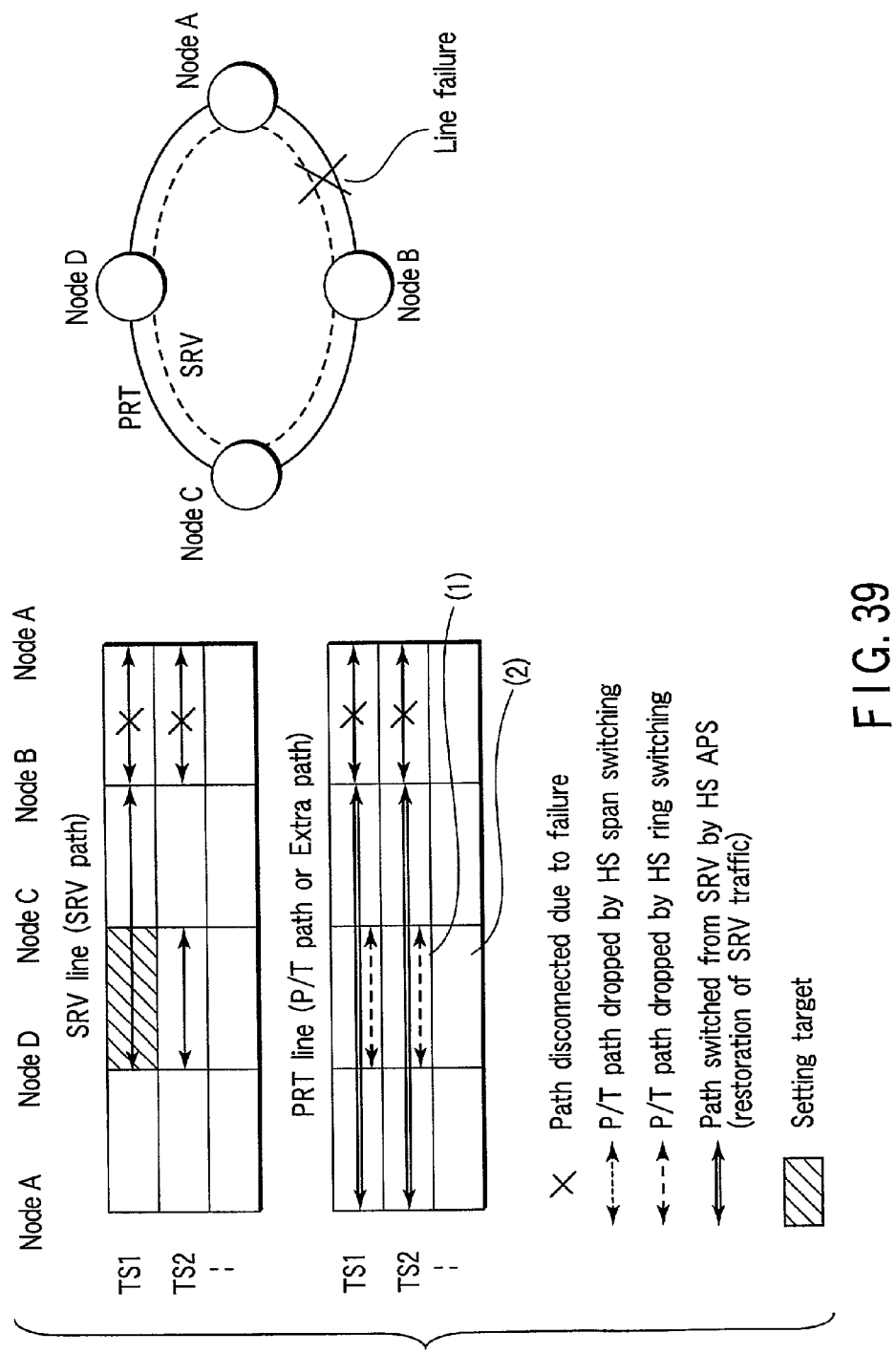
F I G. 39

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 0 | 1 | 1 | 1 | 1 | 1 | 0 | 1 | 0 | 1 | 0 | 1 | 0 | 1 | 0 | 1 |
| TS2 | 0 | 1 | 1 | 1 | 1 | 1 | 0 | 1 | 0 | 1 | 0 | 1 | 0 | 1 | 0 | 1 |
| TS3 | 0 | 1 | 1 | 1 | 1 | 1 | 0 | 1 | 0 | 1 | 0 | 1 | 0 | 1 | 0 | 1 |
| TS4 | 0 | 1 | 1 | 1 | 1 | 1 | 0 | 1 | 0 | 1 | 0 | 1 | 0 | 1 | 0 | 1 |
| ... | | | | | | | | | | | | | | | | |
| TS64 | 0 | 1 | 1 | 1 | 1 | 1 | 0 | 1 | 0 | 1 | 0 | 1 | 0 | 1 | 0 | 1 |

FIG. 42

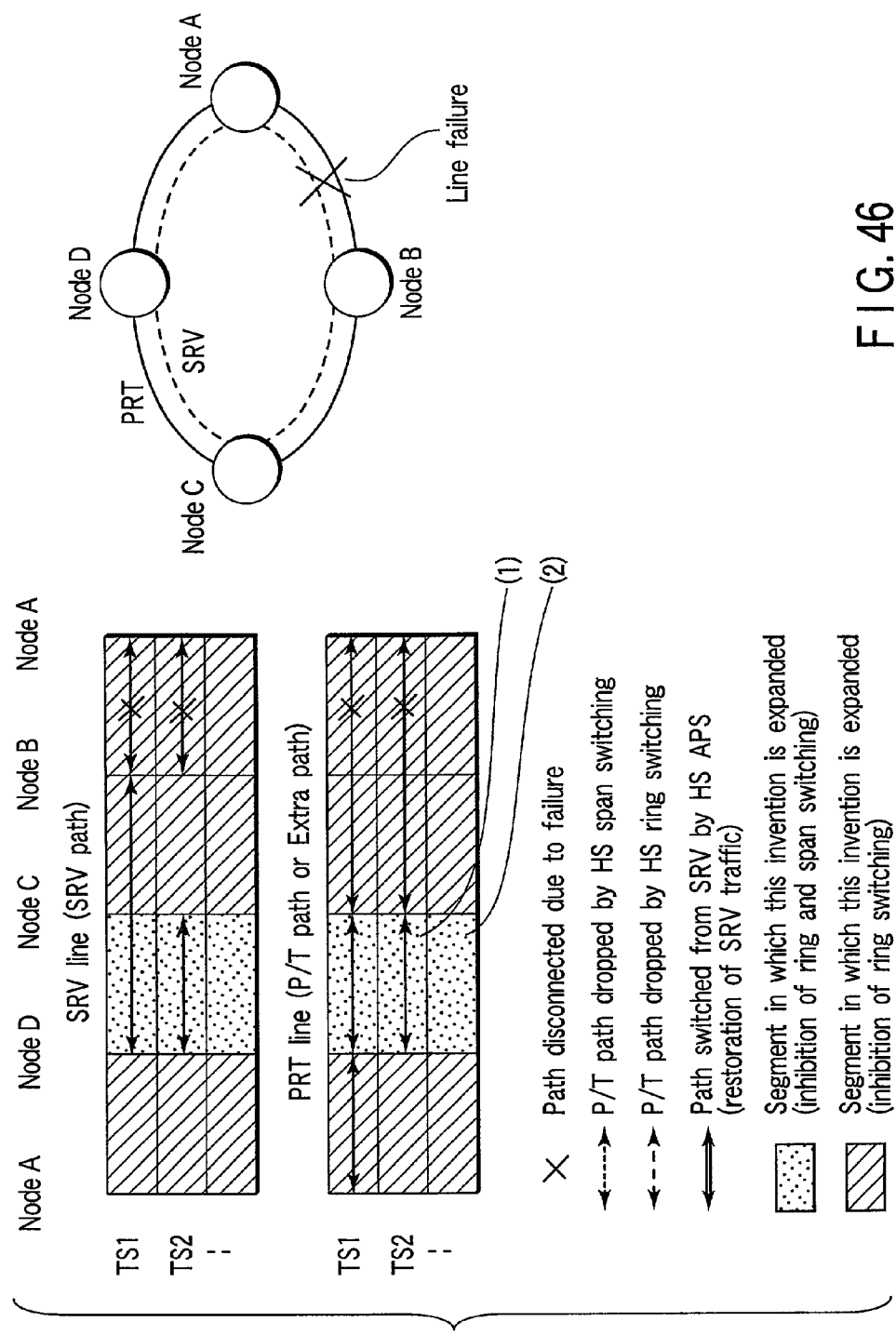
F I G. 46

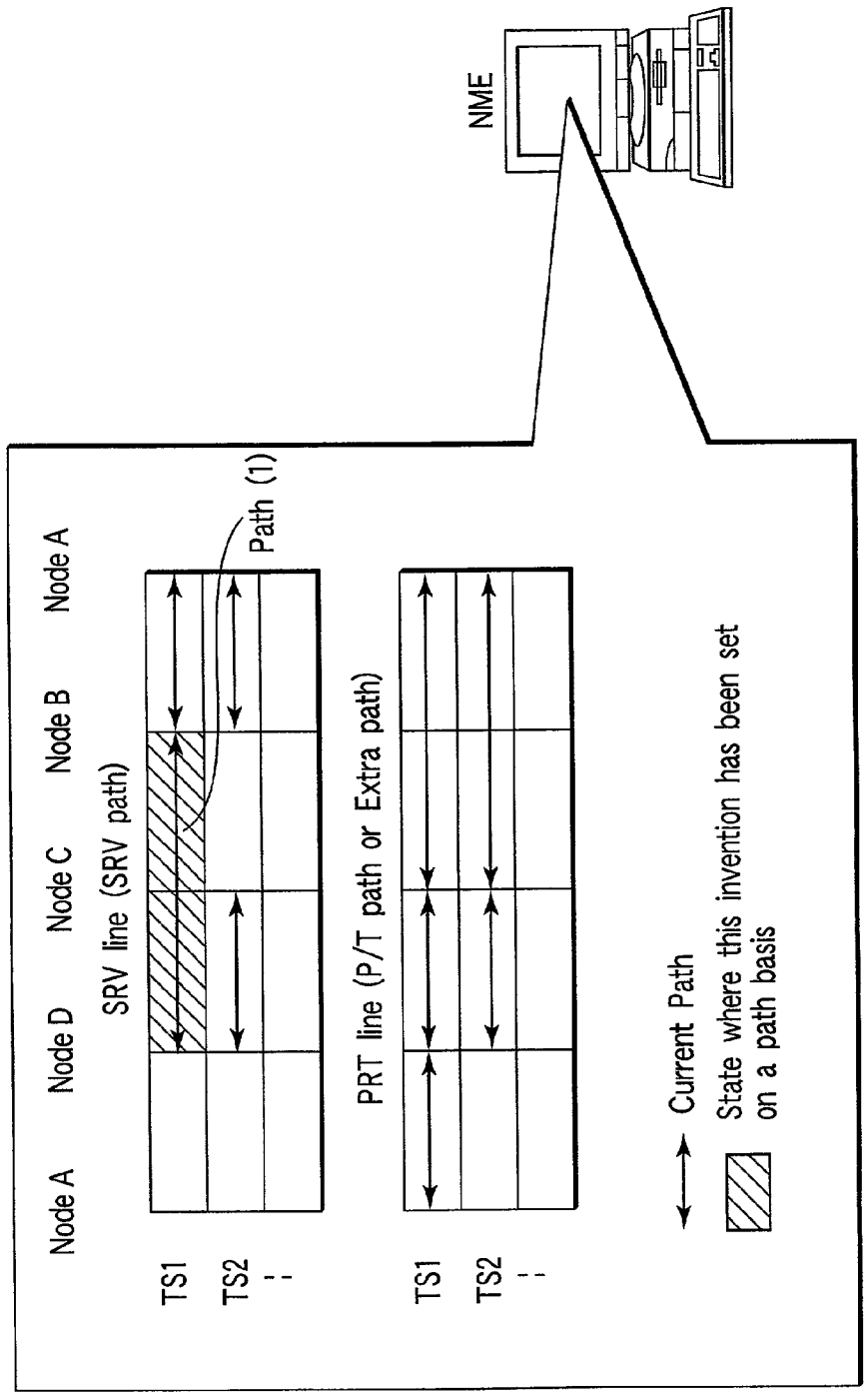
F I G. 47

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 0 | 1 | 1 | 1 | 1 | 1 | 1 | 1 | 1 | 1 | 1 | 1 | 1 | 1 | 1 | 1 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ⋮ | | | | | | | | ⋯ | | | | | | | | |
| TS64 | 0 | 0 | 0 | 0 | 0 | 0 | 0 | 0 | 0 | 0 | 0 | 0 | 0 | 0 | 0 | 0 |

Timeslot

FIG. 49

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 0 | ▨1 | 1 | 1 | 1 | 1 | 1 | ▨1 | 1 | ▨1 | 1 | ▨1 | 0 | ▨1 | 0 | ▨1 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ⋯ | | | | | | | | | | | | | | | | |
| TS64 | 0 | 0 | 0 | 0 | 0 | 0 | 0 | 0 | 0 | 0 | 0 | 0 | 0 | 0 | 0 | 0 |

Timeslot

FIG. 54

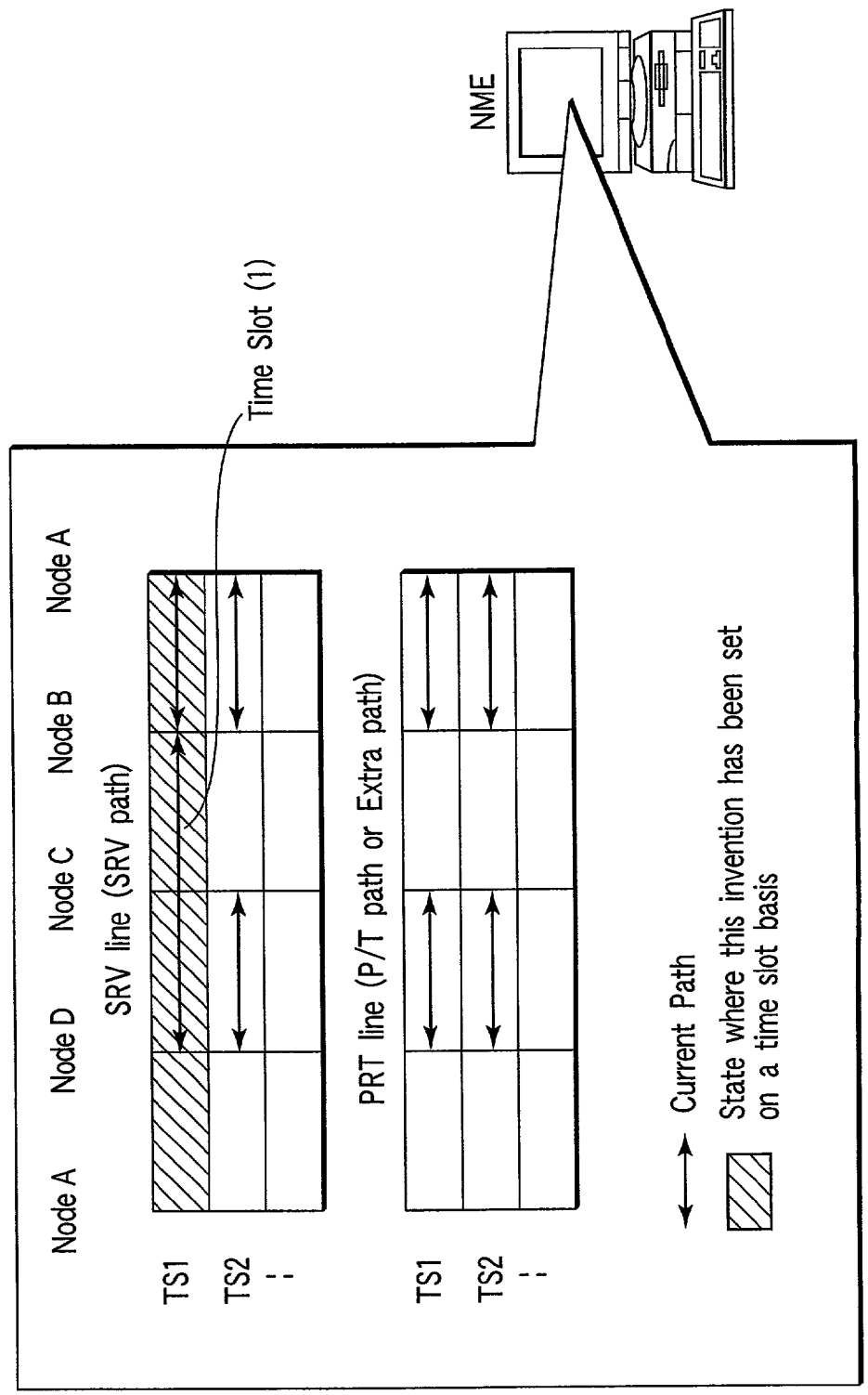
F I G. 61

| Node | D | | | | C | | | | B | | | | A | | | |
|---|---|---|---|---|---|---|---|---|---|---|---|---|---|---|---|---|
| West/East | W | | E | | W | | E | | W | | E | | W | | E | |
| Span/Ring | S | R | S | R | S | R | S | R | S | R | S | R | S | R | S | R |
| TS1 | 1 | 1 | 1 | 1 | 1 | 1 | 1 | 1 | 1 | 1 | 1 | 1 | 1 | 1 | 1 | 1 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ... | | | | | | | | | | | | | | | | |
| TS64 | 0 | 0 | 0 | 0 | 0 | 0 | 0 | 0 | 0 | 0 | 0 | 0 | 0 | 0 | 0 | 0 |

FIG. 63

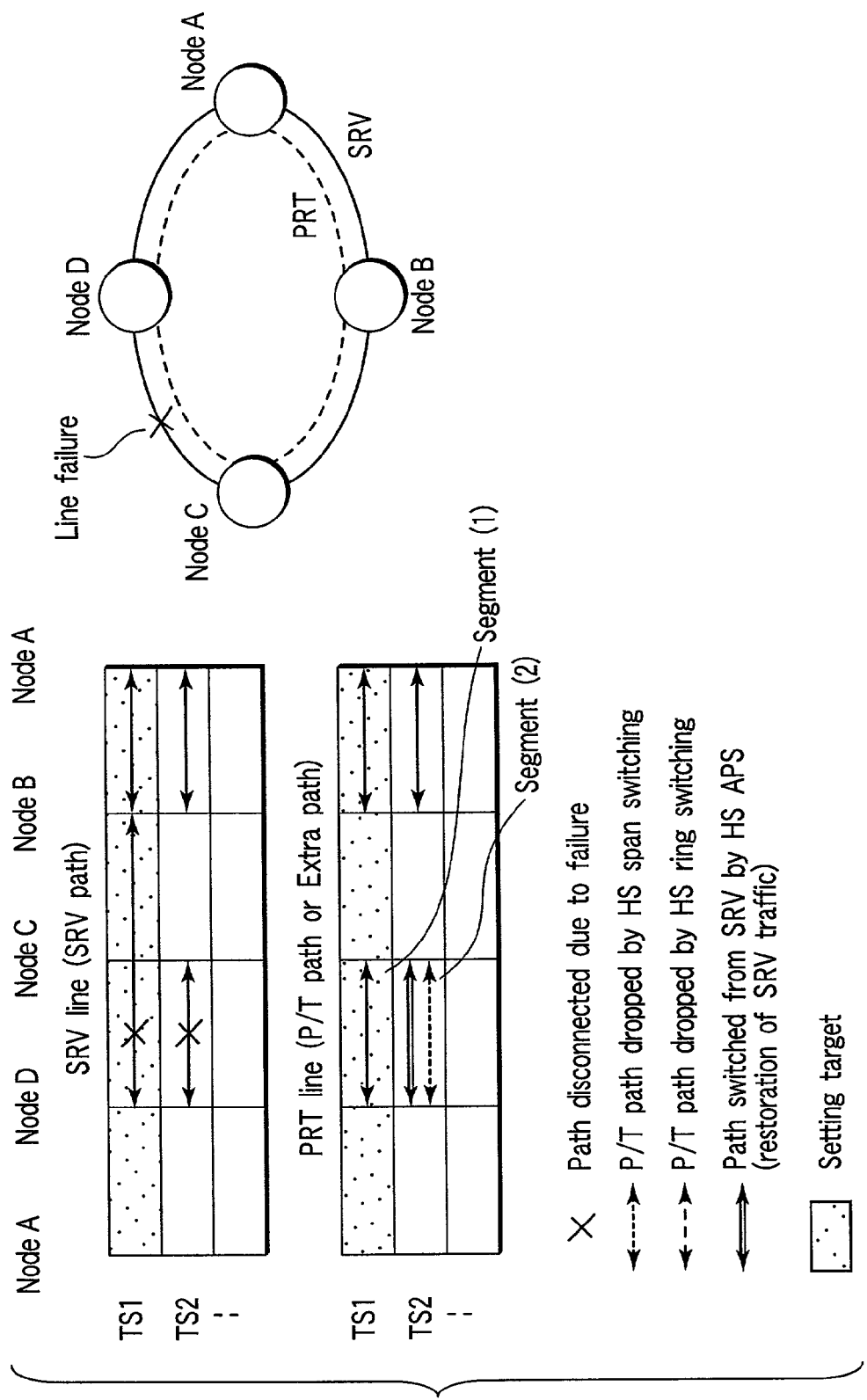
F I G. 64

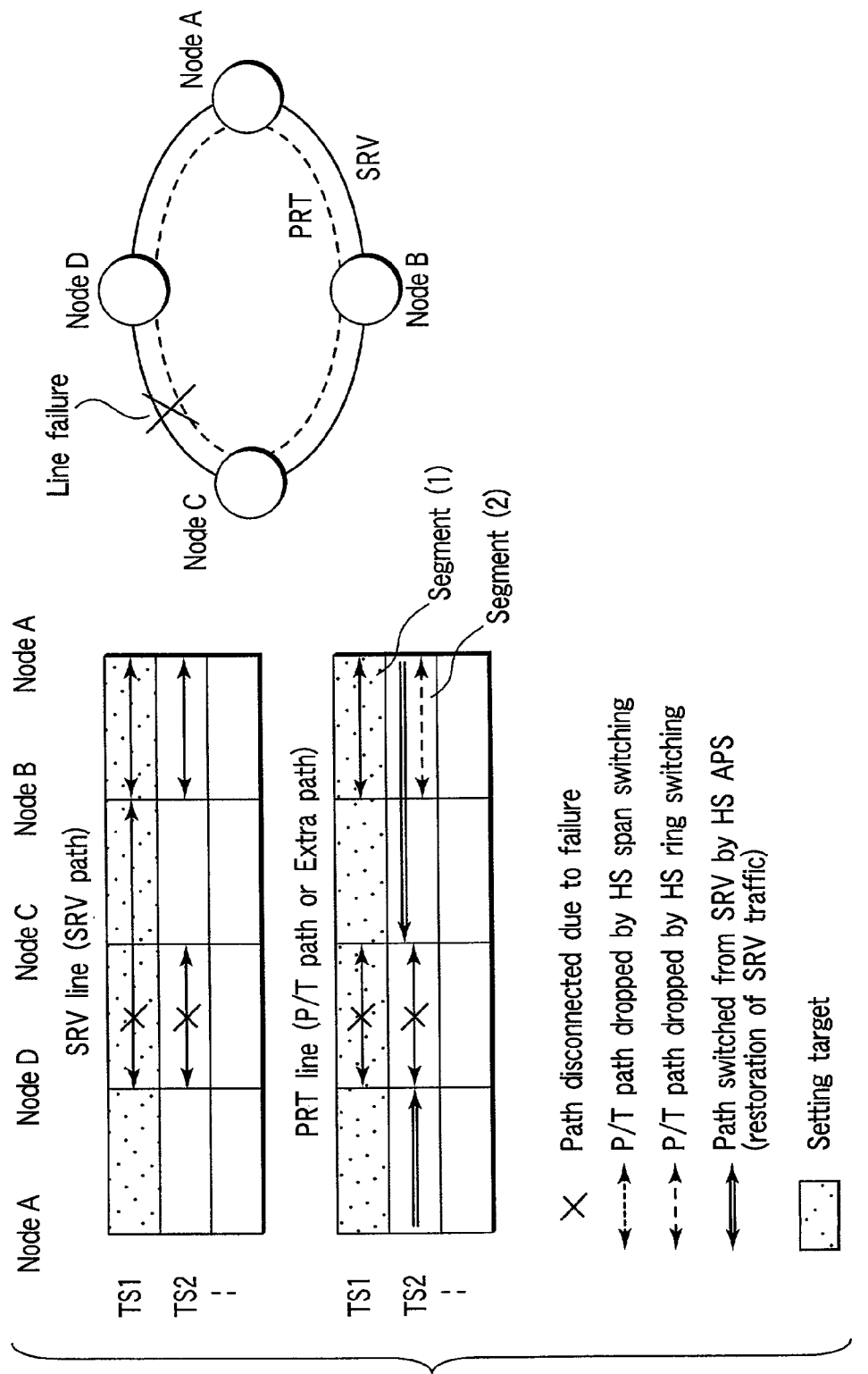
F I G. 65

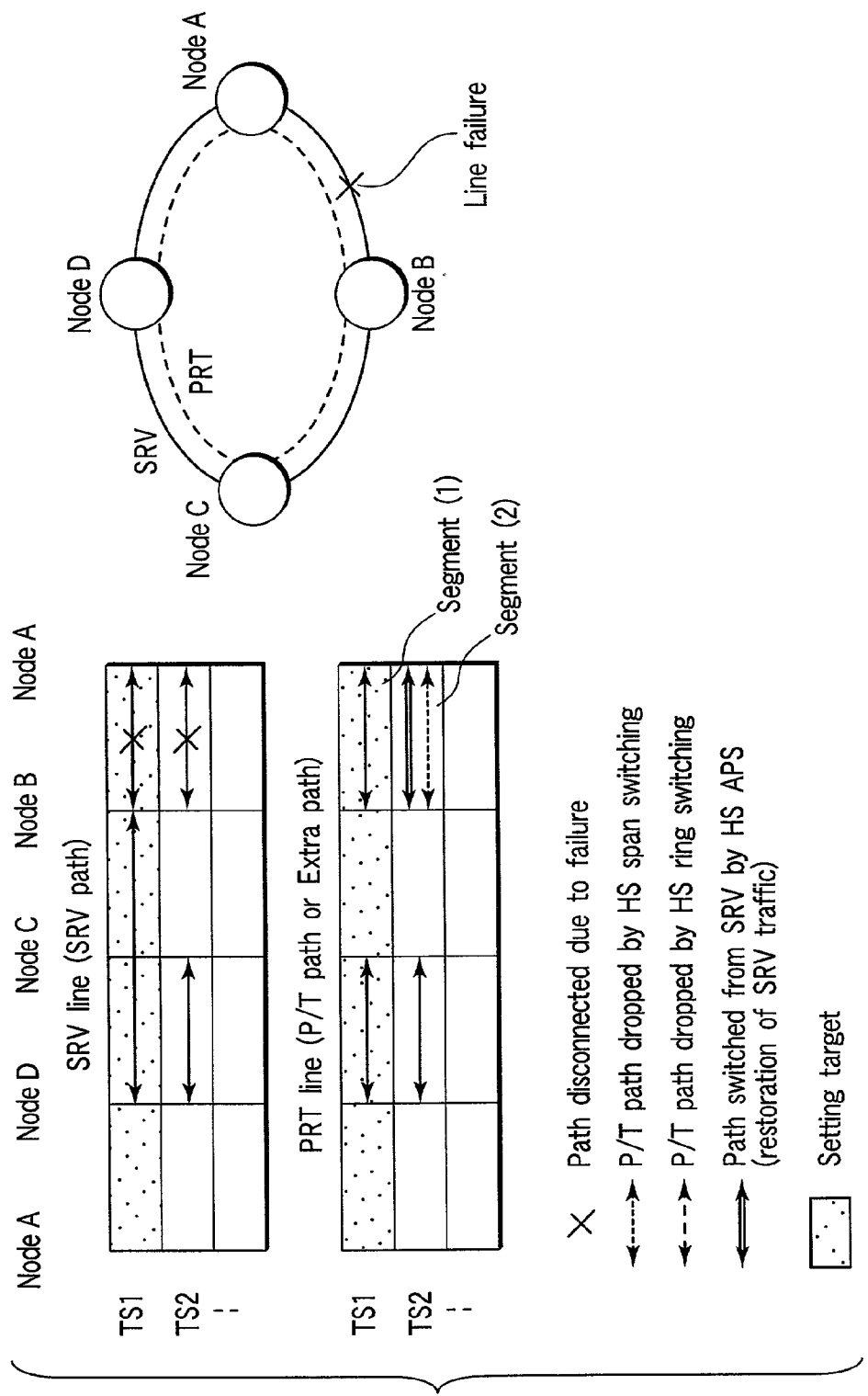
F I G. 66

| Node | | D | | | | C | | | | B | | | | A | | | |
|---|---|---|---|---|---|---|---|---|---|---|---|---|---|---|---|---|---|
| West/East | | W | | E | | W | | E | | W | | E | | W | | E | |
| Span/Ring | S | R | S | R | S | R | S | R | S | R | S | R | S | R | S | R |
| TS1 | 0 | 1 | 1 | 1 | 1 | 1 | 1 | 1 | 1 | 1 | 1 | 1 | 1 | 1 | 1 | 1 |
| TS2 | 0 | 0 | 0 | 0 | 0 | 0 | 0 | 0 | 0 | 0 | 0 | 0 | 0 | 0 | 0 | 0 |
| TS3 | 0 | 0 | 0 | 0 | 0 | 0 | 0 | 0 | 0 | 0 | 0 | 0 | 0 | 0 | 0 | 0 |
| TS4 | 0 | 0 | 0 | 0 | 0 | 0 | 0 | 0 | 0 | 0 | 0 | 0 | 0 | 0 | 0 | 0 |
| ⋮ | | | | | | | | | | | | | | | | |
| TS64 | 0 | 0 | 0 | 0 | 0 | 0 | 0 | 0 | 0 | 0 | 0 | 0 | 0 | 0 | 0 | 0 |

Timeslot

F I G. 70

DATA TRANSMISSION SYSTEM, AND NODE EQUIPMENT AND NETWORK MANAGEMENT EQUIPMENT USED IN THE SAME

CROSS-REFERENCE TO RELATED APPLICATIONS

This application is based upon and claims the benefit of priority from the prior Japanese Patent Application No. 2000-360372, filed Nov. 27, 2000, the entire contents of which are incorporated herein by reference.

BACKGROUND OF THE INVENTION

1. Field of the Invention

This invention relates to a data transmission system, such as an optical submarine cable system, and node equipment and network management equipment used in the system.

2. Description of the Related Art

Information communication systems applied to a trunk network are required to be able to continue data transmission without the interruption of communication even when a failure has occurred. To meet the requirement, various methods for assuring the reliability of communication have been proposed. In large-scale networks, the configuration where a plurality of nodes are connected in a ring via a signal transmission line including a service line and a protection line has been widely used.

In this type of network, when no failure has occurred in the network, service traffic is held in the service line. When a failure has occurred in the service line, the transmission route of the service traffic is switched to the protection line. In this way, the service traffic is salvaged.

Furthermore, when there is no failure in the network, the protection line holds extra traffic or part-time traffic lower in priority than that of the service traffic. These traffics are cut off when a failure occurs.

Networks having such an architecture include systems complying with SDH (Synchronous Digital Hierarchy) and systems conforming to SONET (Synchronous Optical Network), an ANSI (American National Standards Institute) standard. The process related to the protection of service traffic is often realized by automatic distributed control using information exchange between pieces of node equipment. This type of function is called a self-healing function. The self-healing function in SDH is referred to as APS (Automatic Protection Switching). The details of APS have been written in, for example, ITU-T (Telecommunication Standardization Sector of ITU) Recommendation G. 841 distributed by the ITU (International Telecommunication Union).

With the recent rapid progress in IP (Internet Protocol) technology, a high-capacity, high-speed transmission of IP packets is becoming possible. In addition, the technique for detouring the transmission route of service traffic to an external network to salvage the service traffic is being realized. With this backdrop, the needs of communication operators have become diversified, which requires the network to have more flexibility in management than it has now.

As described above, with the recent advances in communication technology, the needs of communication operators have become diversified. This requires the network to have more flexibility in management than it has now.

BRIEF SUMMARY OF THE INVENTION

It is, accordingly, an object of the present invention to provide a data transmission system which provides more flexibility in management, and node equipment and network management equipment used in the system.

The foregoing object is accomplished by providing a data transmission system, such as an SDH transmission system, including a resource holding main traffic, such as service traffic, a resource holding sub-traffic, such as extra traffic or part-time traffic, different from the main traffic, and a self-healing function, such as APS control means, of, when a failure related to the main traffic has occurred, detouring the main traffic to the resource of the sub-traffic to salvage the main traffic, the data transmission system characterized by comprising means for suppressing the self-healing function for a specific unit defined in the system.

Here, "a specific unit" means, for example, "segment," "transmission path," "time slot" in the time-division multiplexing method, "a unit of multiplexing" for each wavelength in the wavelength-division multiplexing method, or "the smallest unit in setting a transmission path" in a time slot in a segment.

More specifically, the foregoing object is accomplished by providing a data transmission system which connects a plurality of pieces of node equipment in a ring via a service line transmitting main traffic and a protection line capable of transmitting sub-traffic different from the main traffic, the data transmission system characterized by comprising: self-healing function control means, such as APS control means, for, when a failure related to the main traffic has occurred, carrying out a switching process which switches the transmission path of the main traffic to the protection line to detour the main traffic to the protection line; and switching inhibit control means, when a segment sandwiched between adjacent pieces of node equipment is specified arbitrarily, inhibiting the main traffic set in the transmission path including the specified segment of the service line from being detoured to the protection line by the switching process at the self-healing function control means.

With such a configuration, the self-healing function is inhibited from salvaging the service traffic in the case of a specific unit defined in the system. As a result, even when a failure has occurred in the transmission line, the sub-traffic set in the protection line is not disconnected, enabling the transmission of the sub-traffic to be continued, regardless of the presence or absence of a failure. This provides more flexibility in managing the system.

In a conventional system, when a failure related to the service traffic occurred, the process of detouring the service traffic to the protection system was carried out blindly. In the present invention, however, the process of detouring the service traffic to the protection system is selectively inhibited for a specific unit defined in the system. This means that the traffic can be transmitted to the protection system only in the case of the relevant unit, regardless of the state of the service system. In other words, this means that the priority of the main traffic becomes equal to that of the sub-traffic.

That is, use of the above means prevents the sub-traffic from being disconnected blindly, which increases the transmission capacity in appearance more than a conventional equivalent.

The present invention is most characterized by specifying some of the objects constituting the system and making the above setting effective only for the specified objects, not by effecting the setting that makes the priority of the main traffic equal to that of the sub-traffic, all over the network.

The setting that makes the priority of the main traffic equal to that of the sub-traffic has been described as NUT (Non-pre-emptible unprotected traffic) in, for example, ITU-T Recommendation G. 841 (10/98).

The purpose of this specification is not to disclose such a concept as NUT. This specification discloses means for realizing a method of suppressing redundant switching, such as NUT, from the viewpoints of data transmission systems, network management equipment, and node equipment. Furthermore, this specification describes the setting that makes the priority of the main traffic equal to that of the sub-traffic, in connection with the operation of network management equipment and the operation of node equipment that has received an external request from network management equipment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is the management table 6a in the default state;

FIG. 6 is a drawing to help explain the switching of the APS control section 5a;

FIG. 7 is a drawing to help explain the switching of the APS control section 5a;

FIG. 8 is a drawing to help explain the switching of the APS control section 5a;

FIG. 12 is a management table 6a in the first embodiment;

FIG. 21 is a management table 6a in the second embodiment;

FIG. 28 is a management table 6a in the third embodiment;

FIG. 32 shows the mode of switching when a failure has occurred in the service line SL and protection line PL between node A and node B in the third embodiment;

FIG. 35 is a management table 6a in the fourth embodiment;

FIG. 36 shows the mode of switching when a failure has occurred in the service line SL between node C and node D in the fourth embodiment;

FIG. 39 shows the mode of switching when a failure has occurred in the service line SL and protection line PL between node A and node B in the fourth embodiment;

FIG. 42 is a management table 6a in the fifth embodiment;

FIG. 46 shows the mode of switching when a failure has occurred in the service line SL and protection line PL between node A and node B in the fifth embodiment;

FIG. 47 is an illustration to help explain the operation of the operator in a sixth embodiment of the present invention;

FIG. 49 is a management table 6a in the sixth embodiment;

FIG. 54 is a management table 6a in the seventh embodiment;

FIG. 61 is an illustration to help explain the operation of the operator in a eighth embodiment of the present invention;

FIG. 63 is a management table 6a in the eighth embodiment;

FIG. 64 shows the mode of switching when a failure has occurred in the service line SL between node C and node D in the eighth embodiment;

FIG. 65 shows the mode of switching when a failure has occurred in the service line SL and protection line PL between node C and node D in the eighth embodiment;

FIG. 66 shows the mode of switching when a failure has occurred in the service line SL between node A and node B in the eighth embodiment;

FIG. 70 is a management table 6a in the ninth embodiment;

DETAILED DESCRIPTION OF THE INVENTION

Hereinafter, referring to the accompanying drawings, embodiments of the present invention will be explained.

<System Configuration>

Figure 1:
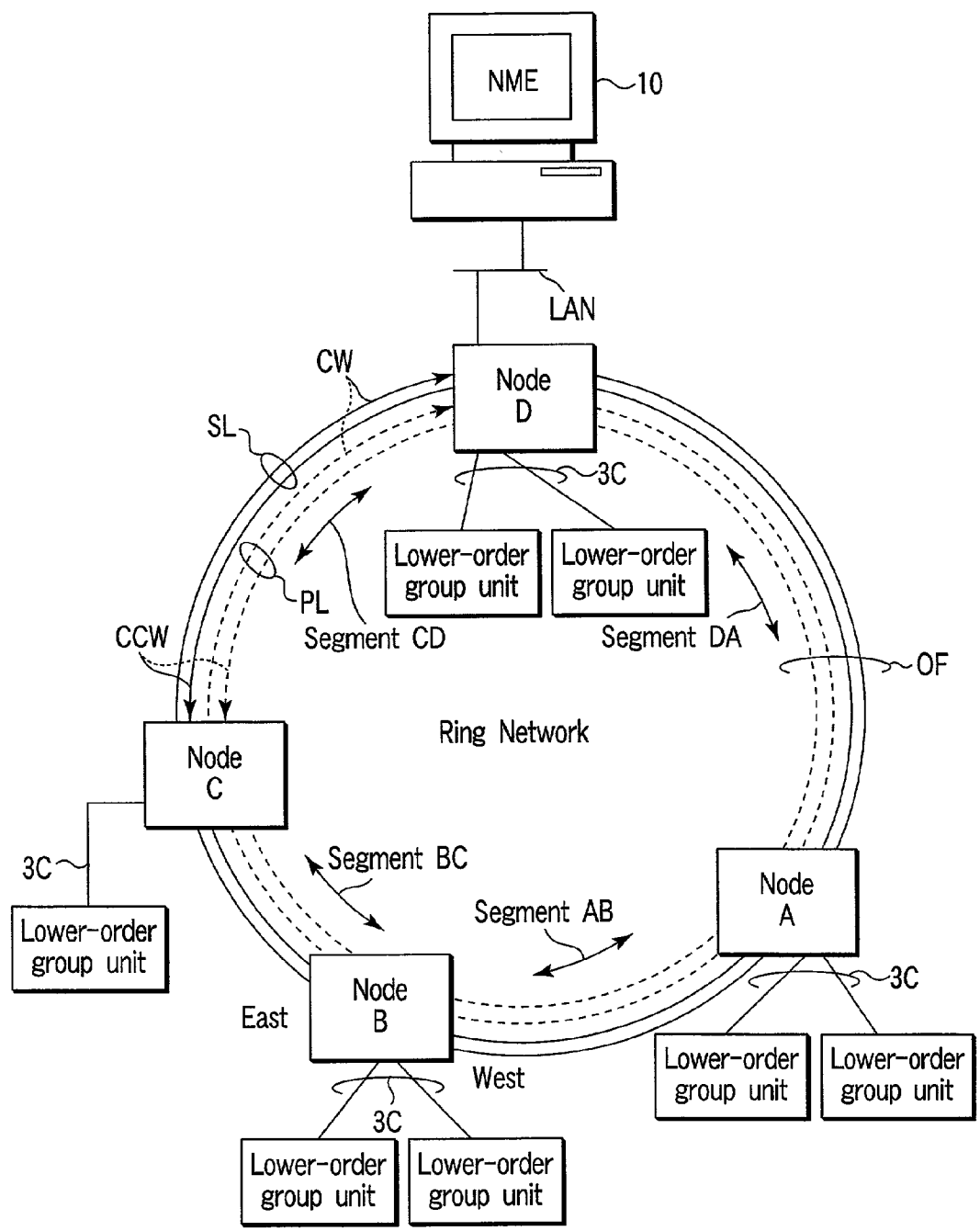
FIG. 1 shows the configuration of a data transmission system according to an embodiment of the present invention.

FIG. 1 shows the configuration of a data transmission system according to an embodiment of the present invention. This system is a so-called dual ring network with the APS function determined in ITU-T Recommendation G. 841.

This ring network includes pieces of node equipment (hereinafter, referred to as nodes) A to D and optical fiber transmission lines TL which connect the nodes A to D in a ring. The optical fiber transmission lines TL include service lines SL and protection lines PL. Each of the service lines SL and protection lines PL includes a clockwise (CW) line and a counterclockwise (CCW) line. This type of dual ring network system is called a 4-fiber ring system. There is also a 2-fiber ring system where a service line SL and a protection line PL are multiplexed in a single fiber. The present invention can be applied to a 2-fiber ring system.

The service lines SL and protection lines PL transmit wavelength-multiplexed signals obtained by multiplexing optical signals of a plurality of wavelengths. A high-speed interface, such as STM-64 (Synchronous Transport Module Level 64), is applied to each wavelength. When there is no failure in the system, the signals transmitted via the service lines SL are called service traffic. When the service traffic is held in the service lines SL, the protection lines PL are empty. To improve the system operation efficiency, traffic with a lower priority than that of the service traffic may be caused to flow in an empty channel of the protection lines PL. This type of traffic is called extra traffic or part-time (P/T traffic) traffic.

A dedicated interface is provided for part-time traffic. A time slot for extra traffic is determined in such a manner that it corresponds to a time slot for service traffic in a one-to-one ratio. There is no such a limit to time slots for part-time traffic.

Each of node A to node D is connected to a lower-order group unit (with no reference character) via a lower-order line 3c. The lower-order group units include a switching system, a dedicated line node, or an ATM cross-connect unit.

In this embodiment, for the sake of convenience, the CW direction at each node is referred to as the East and the CCW direction at each node is referred to as the West. For example, in the case of node B, the direction toward node C is the East and the direction toward node A is the West.

The network system of FIG. 1 includes Network Management Equipment (hereinafter, referred to as NME) which monitors and controls the entire system. NME 10, which is realized by installing a dedicated application program in, for example, a general-purpose workstation. The control function carried out by NME 10 includes a pass setting process and an alarm monitoring process in the network.

NME 10 is connected to, for example, a single node (node D in FIG. 1) via a LAN or the like. Of course, NME 10 may be connected to all the nodes. The number of units of NME 10 and its installation form are arbitrary.

In such a system, a manager/agent model with NME 10 as a manager and nodes A to D as agents is formed. The managed objects (MO) of NME 10 are not limited to nodes A to D. For instance, various things, such as optical fiber transmission lines TL, may be used as the managed objects.

NME 10 is connected to the managed objects via a management network. NME 10 manages the network, mainly using notifications received from each node via the management network. The management network is formed by using, for example, DCC (Data Communication Channel), channels provided in the SDH frame. As a connection protocol for NME 10 and the respective nodes A to D in the management network, for example, CMIP (Common Management Information Protocol) is used.

In the embodiment, the section between node A and node B is called segment AB, the section between node B and node C is called segment BC, the section between node C and node D is called segment CD, and the section between node D and node A is called segment DA.

<Basic Explanation about Pass Setting Method>

Nodes A to D drop a specific one of the time slots time-division-multiplexed in STM-64 frames transmitted via the optical fiber transmission lines TL. The dropped slot is sent as a lower-order signal, such as STM-1, STM-4, or STM-16, to the lower-order line 3c. Furthermore, nodes A to D add the lower-order signals from the lower-order line to a specific slot of an STM-64 frame. The higher-order signal thus created is sent to another node. In this way, a communication path with a specific transmission capacity is set between the individual nodes.

Information can be communicated in a given section only when a path is set in the section. When a path is set, the channel on the lower-order side of one node in the section where communication is desired, the channel on the lower-order side of the other node, and the nodes through which the path passes are specified.

<Node Configuration>

Figure 2:
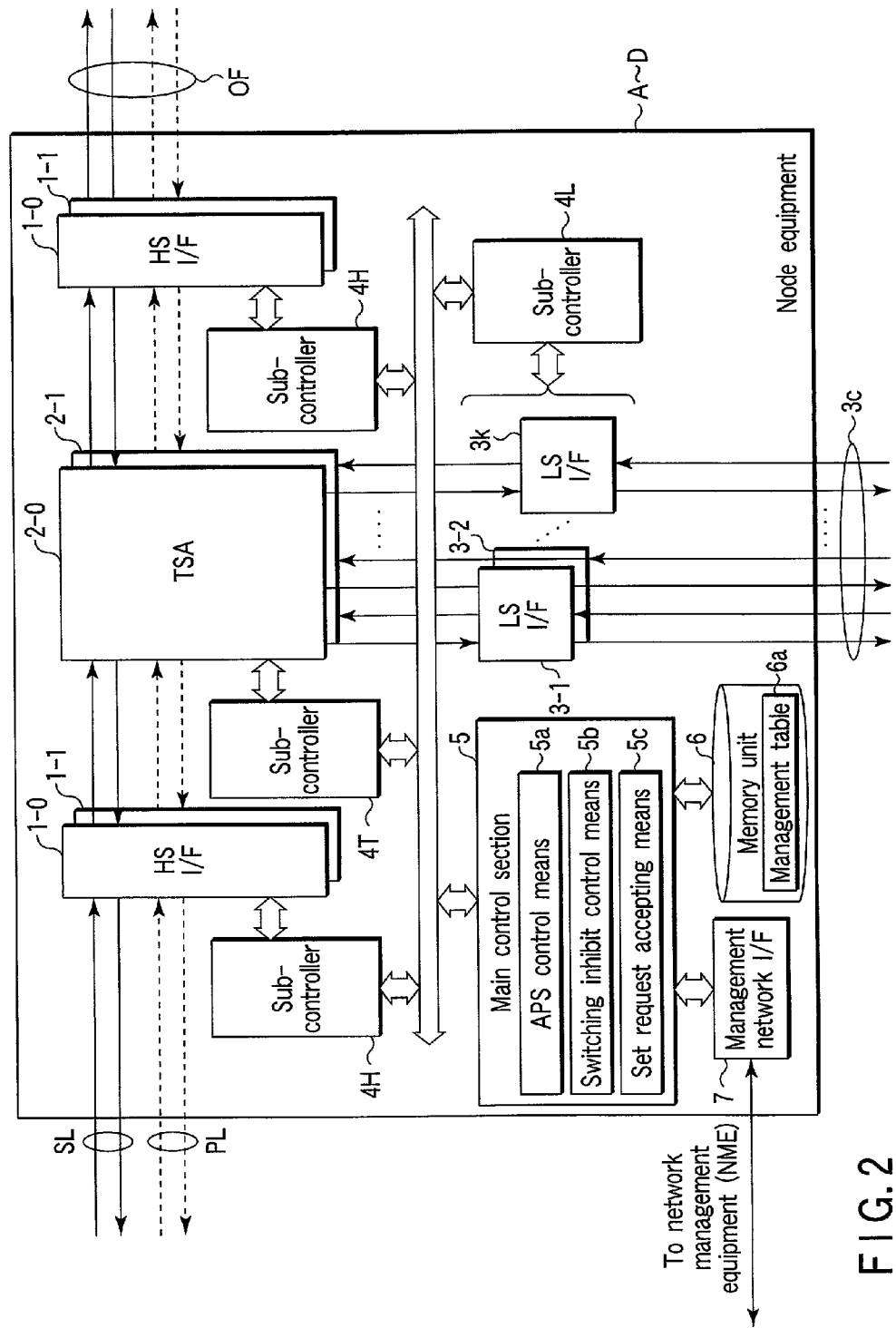
FIG. 2 is a functional block diagram showing the configuration of each of node A to node D in FIG. 1.

FIG. 2 shows the configuration of each of nodes A to D. Each of nodes A to D comprises a service-system high-speed (HS) interface unit (hereinafter, referred to as HS I/F) 1-0 which terminates the service lines SL and a protection-system high-speed (HS) interface unit 1-1 which terminates the protection lines PL. An STM-64 signal introduced into the inside of the equipment via the service-system HS interface unit 1-0 or protection-system HS interface unit 1-1 is inputted to a Time Slot Assignment (TSA) unit 2-0.

The time slot assignment unit 2-0 drops a specific one of the time slots time-division-multiplexed with the STM-64 signal. The dropped slot is supplied as a lower-order signal to low-speed (LS) interface units (hereinafter, referred to as LS I/F) 3-1 to 3-k. Conversely, the lower-order signals coming from the LS interface units 3-1 to 3-k are supplied to the time slot assignment unit 2-0, which adds the signals to a specific time slot in the STM-64 frame and sends the resulting signal to the optical fiber transmission line FL.

The time slot assignment unit 2-0 and a time slot assignment unit 2-1 makes a pair to form a dual structure. In the normal state, the time slot assignment unit 2-0 operates in the service system. If a failure occurs in the time slot assignment unit 2-0, switching is done in the equipment to operate the time slot assignment unit 2-1 in the protection system. The operation of the time slot assignment unit 2-1 is the same as that of the time slot assignment unit 2-0.

Between the service system and the protection system, there is provided a switching circuit (not shown) that enables the signal route to be changed from the service system to the protection system or from the protection system to the service system.

The HS interface units 1-0, 1-1, time slot assignment units 2-0, 2-1, and LS interface units 3-1 to 3-k are connected to a CPU (Central Processing Unit) 5 via subcontrollers 4H, 4T, and 4L, respectively. The subcontrollers 4H, 4T, 4L supplement the control of the CPU 5. Various types of control, including protection switching, are performed hierarchically in the cooperation of the CPU 5 with the subcontrollers 4H, 4T, 4L.

The CPU 5 is connected to a memory unit 6 that stores various control programs and a management network interface (I/F) 7. The memory unit 6 stores a Ring Map which is information about the path setting state in each ring network, a Fabric which is information about the setting state of the connection between higher-order channels and lower-order channels, and others. Both the Ring Map and the Fabric are needed to perform APS. The Ring Map has been described in detail in, for example, FIGS. 7–6/G. 841 of ITU-T Recommendation G. 841.

The memory unit 6 also stores, for example, a management table 6*a* as shown in FIG. 3. The contents of the management table 6*a* will be described later.

In the embodiment, the main control section 5 includes the APS control section 5*a*. The APS control section 5*a* carries out the process of switching the transmission route of service traffic from the service line SL to the protection line PL in the failure state or the like. That is, the APS control section 5*a* is a known functional object for realizing a self-healing function.

The switching process carried out by the APS control section 5*a* is largely divided into span switching and ring switching. The ring switching has two types: one is switching by the non-Transoceanic method called the so-called loop type and the other is switching by the Transoceanic method called the non-loop type. The general difference between these two methods will be described later.

The APS control section 5*a* realizes switching by, at least, the Transoceanic method. The procedure for switching by the Transoceanic method has been described as MS shared protection rings (transoceanic application) in Annex A to ITU-T Recommendation G. 841.

Those skilled in the art may refer to the function of the MS shared protection rings (transoceanic application) as Ring APS or as HS APS, because the switching is related to an HS interface.

The main control section 5 includes a switching inhibit control section 5*b* and a set request accepting section 5*c* in addition to the known control functions including the APS control section 5*a*.

The switching inhibit control section 5*b* partially inhibits switching by the APS control section on the basis of the contents of the management table 6*a* stored in the memory unit 6. That is, the switching inhibit control section 5*b* does not inhibit the switching process from being performed over all the resources of the network. For instance, it inhibits the switching process by the APS function from carrying out only in a specific segment.

The set request accepting section 5*c* accepts a set request message sent from NME 10 and creates a management table 6*a* from the contents of this message. The created management table 6*a* is stored in the memory unit 6.

The set request message includes, for example, a message that "Service traffic set in the transmission path of the service line SL is inhibited only in segment AB from being detoured to the protection line PL as a result of the switching done by the APS control section 5*a*."

In the embodiment, the switching inhibit control section 5*b* may be implemented as part of the function of the APS control section 5*a*.

FIG. 3 shows part of the contents of the management table 6*a*. The individual time slots (TS1 to TS64) in the service line SL and protection line PL are represented as rows (that is, a spread in the lateral direction) in the management table 6*a*. Columns (a spread in the longitudinal direction) shows the distinction between span switching (S) and ring switching (R) on the West side and East side of each node.

In the cells (or squares) located at the intersections of rows and columns, whether the system resources corresponding to the cells are inhibited from being switched or permitted to be switched by Aps is written in bits. That is, a "1" is written in a cell corresponding to a resource inhibited from being switched, and a "0" is written in a cell corresponding to a resource permitted to be switched.

For instance, when span switching is inhibited in time slot TS1 on the West side of node D, bit 1 is written in the part enclosed by a dotted-line circle in FIG. 3. The management table 6*a* of FIG. 3 reflects the contents of the setting in the default state. In the table 6*a*, 0s are written in all the cells. That is, in the default state, there is no resource inhibited from being switched by APS in the system.

<NME Configuration>

Figure 4:
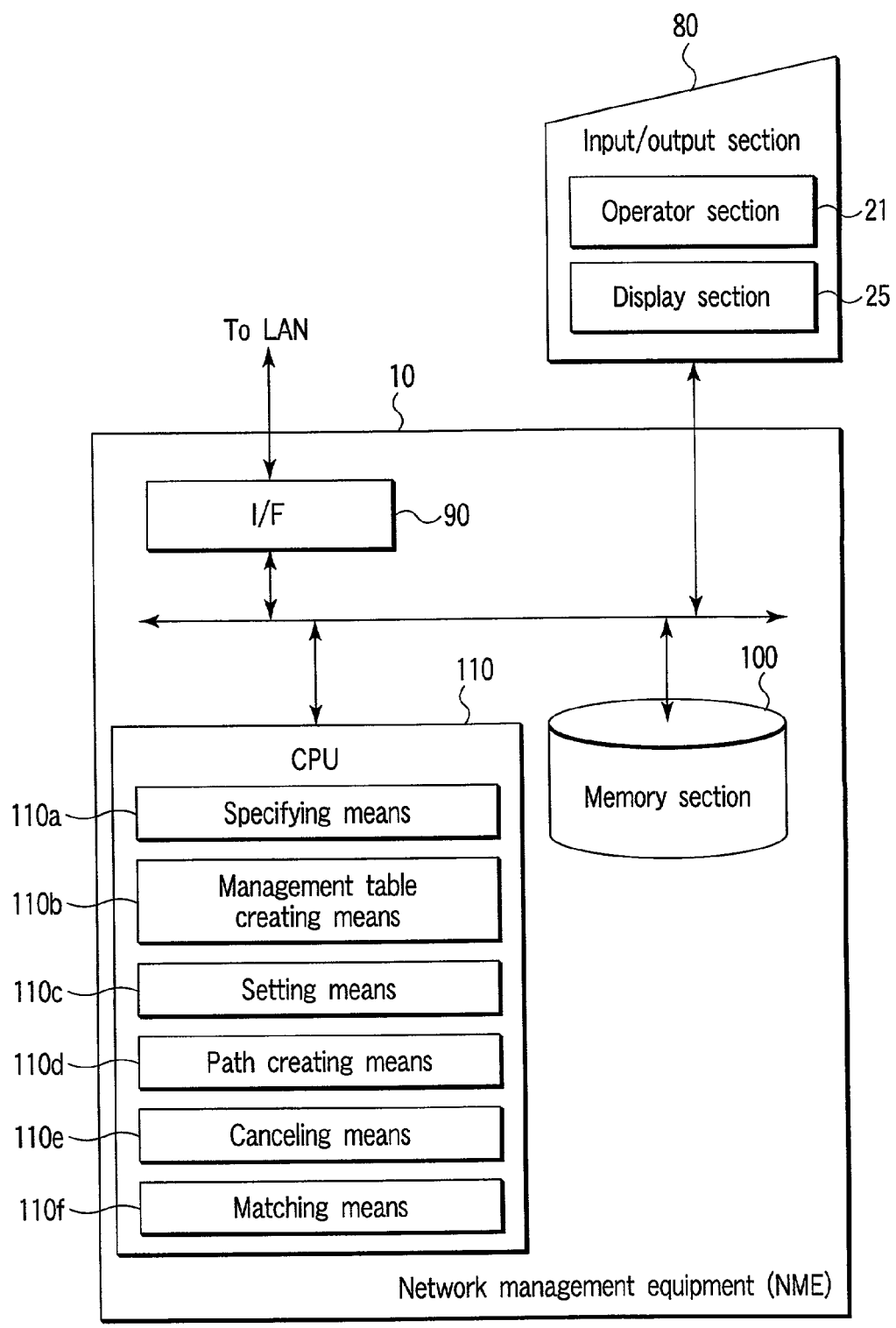
FIG. 4 is a functional block diagram showing the configuration of NME 10 in FIG. 1.

FIG. 4 shows the configuration of NME 10. NME 10 comprises, for example, a general-purpose workstation in which a dedicated application program has been installed. The main part of its function is realized using software. NME 10 comprises an input/output section 80, an interface (I/F) section 90, a memory section 100, and a CPU 110. The input/output section 80, which includes an operator section 21 and a display section 25, functions as a human-machine interface. The interface (I/F) section 90 acts as a connection interface with each of the nodes A to H via a LAN. The memory section 100 stores various monitoring control programs. The operator section 21 is realized using, for example, a mouse or a keyboard. The display section 25 is realized using a liquid-crystal display.

The CPU 110 includes the following new control functions related to the present invention: a specifying section 110*a*, a management table creating section 110*b*, a setting section 110*c*, a path creating section 110*d*, a canceling section 110*e*, and a matching section 110*f*.

The specifying section 110*a* accepts the operation of the operator using the operator section 21. The operator tells his or her intention to NME 10 by using, for example, a GUI (Graphical User Interface) appearing on the screen of the display section 25 of NME 10. The contents of the operation includes specifying resources (e.g., segments) to be inhibited from being switched by APS. The contents of the accepted operation are used in various processes.

The management table creating section 110*b*, when the specifying section 110*a* has specified a resource, creates a management table 6*a* which shows that the resource is to be inhibited from being switched by APS.

Basically, the management table 6*a* is created by the management table creating section 110*b*. In this case, the NME 10 creates the management table 6*a*. Therefore, in the processes at the nodes A to D, the management table 6*a* is only received and stored.

The function of creating the management table 6*a* may be entrusted to the nodes A to D to make the network management equipment 10 send only simple messages. In response to the messages, the nodes A to D may create a management table 6*a*. In this case, the function of creating the management table 6*a* is carried out mainly by the set request accepting section 5*c*. The network management equipment 10 may process the management table 6*a*, acquiring data. The data may be supplied to the nodes A to D. Alternatively, the nodes A to D may process the basic data supplied from the network management equipment 10, generating the management table 6*a*.

The setting section 110*c* creates a set request message including the management table 6*a* created at the management table creating section 110*b*. This request message is sent to the nodes A to D. Receiving the request message, the nodes A to D store the management table 6*a* in the memory unit 6.

The path creating section 110*d* creates in the service line SL a transmission path with the attribute of being inhibited from being detoured by APS to the protection line PL. In addition, the path creating section 110*d* creates in the protection line PL a path with the attribute of inhibiting APS from detouring the service traffic in the service line SL to its transmission resource. That is, this transmission path is not cut off even when any failure occurs in the service traffic. As a result, the P/T traffic or extra traffic transmitted through this transmission path is not disconnected even when a failure has occurred in the service traffic.

The canceling section 110e, when there is a path inhibited from detouring to the protection line PL, cancels the inhibition of a detour to the transmission path according to the operator's cancel request operation.

The matching section 110f matches the management tables stored at node A to node D to each other. This type of function is called Diagnostics.

The APS control section 5a, switching inhibit control section 5b, set request accepting section 5c, specifying section 110a, management table creating section 110b, setting section 110c, path creating section 110d, canceling section 110e, and matching section 110f are new control functions realized by, for example, putting patches on the existing control programs. In the embodiment, the functions realized by the cooperation between the individual processing sections described above will be explained in detail.

<An Explanation of Operation of the System>
<Basic Operation of the System>

In the transmission system of the embodiment, the transmission of information is realized by setting the transmission path. The transmission path is set by specifying the low-speed-side channel of one node, the low-speed-side channel of the other node, and the relay node in the section where communication is to be made. Generally, a bidirectional communication of information is realized via the transmission path.

Figure 5:
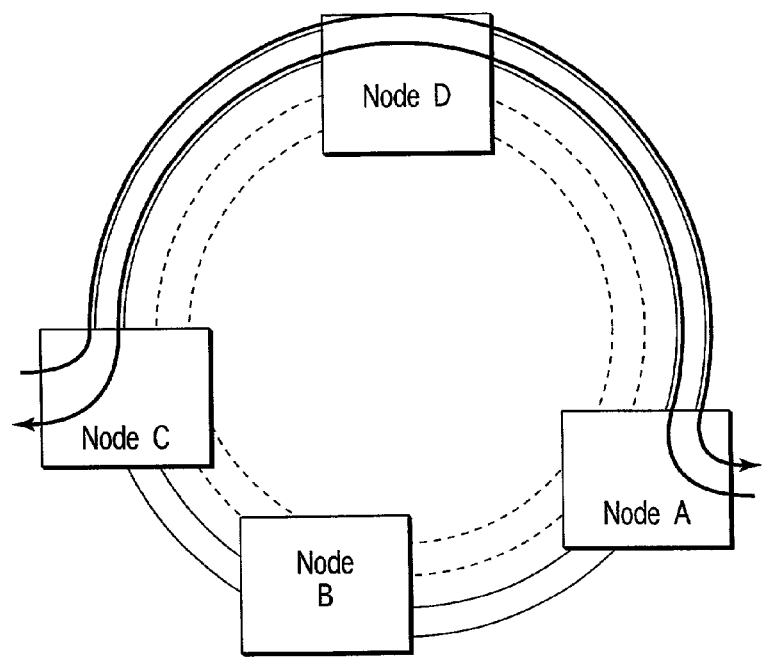
FIG. 5 shows an example of setting a transmission path in an embodiment of the present invention.

As shown in FIG. 5, it is assumed that a transmission path is set between node C and node A. In this case, node C multiplexes the lower-order signal from the lower-order line 3c with a specific time slot of the STM signal frame. The higher-order signal thus created is transmitted to node D via the optical fiber transmission line TL.

Node D permits the time slot to pass through. Then, node A separates the time slot and drops it to the lower-order line 3c. In this way, the data transmission from node C to node A is realized. The data transmission from node A to node C is realized in the same procedure. As a result, a bidirectional communication of information can be made.

Next, the basic procedure for setting a path and the procedure for switching the path route carried out by node A to node D will be explained. In NME 10, when the operator carries out the operation of setting a transmission path, the information created in the operation is taken in by the main control section 5 via the HS I/F 1-0 of FIG. 2. On the basis of the information, the main control section 5 updates the ring map and the connection state information in the memory unit 6.

The main control section 5 sets TSA 2-0 in the switching state based on the connection state information. As a result, TSA 2-0 causes the ones unnecessary to be dropped of the channels included in the signals received vie one service-system HS I/F 1-0 to pass through to the other HS I/F 1-0. In addition, TSA 2-0 connects the channels necessary to be dropped or added to the corresponding one of the LS I/F 3-1 to 3-k.

On the other hand, it is assumed that alarm information from a monitoring section (not shown) provided in each unit of a node or a line switching request from another node is notified to the main control section 5. On this assumption, the APS control section 5a calculates a detour route of the transmission path to salvage the service traffic and, on the basis of the result, updates the ring map and the connection state information in the memory unit 6. As a result, the setting state of TAS 2-0 is changed and the service traffic is salvaged from the failure.

<Basic Operation of Ring APS>

The switching process carried out by the APS control section 5a will be explained. A case where the transmission path in the state of FIG. 5 is set will be described.

Figure 6:
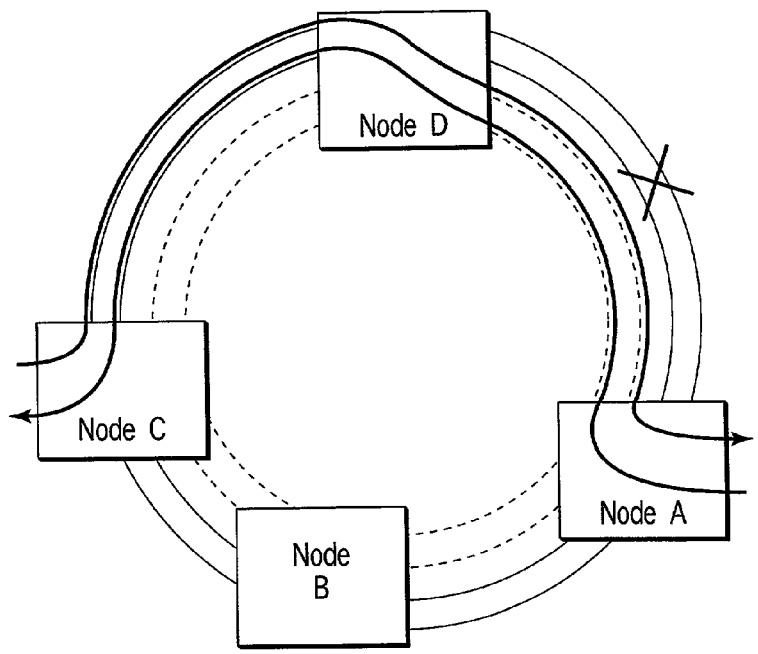

It is assumed that, as shown in FIG. 6, a failure has occurred in the service line SL between node D and node A in the state of FIG. 5. This failure is sensed at node D and node A and span switching is done. In span switching, the transmission route of traffic is switched from the service line SL to the protection line PL in the same section as shown in FIG. 6. The failure in the form shown in FIG. 6 can occur not only when the service line SL is disconnected but also when a failure has occurred in a part related to the service line at node D or node A.

Figure 7:
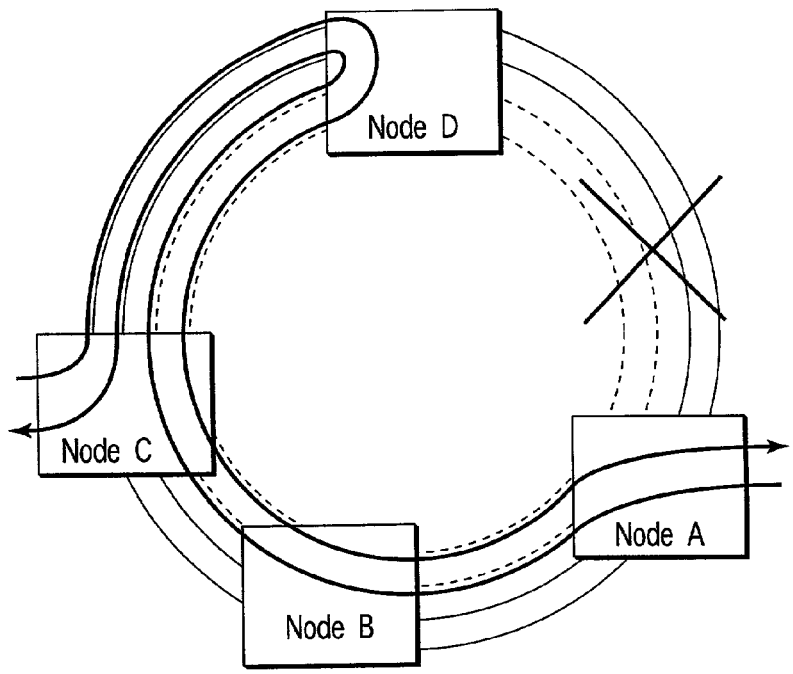

On the other hand, it is assumed that a failure has occurred in the service line SL and protection line PL as shown in FIG. 7. In this case, the service traffic cannot be salvaged by span switching. For this reason, as shown in FIG. 7, the transmission route of the service traffic is switched to the route going through the service line SL in the section of node C→node D and the protection line PL in the section of node D→node C→node B→node A. Of these, the route in the protection line is provided to prevent the other transmission paths from being influenced.

This type of switching is referred to as the loop type. The loop type has the advantage that control is simple because only node D and node A which have sensed failures are related to switching. However, it has an disadvantage in that, when the distance between nodes is long, the transmission delay becomes large.

Figure 8:
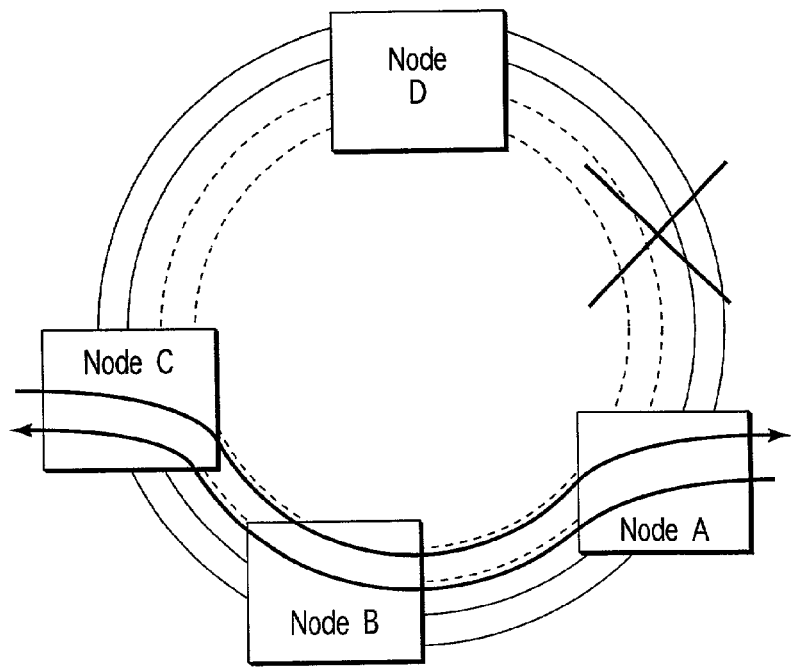

To overcome this problem, a switching process as shown in FIG. 8 may be carried out. In the switching process, traffic is detoured without looping, thereby making a detour route the shortest route. This type of switching is the so-called non-loop type. Which type of looping is to be implemented is determined in the system design.

<An Explanation About the Unit of Setting of the Inhibition of Switching>

As described above, the APS control circuit 5a performs a switching process. The switching-inhibition control section 5b inhibits part of this switching process in accordance with the contents of the management table 6a. A segment, a path (current path), and a time slot have been used as a unit of setting. In addition to this, the setting may be done using smaller units. For instance, setting may be effected using the smallest unit in the transmission resource, such as a time slot in a certain segment. For instance, the smallest unit in the transmission resource corresponds to the unit enclosed by a dotted line in the management table of FIG. 12.

To specify such a unit, the operator left-clicks the segment with the mouse and then right-clicks the time slot with the mouse on the screen of the display section 25 of the network management system.

In addition, the idea of this invention may be applied to a case where there is no path. That is, the inhibition of APS can be set where there is no path. Specifically, it is possible to specify a resource with no path on the screen of the display section 25 of the network management equipment 10 and set the inhibition of APS in the resource. That is, rewriting suitably, for instance, the function program that realizes the path creating section 110d makes it possible to add the attribute of the inhibition of APS to a resource, instead of adding the attribute of the inhibition of APS to a transmission path. This enables the inhibition of APS to be set, regardless of whether a path is present or not at present, which increases the convenience of management.

<Diagnostics>

Next, a function called Diagnostics will be described. This function is realized mainly by a matching section 110f in the form of an application installed in the network management equipment 10.

Figure 9:
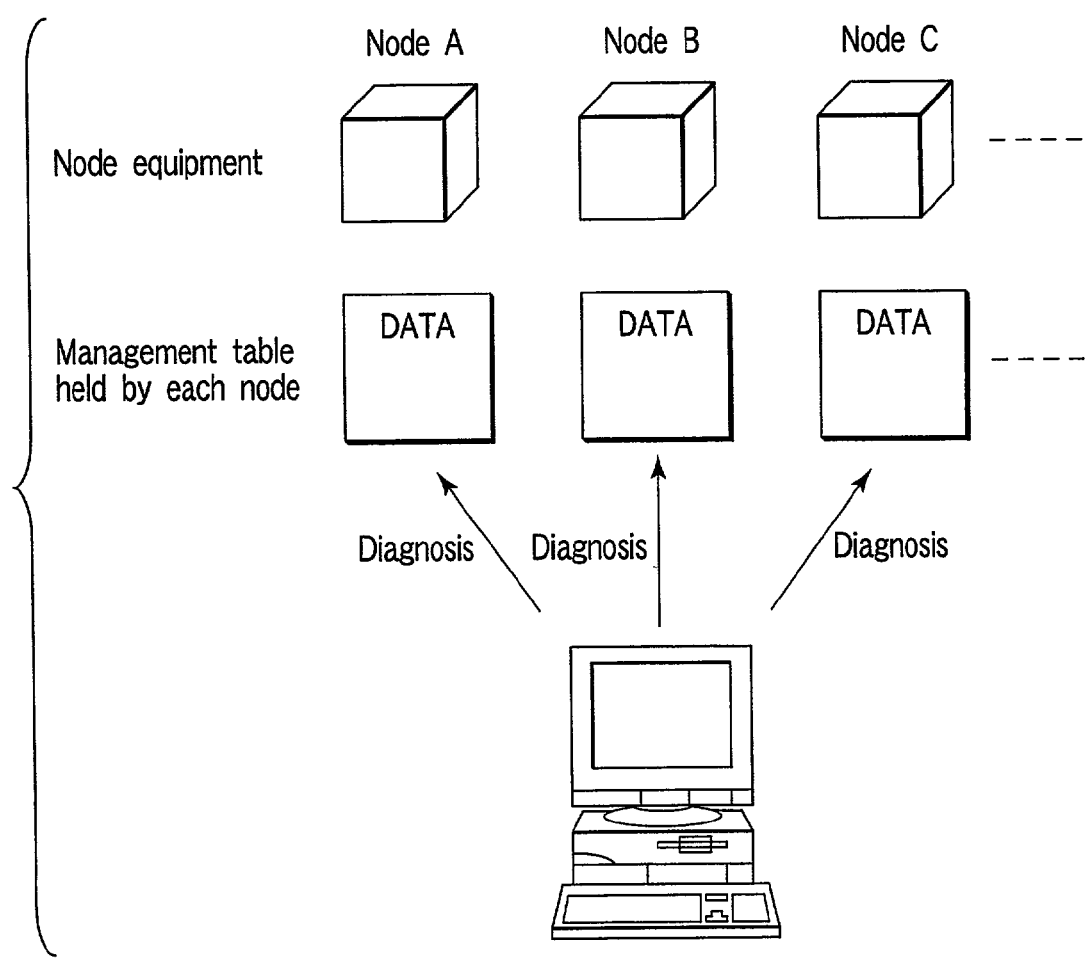
FIG. 9 is a conceptual drawing to help explain Diagnostics, a self-diagnosis function.

A conceptual explanation of diagnosis will be given by reference to FIG. 9. The diagnosis function is the function of diagnosing the unification among the management tables 6a of the nodes A to D and, if they are not matched with each other, correcting them. To use the diagnosis function, a node with reference data is determined in advance. The network management equipment 10 gets the management table 6a from the node and displays its contents on the display section 25 graphically. After checking the displayed contents, the operator clicks the clickable button on the screen, thereby operating the diagnosis function. Then, the network management equipment 10 sends the correct data to the node whose contents do not match with the obtained ones. This updates the contents of the management table 6a and the matched data is stored in the memory unit 6.

Figure 10:
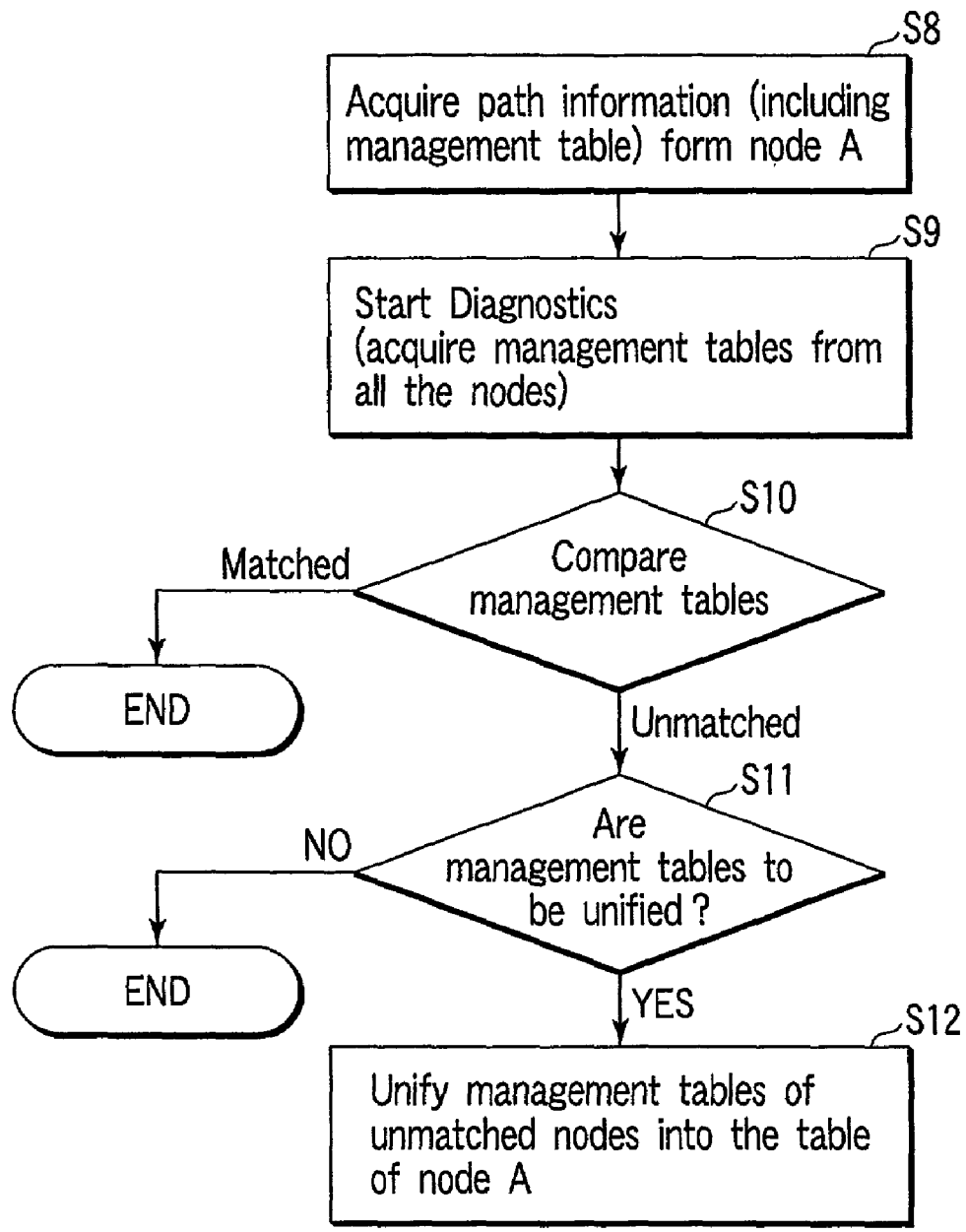
FIG. 10 is a flowchart to help explain the procedure for making a diagnosis.

Referring to the flowchart of FIG. 10, the procedure for making a diagnosis will be explained. At step S8 of FIG. 10, the network management equipment 10 acquires the management table 6a from, for example, node A. Node A is the node having the reference data. When at step S9, the diagnosis function is started, the network management equipment 10 acquires the management tables 6a from all the other nodes B to D.

At step S10, the network management equipment 10 compares the contents of the management table 6a acquired from each of the nodes B to D with those of node A. If all of them match each other, it ends the process. On the other hand, if there is at least one unmatched node, the network management equipment 10, at step S11, waits for an instruction to determine whether to unify the management tables 6a. If the given instruction is to unify them (Yes), the network management equipment 10 unifies the contents of the management table 6a of the unmatched node into the contents of the management table of node A.

<The Procedure of Processing at the APS Control Section 5a>

Figure 11:
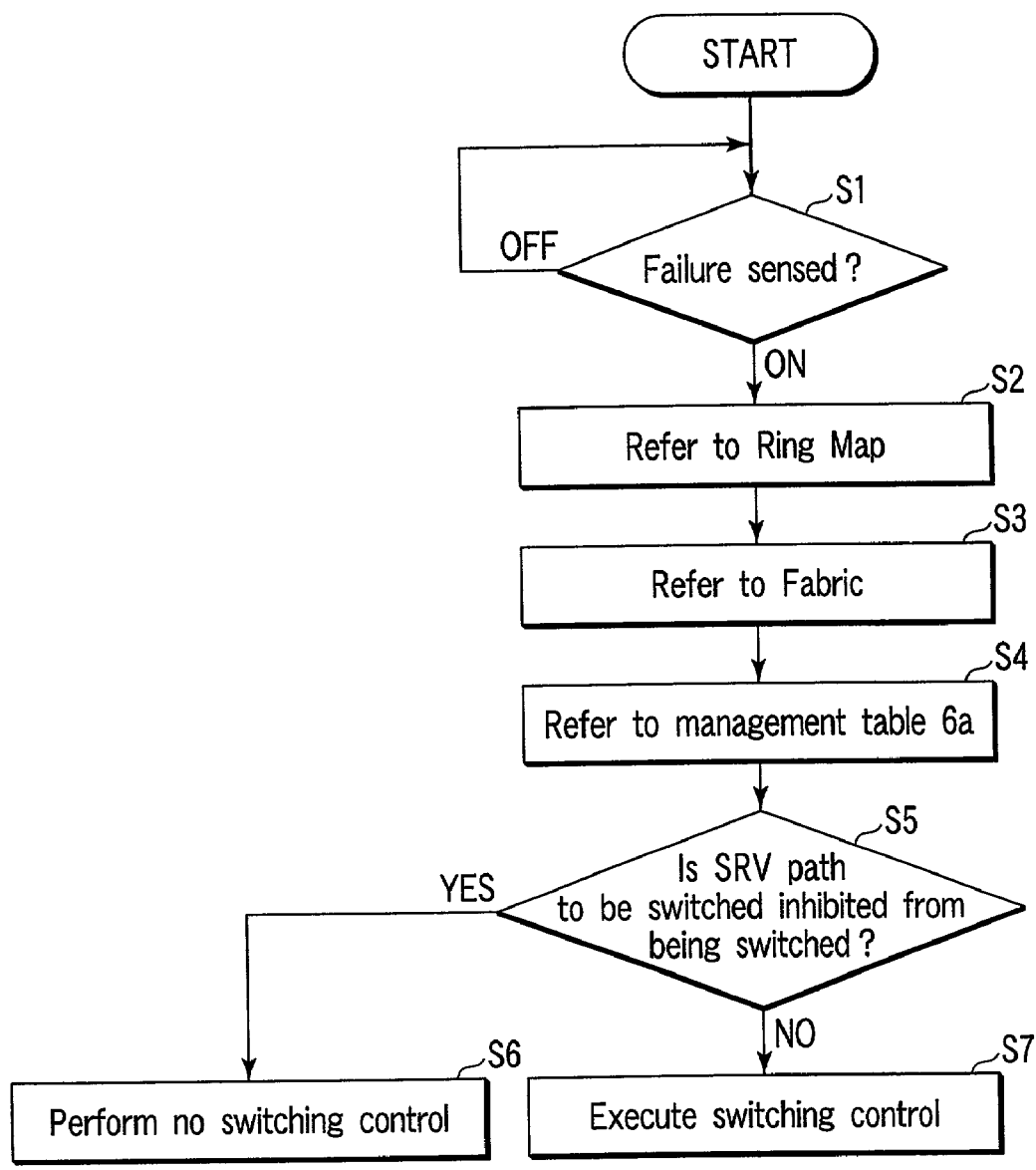
FIG. 11 is a flowchart to help explain the procedure for processing in the APS control section 5a in the embodiment of the present invention.

Next, the procedure of processing at the APS control section 5a in the embodiment will be explained by reference to FIG. 11. When a failure has sensed at step S1 of FIG. 11, the APS control section 5a refers to the Ring Map in the memory unit 6 at step S2. At step s3, it refers to the Fabric. The procedure up to this point is known.

The APS control section 5a refers to the management table 6a in the memory unit 6 at step S4. On the basis of the result, the APS control section 5a judges at step S5 whether the service path to be switched is inhibited from switching. If the result of the judgment has shown that the service path is inhibited from switching (Yes), the procedure goes to step S6, where the APS control section 5a does not carry out the switching process. On the other hand, if at step S5, the service path is not inhibited from switching (No), the procedure proceeds to step S7, where the APS control section 5a performs the switching process.

The embodiment is characterized by the processes at steps S4, S5, S6, and S7. These steps show the newly proposed procedure in the present invention.

<Explanation about Concatenation Path>

Furthermore, for instance, the inhibition of APS is sometimes set using each transmission path as a unit. In those examples, a path to be set is often set only in one time slot. In the SDH transmission system, however, a path obtained by concatenating a plurality of adjacent time slots is defined as a concatenation path. For instance, if the basic unit of a path is AU-4 (Administration Unit 4), AU-4 4c obtained by concatenating four AU-4s or AU-4 16c obtained by concatenating 16 AU-4s are available.

The idea of the present invention may be applied to this type of path. That is, when a concatenation path is set in an embodiment where setting is done using a path as a unit, the inhibition of APS is set in all the time slots forming the path. That is, when a transmission path obtained by concatenating a plurality of adjacent time slots, that is, an object in which a concatenation path has been specified, is included, the switching inhibit control section 5b is caused to inhibit the APS control section 5a from detouring the service traffic set in the concatenation path to the protection path PL.

Of course, when a concatenation path exists in either the service line SL or the protection line PL, the above setting may be done.

More specifically, it is assumed that, for instance, a concatenation path of AU-4 4c exists in the time slots TS1 to TS4 in the SRV system between node B and node D and a path of AU-4 (not a concatenation path) exists in the time slot TS2 in the PRT system between node B and node D. At this time, the inhibition of APS is assumed to be set in the P/T traffic flowing through the path in the PRT system. Then, since the concatenation path is present in the corresponding time slot in the SRV system, ring switching and span switching are inhibited in TS1 to TS4 in any transmission line in both of the SRV and PRT systems.

Conversely, it is assumed that a concatenation path of AU-4 4c exists in the time slots TS1 to TS4 in the PRT system between node B and node D and a path of AU-4 (not a concatenation path) exists in the time slot TS2 in the SRV system between node B and node D. At this time, when the inhibition of APS is set in the service traffic flowing through the path in the SRV system, since the concatenation path is present in the corresponding time slot in the PRT system, ring switching and span switching are inhibited in TS1 to TS4 in any transmission line in both of the SRV and PRT systems.

When doing the above setting, the operator may select a path by clicking a concatenation path or a non-concatenation path.

To summarize the above, the switching can be inhibited in units of paths in two modes. In one mode, the target path in which the switching should be inhibited belongs to one time slot. In the other mode, the target path is composed of a plurality of time slots.

<Embodiment to Help Explain the Inhibition of Switching by APS is Set in the Service Line SL on a Segment Basis>

(First Embodiment)

Hereinafter, a first embodiment of the present invention will be explained. In this embodiment, the inhibition of switching by APS is set in the service line SL on a segment basis.

In the first embodiment, the specifying section 110a specifies the service line SL in a segment arbitrarily. The management table creating section 110b creates a management table 6a which means that the APS control section 5a is inhibited from detouring to the protection line PL the service traffic set in the transmission path including the resource specified at the specifying section 110a.

Figure 13:
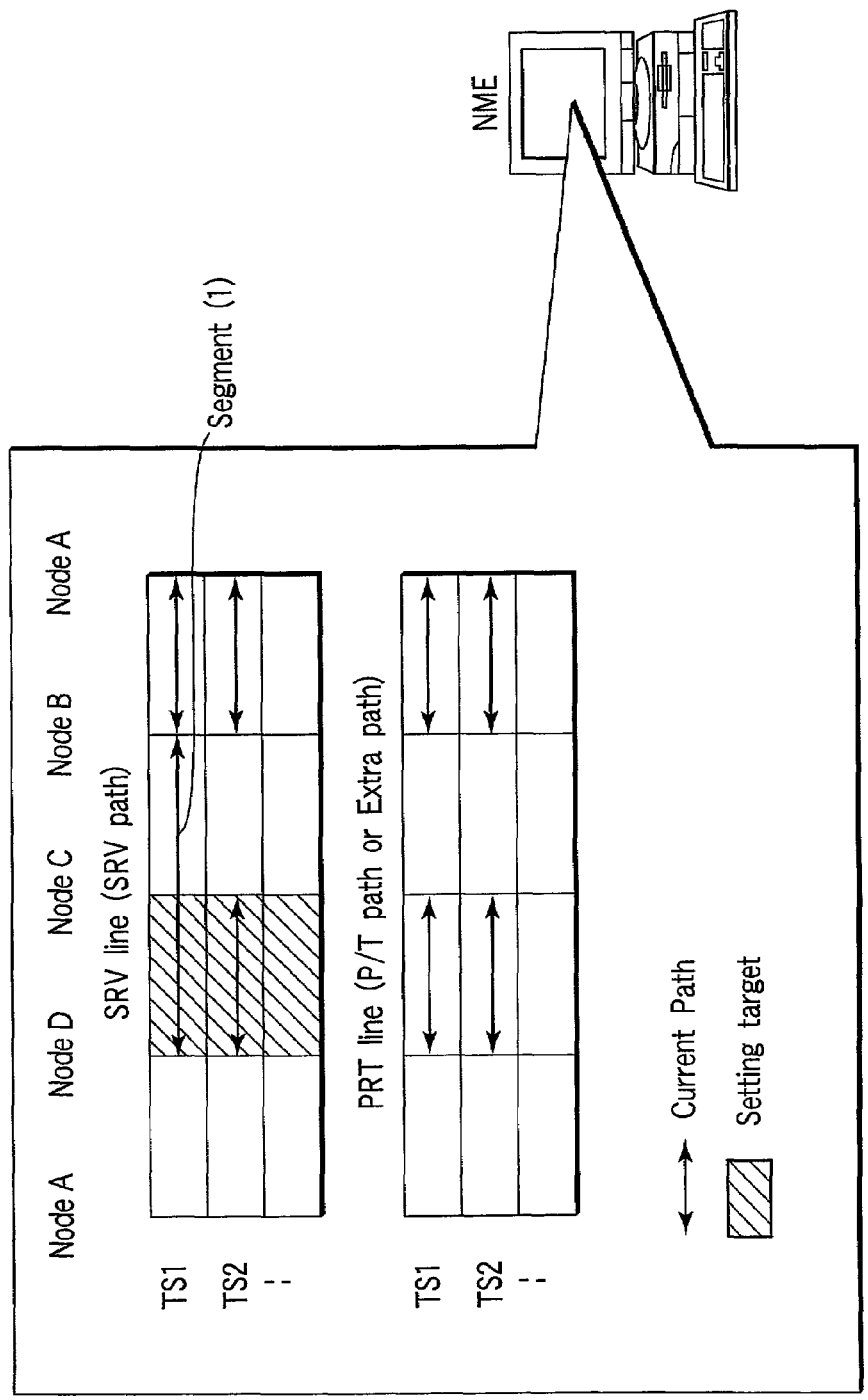
FIG. 13 is an illustration to help explain the operation of the operator in a first embodiment of the present invention.

FIG. 13 is an illustration to help explain the operation the operator performs using the display section 25 of the network management equipment 10 in the first embodiment. The operation is carried out by a clicking operation with, for example, the mouse.

As shown in FIG. 13, the operator specifies a segment of the SRV system on the screen of the display section display section 25. Here, the working-system segment (segment ①) between node C and node D is specified. After this operation, a set request message is sent to each of node A to node D.

Figure 14:
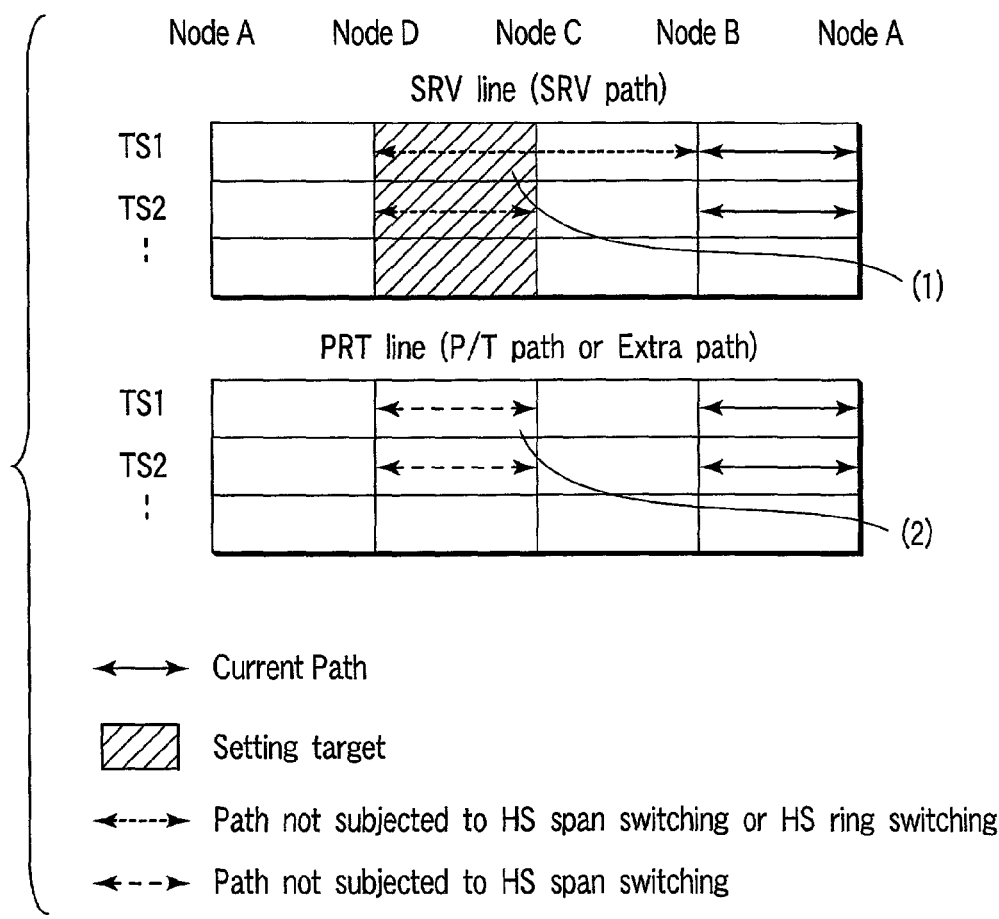
FIG. 14 shows the contents of the setting at node A to node D in the first embodiment.

Then, the set request message is received at each of node A to node D. After the necessary processes have been carried out, the setting as shown in FIG. 14 is realized. FIG. 14 shows a case where the setting of the inhibition of switching is expanded only in the SRV system. The restoration of traffic (indicated by reference numeral ①) in the segment in which the inhibition of switching by APS has been set is suppressed. This prevents P/T traffic (indicated by reference numeral ②) from being dropped by span switching related to traffic ①. As a result, the priority of the service traffic becomes equal to that of the P/T traffic.

FIG. 12 shows the management table 6a of the first embodiment. As seen from this figure, span switching and ring switching are inhibited throughout all the time slots on the East side of node D and the West side of node C.

Next, concrete examples of switching control by APS with the above setting will be explained using four cases.

<Case 1-1>

Figure 15:
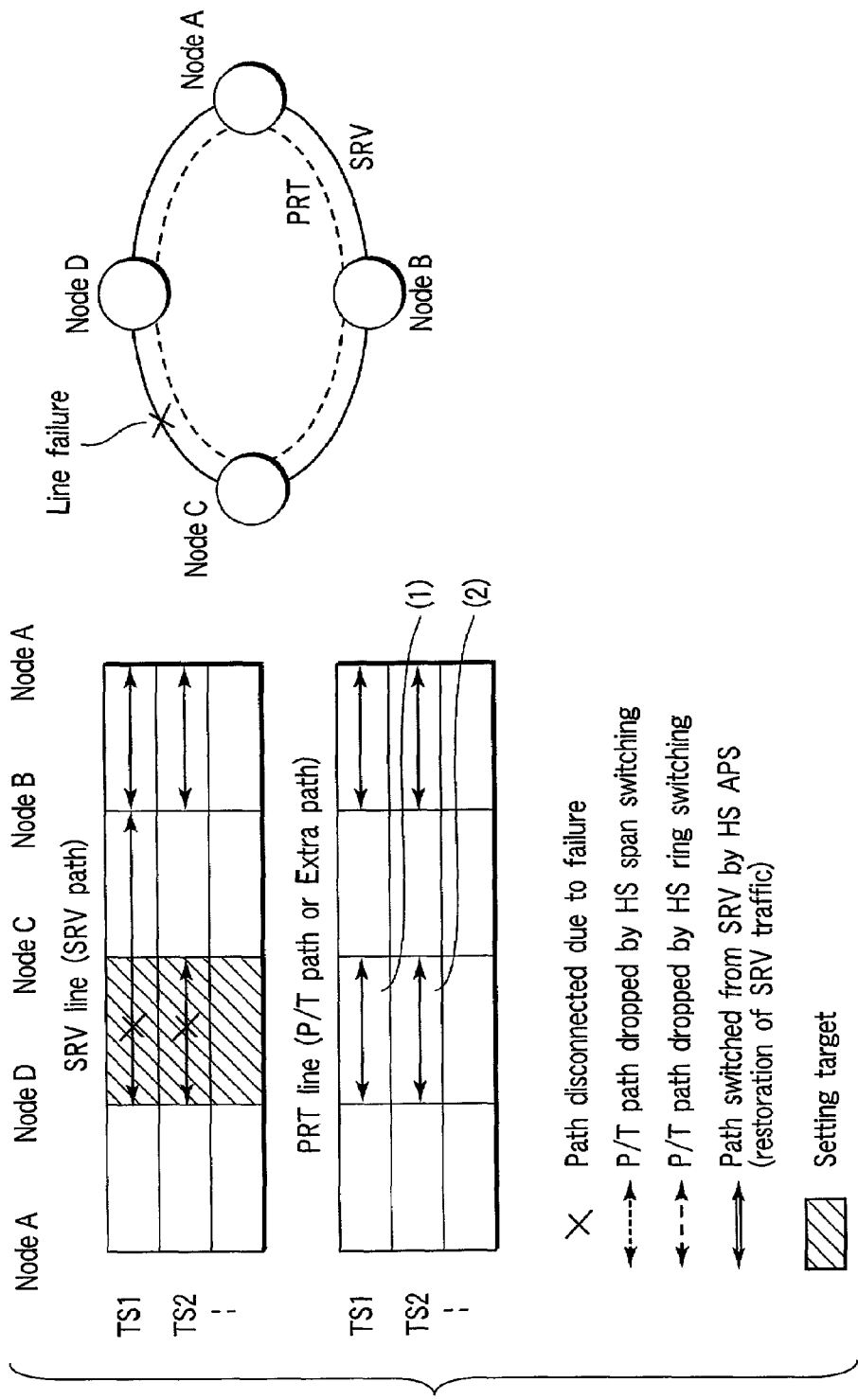
FIG. 15 shows the mode of switching when a failure has occurred in the service line SL between node C and node D in the first embodiment.

In this case, consider a case where a failure has occurred in the service line SL between node C and node D as shown in FIG. 15. In this case, HS span switching is going to be carried out. However, since the switching process in segment CD is inhibited, the restoration of the service traffic by span switching is not carried out. Consequently, neither the traffic (path) indicated by reference numeral ① nor that indicated by reference numeral ② is dropped.

In the figures below, both of a failure and a path cut off by the failure are represented by the symbol "X" as shown in FIG. 15. A P/T path dropped by HS span switching is represented by a dotted line. A P/T path dropped by HS ring switching is represented by a broken line. A path whose transmission route is changed from the SRV system to the PRT system as a result of HS APS is represented by a double line.

<Case 1-2>

Figure 16:
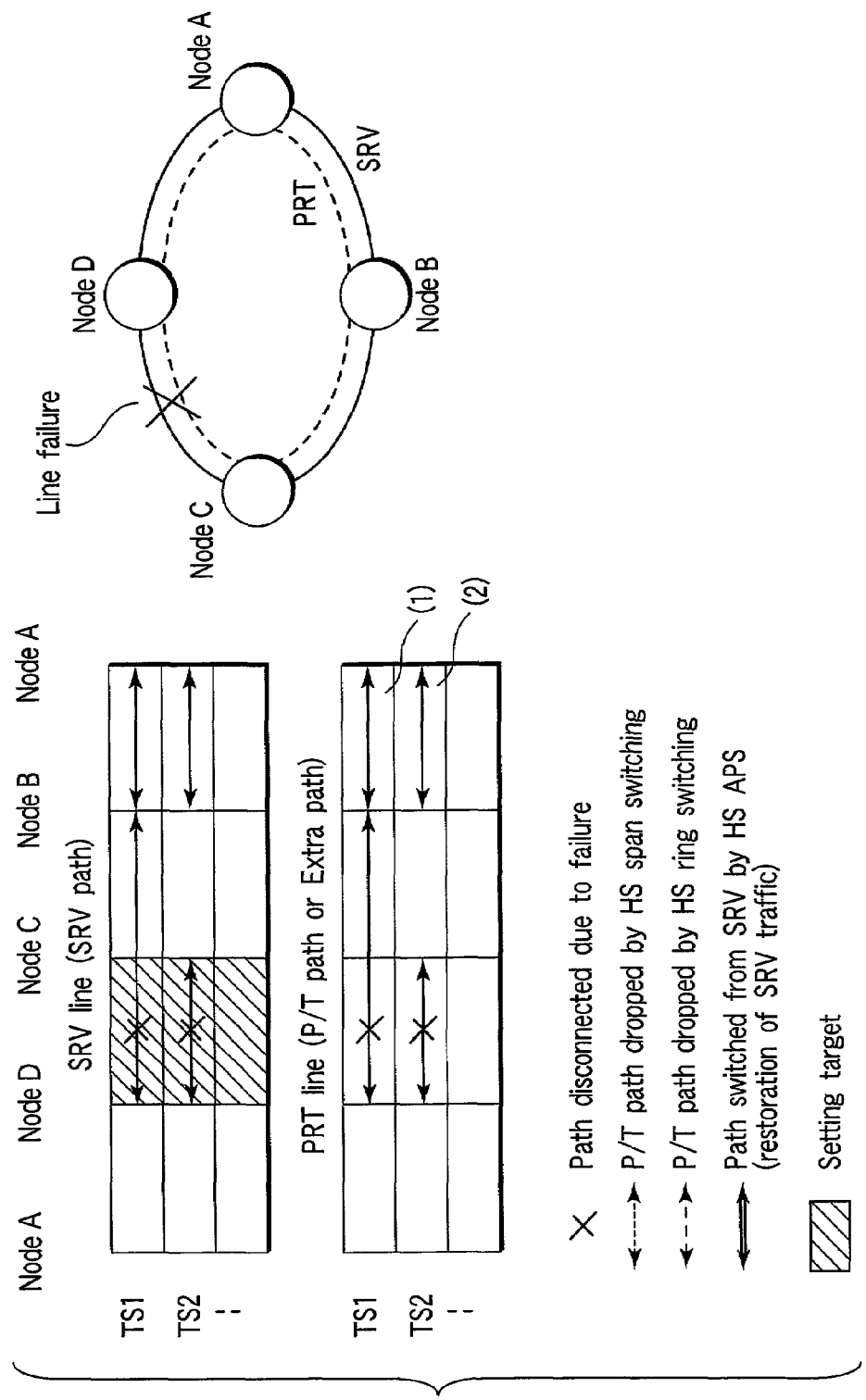
FIG. 16 shows the mode of switching when a failure has occurred in the service line SL and protection line PL between node C and node D in the first embodiment.

In case 1-2, consider a case where a failure has occurred in the service line SL and protection line between node C and node D as shown in FIG. 16. At this time, HS ring switching is going to be effected. However, since the switching process in segment CD is inhibited, the restoration of the traffic related to the segment is inhibited. That is, the service traffic is not resorted by ring switching. Consequently, neither the traffic (path) indicated by reference numeral ① nor that indicated by reference numeral ② is dropped.

<Case 1-3>

Figure 17:
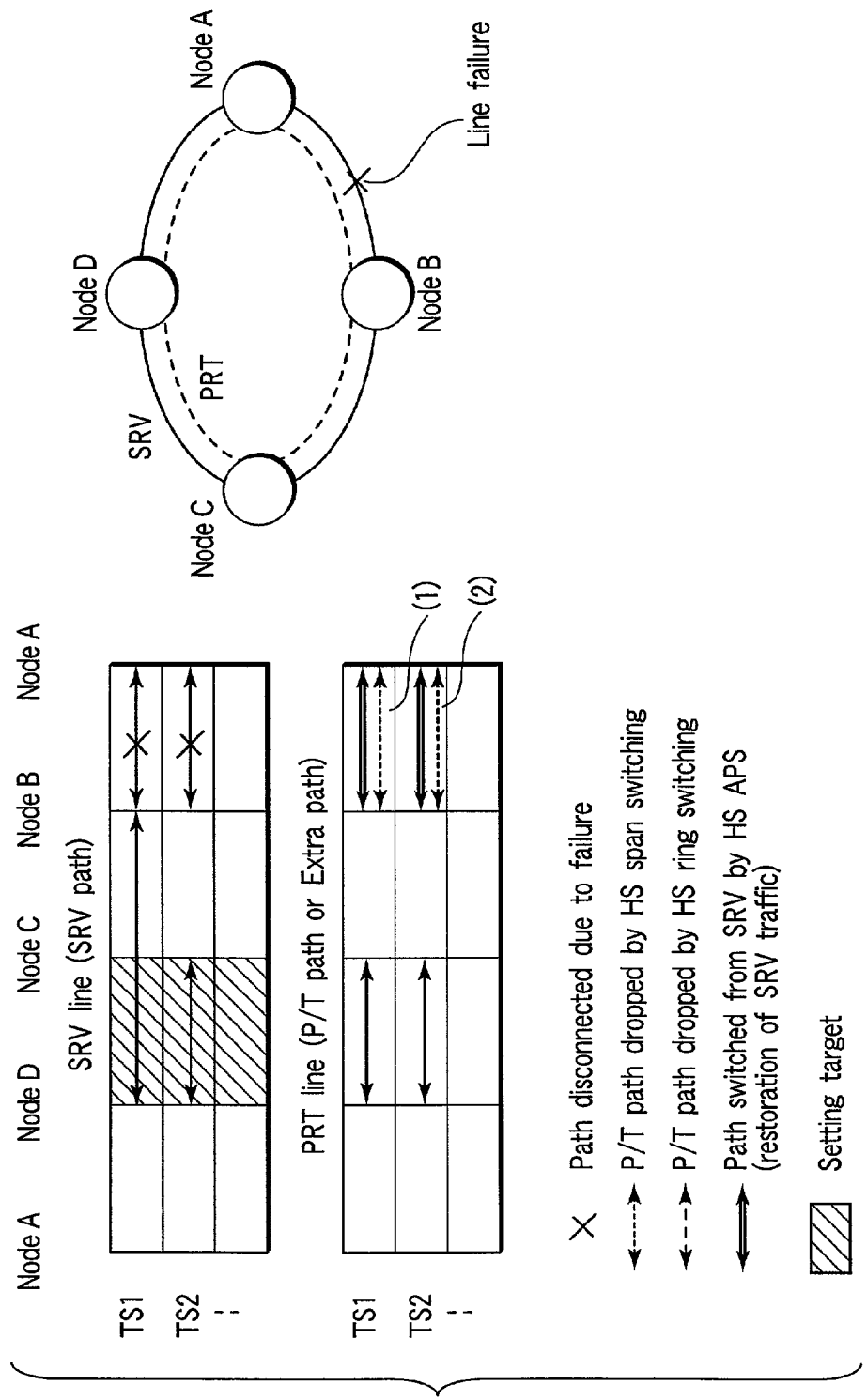
FIG. 17 shows the mode of switching when a failure has occurred in the service line SL between node A and node B in the first embodiment.

In case 1-3, consider a case where a failure has occurred in the service line SL between node A and node B as shown in FIG. 17. At this time, APS switching related to segment AB is not inhibited. Therefore, HS span switching is effected, which causes the P/T traffic in segment AB to be dropped. The service traffic in the segment is restored to the PRT system, thereby finally realizing the states shown in ① and ②.

<Case 1-4>

Figure 18:
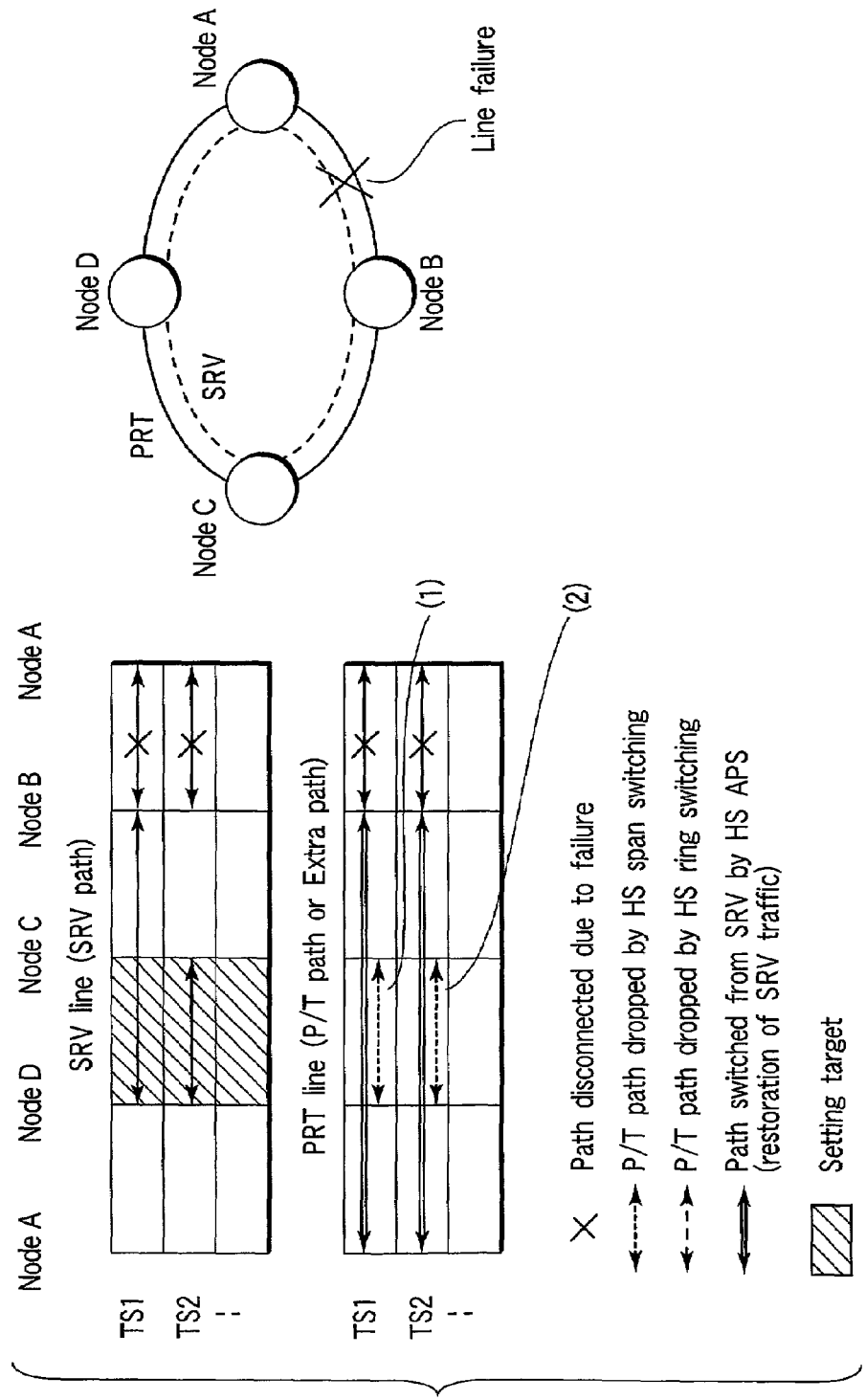
FIG. 18 shows the mode of switching when a failure has occurred in the service line SL and protection line PL between node A and node B in the first embodiment.

In case 1-4, consider a case where a failure has occurred in the service line SL and protection line PL between node A and node B as shown in FIG. 18. At this time, APS switching related to segment AB is not inhibited. Therefore, HS ring switching is effected, which causes the P/T traffic in a segment other than segment AB to be dropped. The service traffic in segment AB is restored to the PRT system, thereby finally realizing the states shown in ① and ②.

<Embodiment to Help Explain the Inhibition of Switching by APS is Set in the Service Line SL on a Transmission Path Basis>

(Second Embodiment)

Next, a second embodiment of the present invention will be explained. In this embodiment, the inhibition of switching by APS is set in the service line SL on a transmission path basis.

In the second embodiment, the specifying section 110a specifies the service line SL in a transmission path arbitrarily. The management table creating section 110b creates a management table 6a which means that the APS control section 5a is inhibited from detouring to the protection line PL the service traffic set in the transmission path specified at the specifying section 110a.

Figure 19:
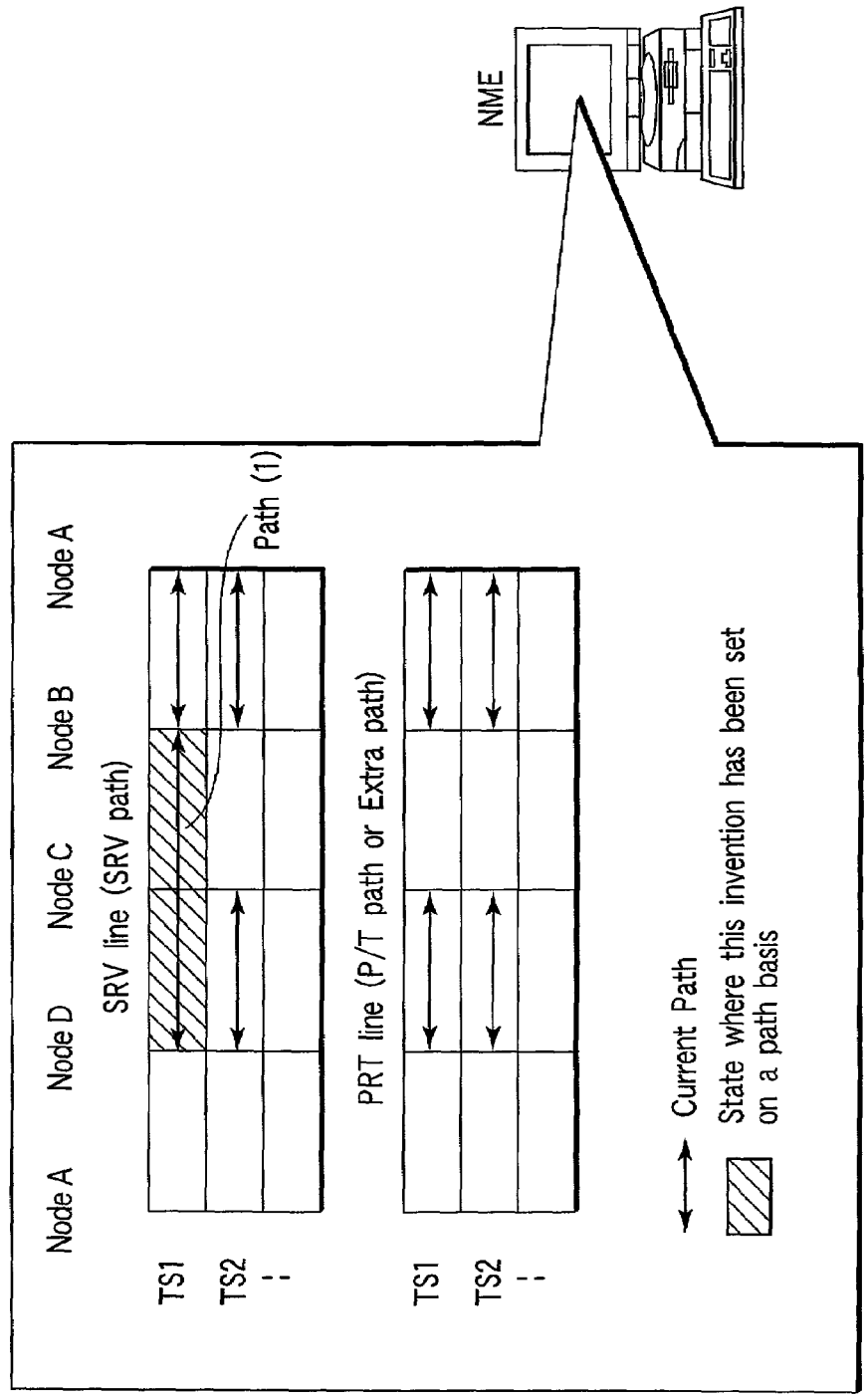
FIG. 19 is an illustration to help explain the operation of the operator in a second embodiment of the present invention.

FIG. 19 is an illustration to help explain the operation the operator performs using the display section 25 of the network management equipment 10 in the second embodiment. As shown in FIG. 19, the operator specifies an arbitrary transmission path in the SRV system on the screen of the display section 25. Here, the path in time slot 1 (indicated by reference numeral ①) between node B and node D is specified. After this operation, a set request message is sent to each of node A to node D.

Figure 20:
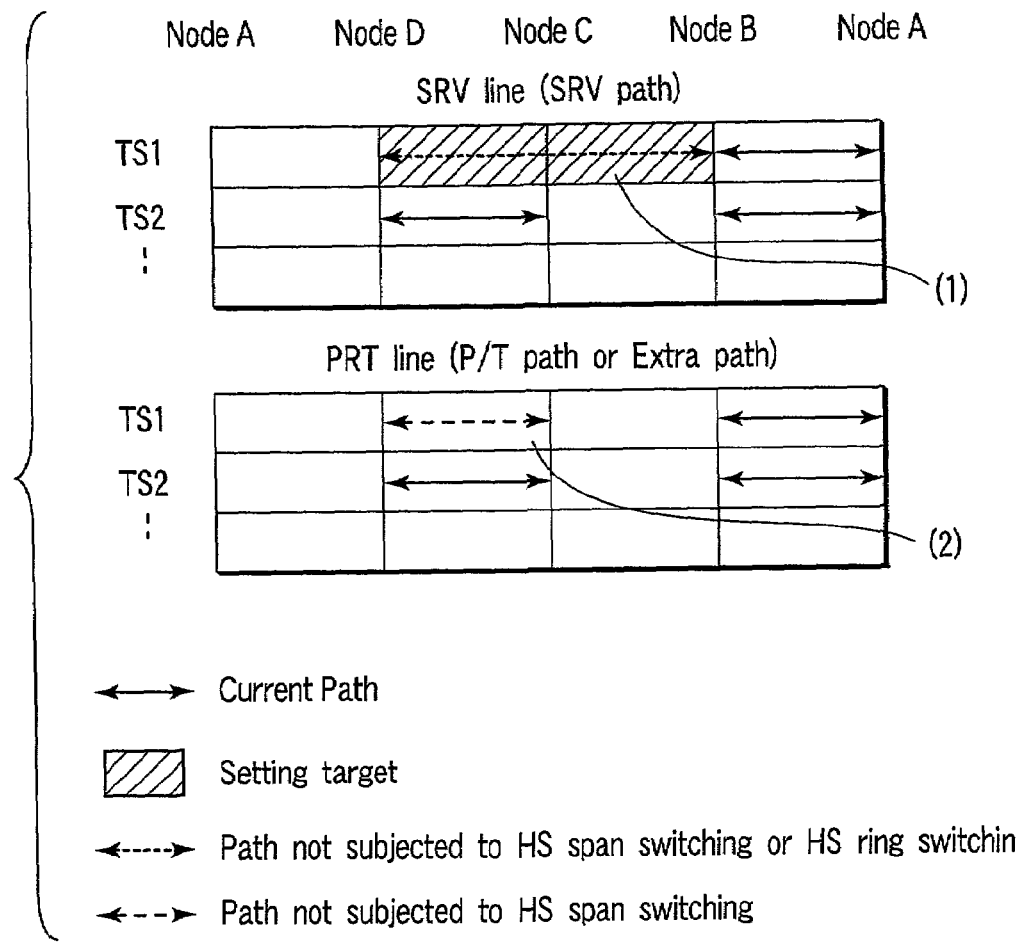
FIG. 20 shows the contents of the setting at node A to node D in the second embodiment.

Then, the set request message is received at each of node A to node D. After the necessary processes have been carried out, the setting as shown in FIG. 20 is realized. FIG. 20 shows a case where the setting of the inhibition of switching is expanded only in the SRV system. The restoration of traffic (indicated by reference numeral ①) in the path in which the inhibition of switching by APS has been set is suppressed. This prevents the P/T traffic (indicated by reference numeral ②) from being dropped by span switching related to traffic ①. As a result, the priority of the service traffic becomes equal to that of the P/T traffic.

FIG. 21 shows the management table 6a of the second embodiment. As seen from this figure, span switching and ring switching are inhibited only in time slot TS1 on the East side of node D, the East and West sides of node C, and the West side of node B.

Next, concrete examples of switching control by APS with the above setting will be explained using four cases.

<Case 2-1>

Figure 22:
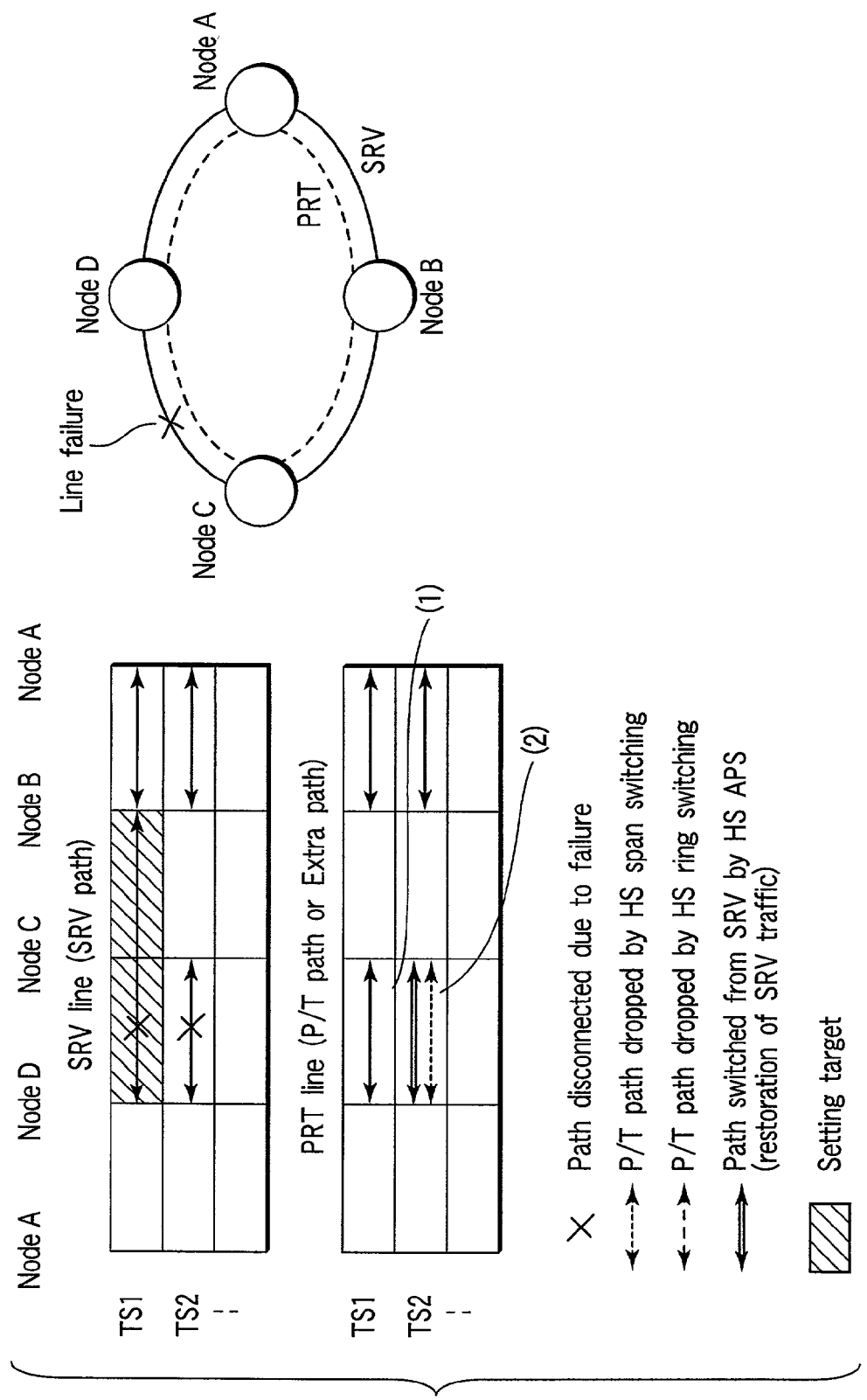
FIG. 22 shows the mode of switching when a failure has occurred in the service line SL between node C and node D in the second embodiment.

In this case, consider a case where a failure has occurred in the service line SL between node C and node D as shown in FIG. 22. At this time, the path between node B and node D in TS1 is not restored by span switching. In contrast, the path between node C and node D in TS2 is not inhibited from switching. Therefore, this path is restored to the protection line and the service traffic is switched to the PRT system. That is, the P/T path indicated by reference numeral ② is dropped, whereas the P/T traffic indicated by reference numeral ① is not dropped.

<Case 2-2>

Figure 23:
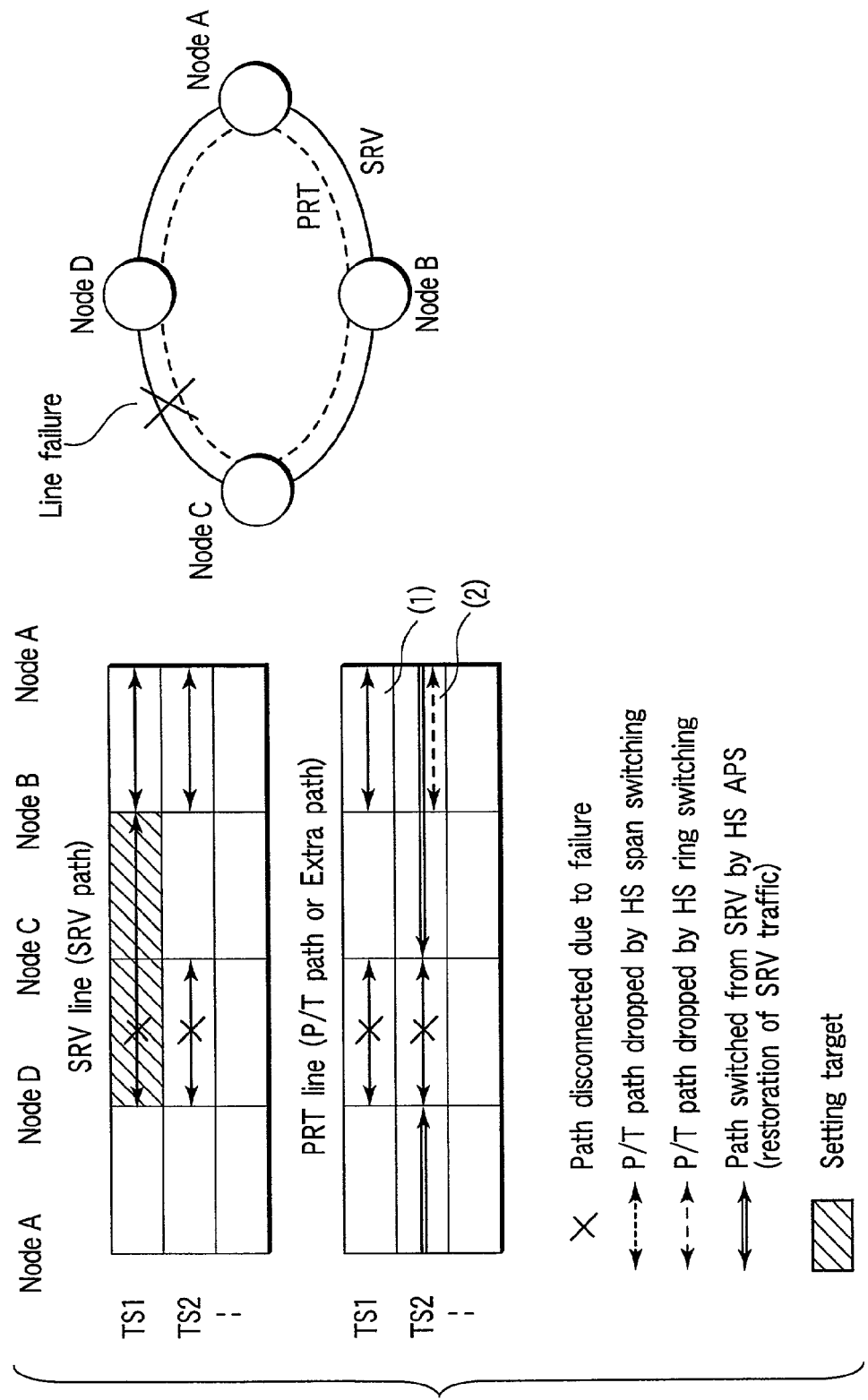
FIG. 23 shows the mode of switching when a failure has occurred in the service line SL and protection line PL between node C and node D in the second embodiment.

In case 2-2, consider a case where a failure has occurred in the service line SL and protection line PL between node C and node D as shown in FIG. 23. At this time, the service traffic in TS1 between node B and node D is not salvaged. In contrast, the service traffic in TS2 between node C and D is subjected to ring switching. That is, all the P/T traffic in a segment other than segment CD in the PRT system in TS2 is dropped. Then, the service traffic in TS2 between node C and node D is detoured to the resource in which the R/T traffic has been dropped. That is, the traffic indicated by reference numeral ① is not dropped, whereas the traffic indicated by reference numeral ② is dropped.

<Case 2-3>

Figure 24:
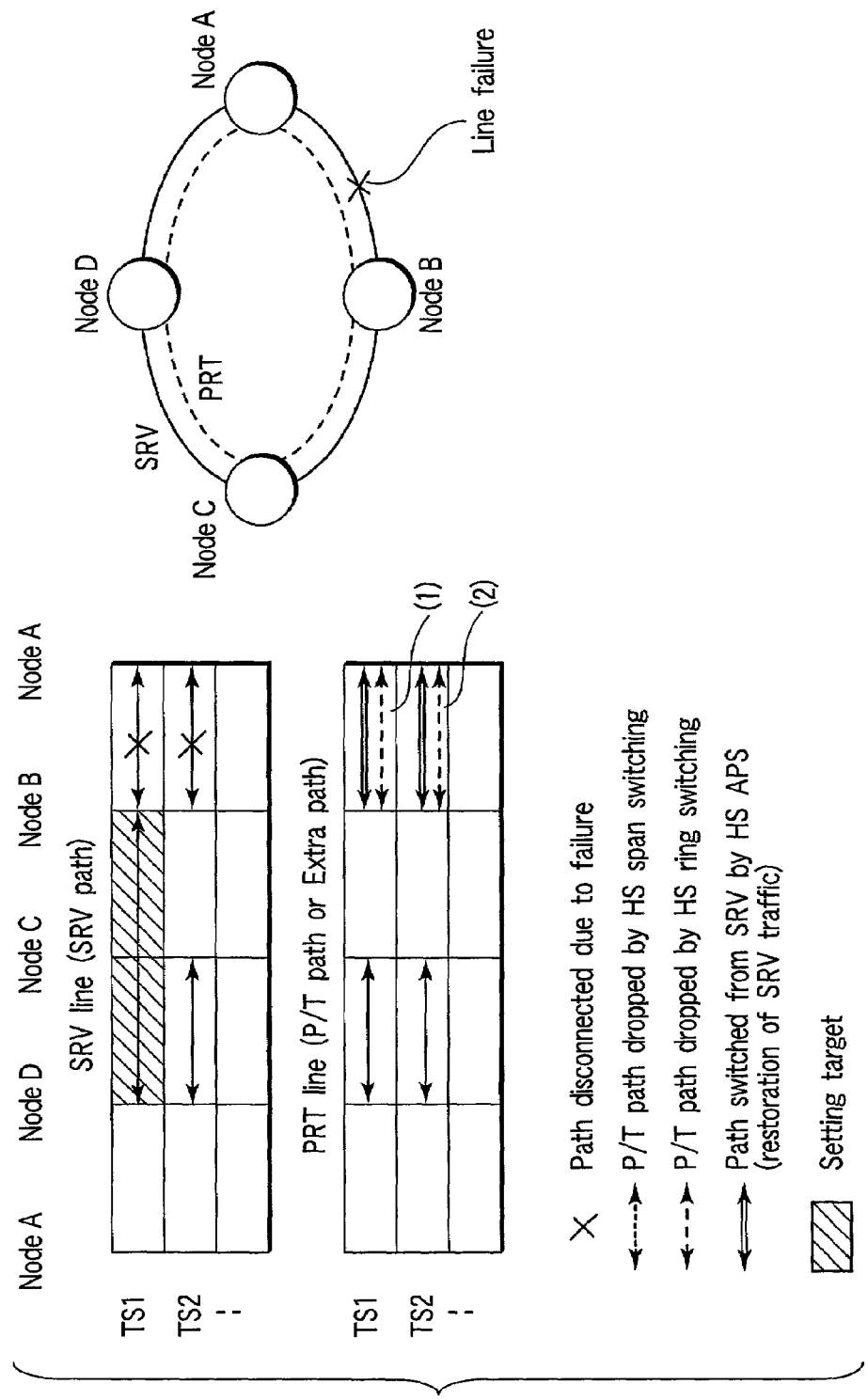
FIG. 24 shows the mode of switching when a failure has occurred in the service line SL between node A and node B in the second embodiment.

In case 2-3, consider a case where a failure has occurred in the service line SL between node A and node B as shown in FIG. 24. At this time, APS switching related to segment AB is not inhibited. Therefore, HS span switching is effected, which causes the P/T traffic in segment AB to be dropped. The service traffic in the segment is restored to the PRT system, thereby realizing the states shown by reference numerals ① and ②.

<Case 2-4>

Figure 25:
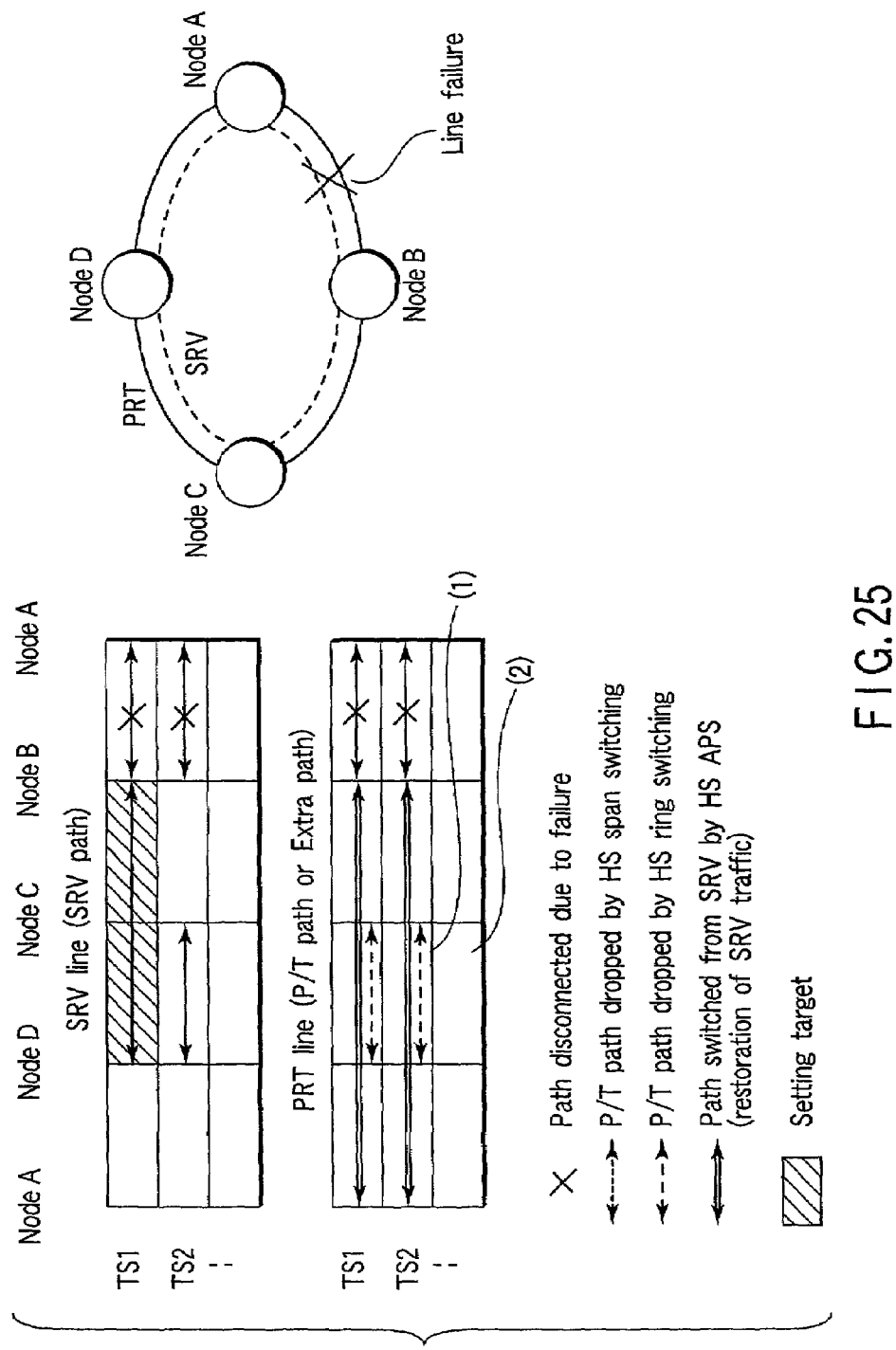
FIG. 25 shows the mode of switching when a failure has occurred in the service line SL and protection line PL between node A and node B in the second embodiment.

In case 2-4, consider a case where a failure has occurred in the service line SL and protection line PL between node A and node B as shown in FIG. 25. At this time, APS switching related to segment AB is not inhibited. Therefore, HS span switching is effected, which causes the P/T traffic in a segment other than segment AB to be dropped. The service traffic in segment AB is restored to the PRT system, thereby realizing the states shown by reference numerals ① and ②.

<Embodiment to Help Explain the Inhibition of Switching by APS is Set in the Service Line SL on a Timeslot Basis>

(Third Embodiment)

Next, a third embodiment of the present invention will be explained. In this embodiment, the inhibition of switching by APS is set in the service line SL on a time slot basis.

In the third embodiment, the specifying section 110a specifies a time slot in the service line SL arbitrarily. The management table creating section 110b creates a management table 6a which means that the APS control section 5a is inhibited from detouring to the protection line PL the service traffic set in the resource specified at the specifying section 110a.

Figure 26:
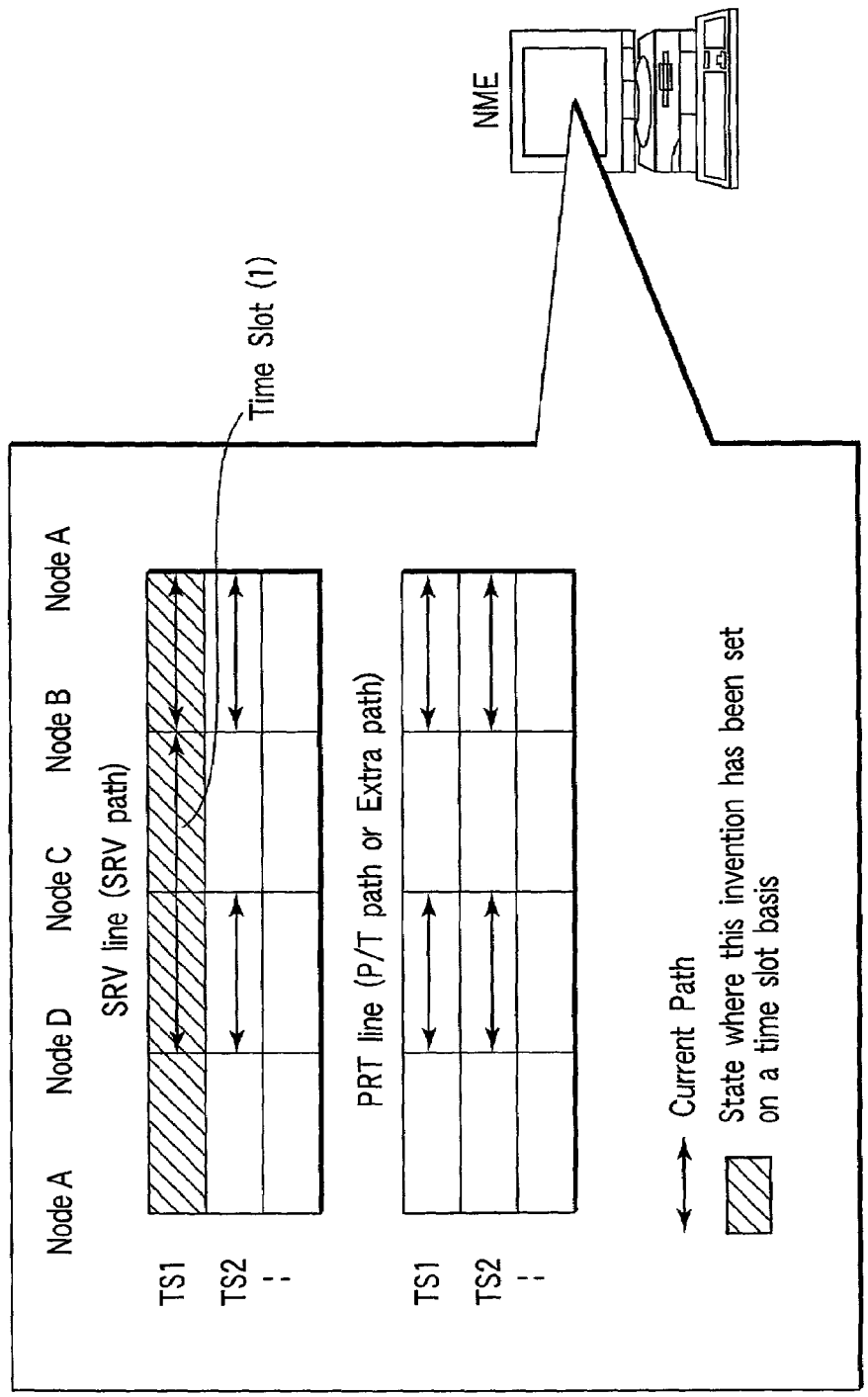
FIG. 26 is an illustration to help explain the operation of the operator in a third embodiment of the present invention.

FIG. 26 is an illustration to help explain the operation the operator performs using the display section 25 of the network management equipment 10 in the third embodiment. As shown in FIG. 26, the operator specifies an arbitrary time slot in the SRV system on the screen of the display section 25. Here, time slot 1 is specified. After this operation, a set request message is sent to each of node A to node D.

Figure 27:
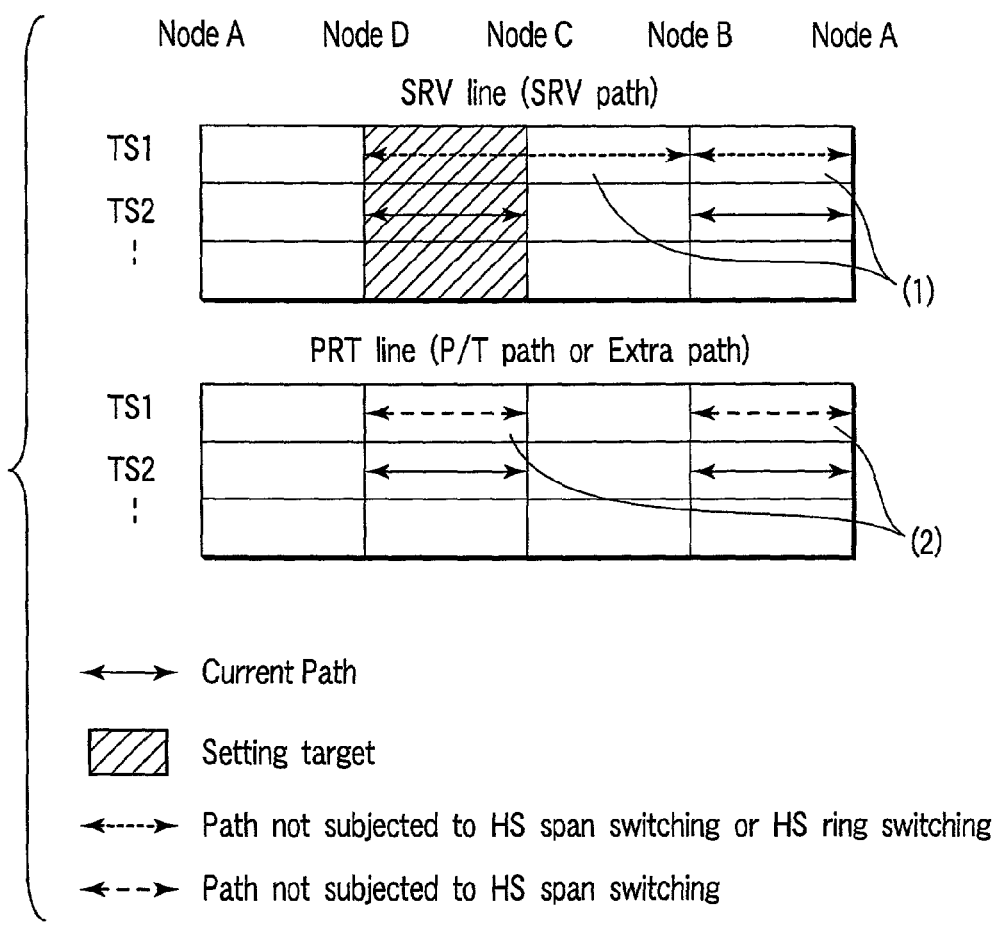
FIG. 27 shows the contents of the setting at node A to node D in the third embodiment.

Then, the set request message is received at each of node A to node D. After the necessary processes have been carried out, the setting as shown in FIG. 27 is realized. FIG. 27 shows a case where the setting of the inhibition of switching is expanded only in the SRV system. The restoration of traffic (indicated by reference numeral ①) in the time slot in which the inhibition of switching by APS has been set is suppressed. This prevents the P/T traffic (indicated by reference numeral ②) from being dropped by span switching related to traffic ①. As a result, the priority of the service traffic becomes equal to that of the P/T traffic.

FIG. 28 shows the management table 6a of the third embodiment. As seen from this figure, span switching and ring switching are inhibited only in TS1 on the East side and West side of all of the nodes A to D.

Next, concrete examples of switching control by APS with the above setting will be explained using four cases.

<Case 3-1>

Figure 29:
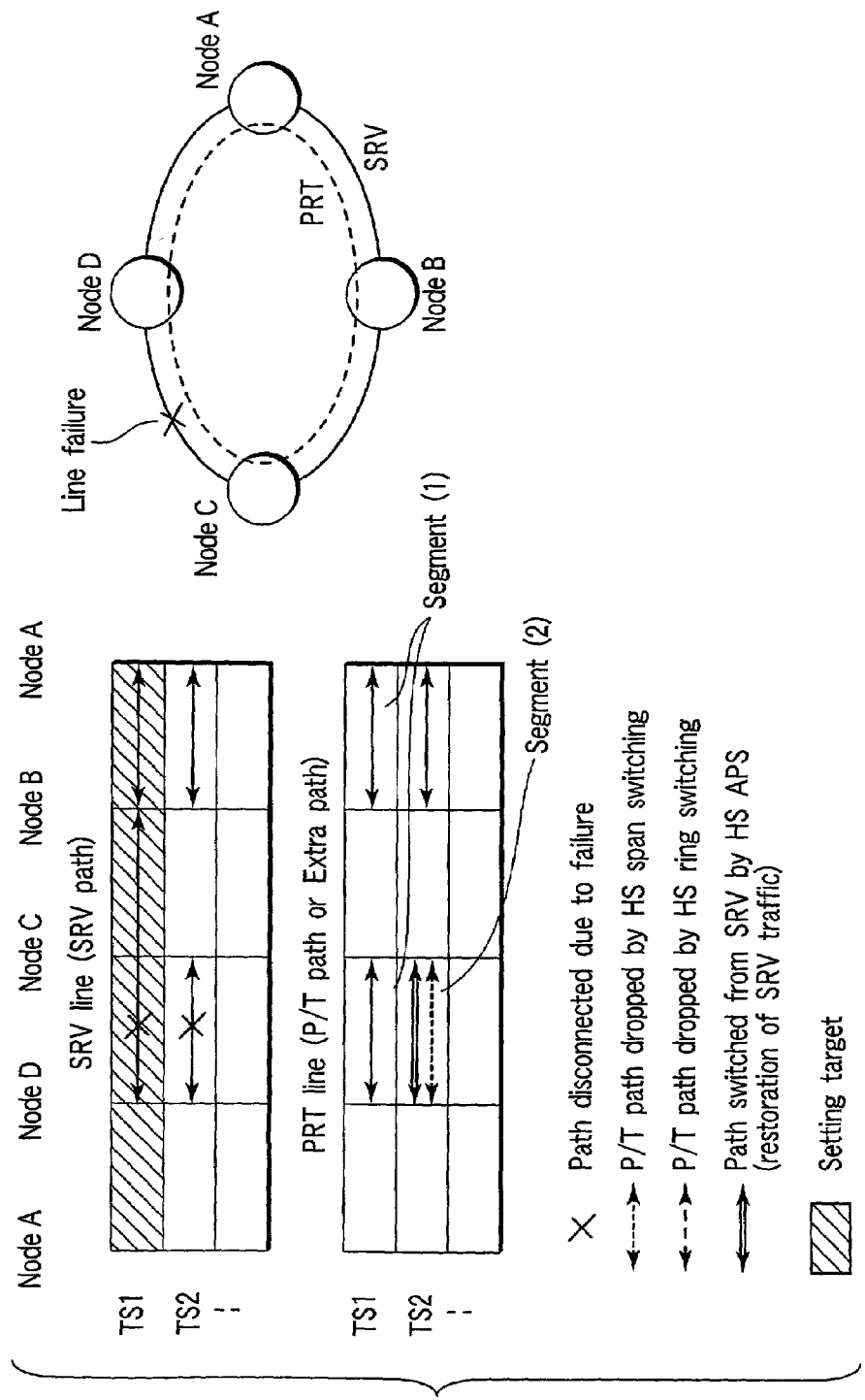
FIG. 29 shows the mode of switching when a failure has occurred in the service line SL between node C and node D in the third embodiment.

In this case, consider a case where a failure has occurred in the service line SL between node C and node D as shown in FIG. 29. At this time, the service traffic flowing through the path in TS1 is not restored by span switching. In contrast, the path between node C and node D in TS2 is not inhibited from switching. Therefore, span switching is done, thereby switching the transmission route of the service traffic to the PRT system. That is, the P/T path indicated by reference numeral ② is dropped, whereas the P/T traffic indicated by reference numeral ① is not dropped.

<Case 3-2>

Figure 30:
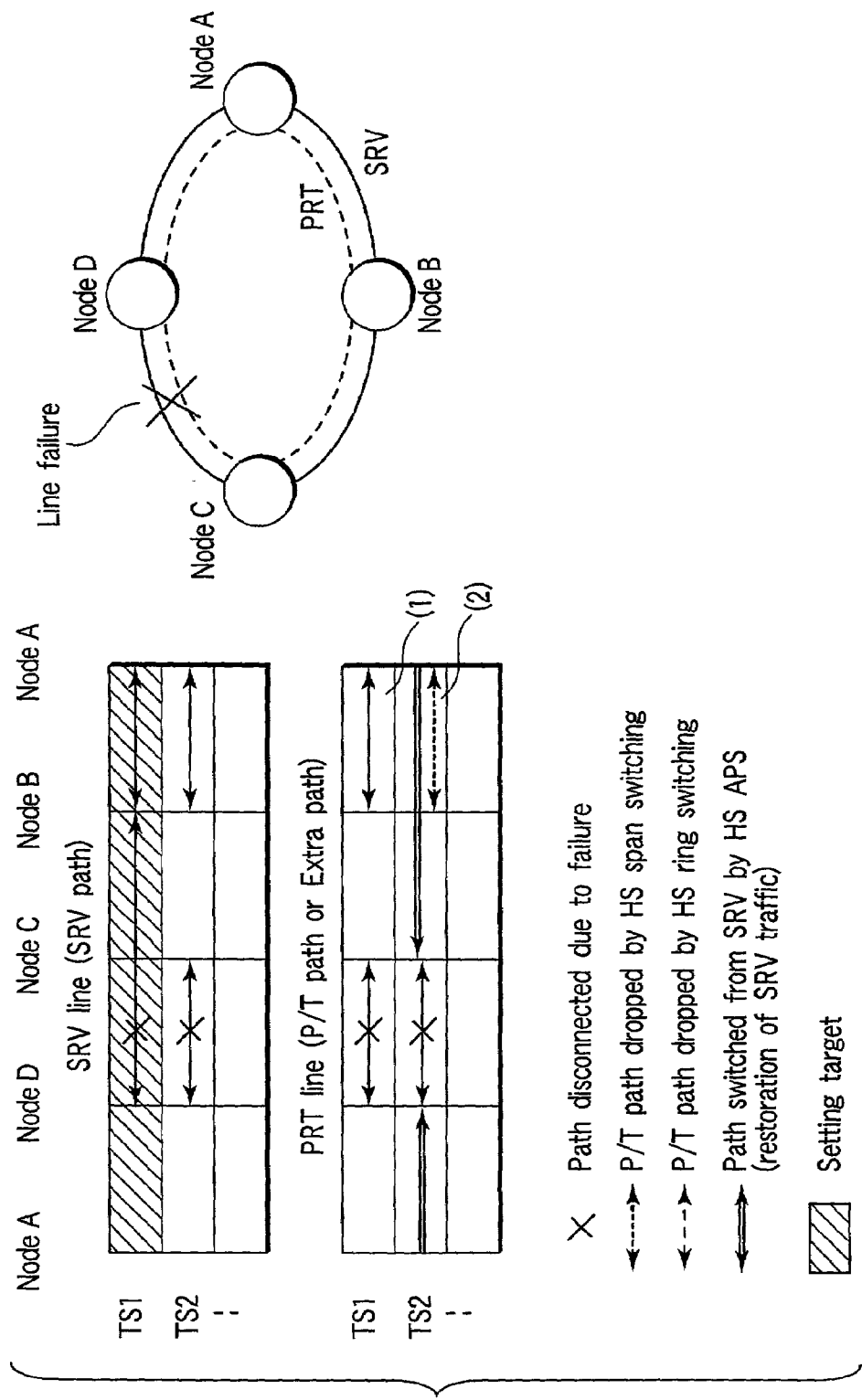
FIG. 30 shows the mode of switching when a failure has occurred in the service line SL and protection line PL between node C and node D in the third embodiment.

In case 3-2, consider a case where a failure has occurred in the service line SL and protection line PL between node C and node D as shown in FIG. 30. At this time, the service traffic in TS1 is not salvaged. In contrast, the service traffic in TS2 between node C and D is salvaged by ring switching. All the P/T traffic in a segment other than segment CD in the PRT system in TS2 is dropped. Then, the service traffic in TS2 between node C and node D is detoured to the resource in which the R/T traffic has been dropped. That is, the traffic indicated by reference numeral ① is not dropped, whereas the traffic indicated by reference numeral ② is dropped.

<Case 3-3>

Figure 31:
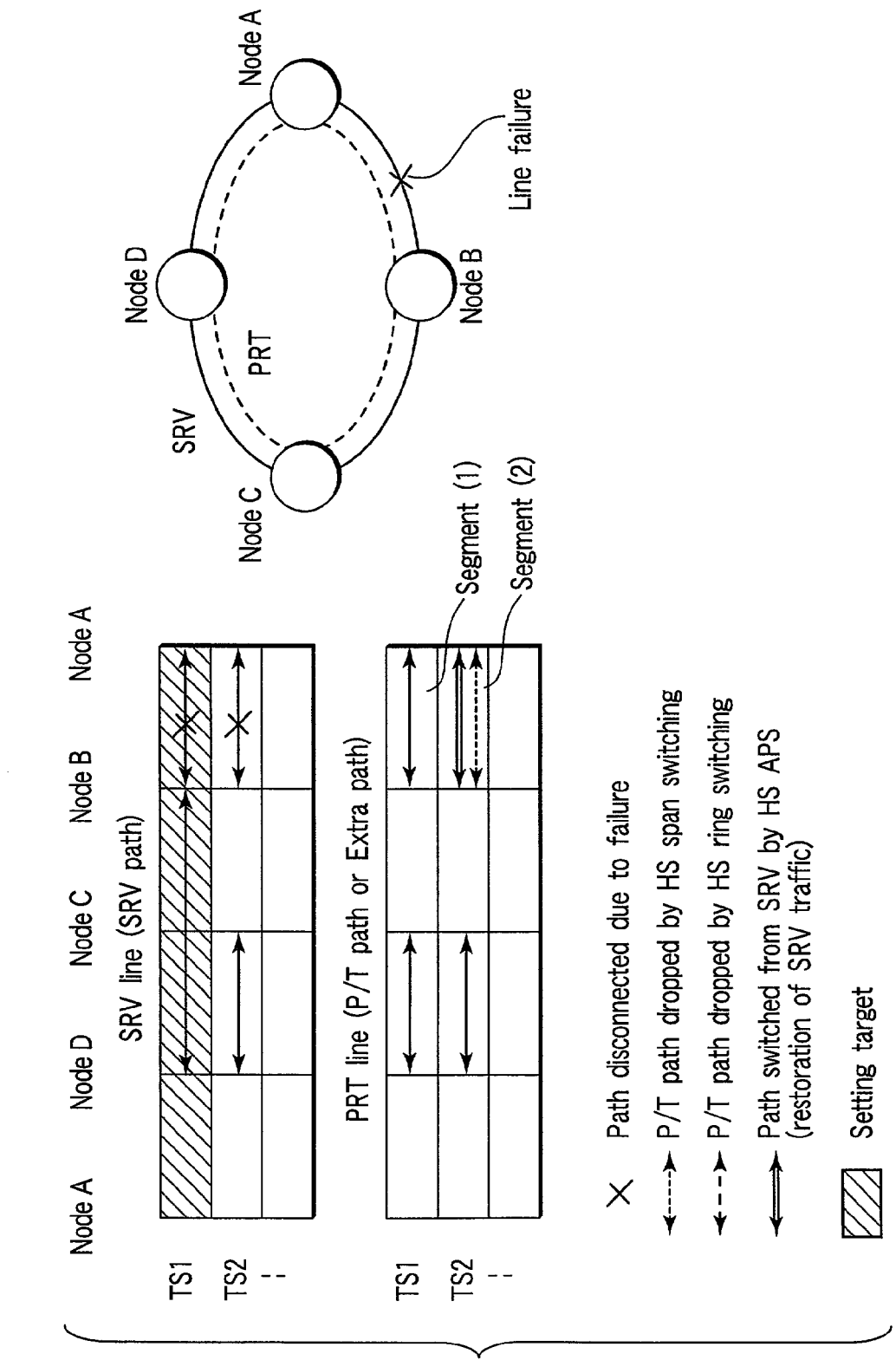
FIG. 31 shows the mode of switching when a failure has occurred in the service line SL between node A and node B in the third embodiment.

In case 3-3, consider a case where a failure has occurred in the service line SL between node A and node B as shown in FIG. 31. At this time, the path in TS1 is not restored by span switching. In contrast, APS switching related to the path in TS2 is not inhibited. Therefore, HS span switching is done in TS2, which causes the P/T traffic in TS2 in segment AB to be dropped. This causes the service traffic in TS2 in this segment to be restored to the PRT system, thereby realizing the states shown by reference numerals ① and ②.

<Case 3-4>

In case 3-4, consider a case where a failure has occurred in the service line SL and protection line PL between node A and node B as shown in FIG. 32. At this time, the service traffic in TS1 is not salvaged. In contrast, the service traffic in TS2 in segment AB is subjected to APS switching. Therefore, HS span switching is effected, which causes the P/T traffic in a segment other than segment AB to be dropped in TS2. As a result, the service traffic in TS2 in segment AB is restored to the PRT system, thereby realizing the states shown by reference numerals ① and ②. That is, the P/T traffic indicated by reference numeral ② is dropped, whereas the P/T traffic indicated by reference numeral ① is not dropped.

<Embodiment to Help Explain the Inhibition of Switching by APS is Set in the Service Line SL on a Smallest Unit in the Transmission Resource Basis>

(Fourth Embodiment)

Next, a fourth embodiment of the present invention will be explained. In this embodiment, the inhibition of switching by APS is set in the service line SL on a smallest unit in the transmission resource basis.

In the fourth embodiment, the specifying section 110a specifies the service line SL in a smallest unit arbitrarily. The management table creating section 110b creates a management table 6a which means that the APS control section 5a is inhibited from detouring to the protection line PL the service traffic set in the smallest unit specified at the specifying section 110a.

Figure 33:
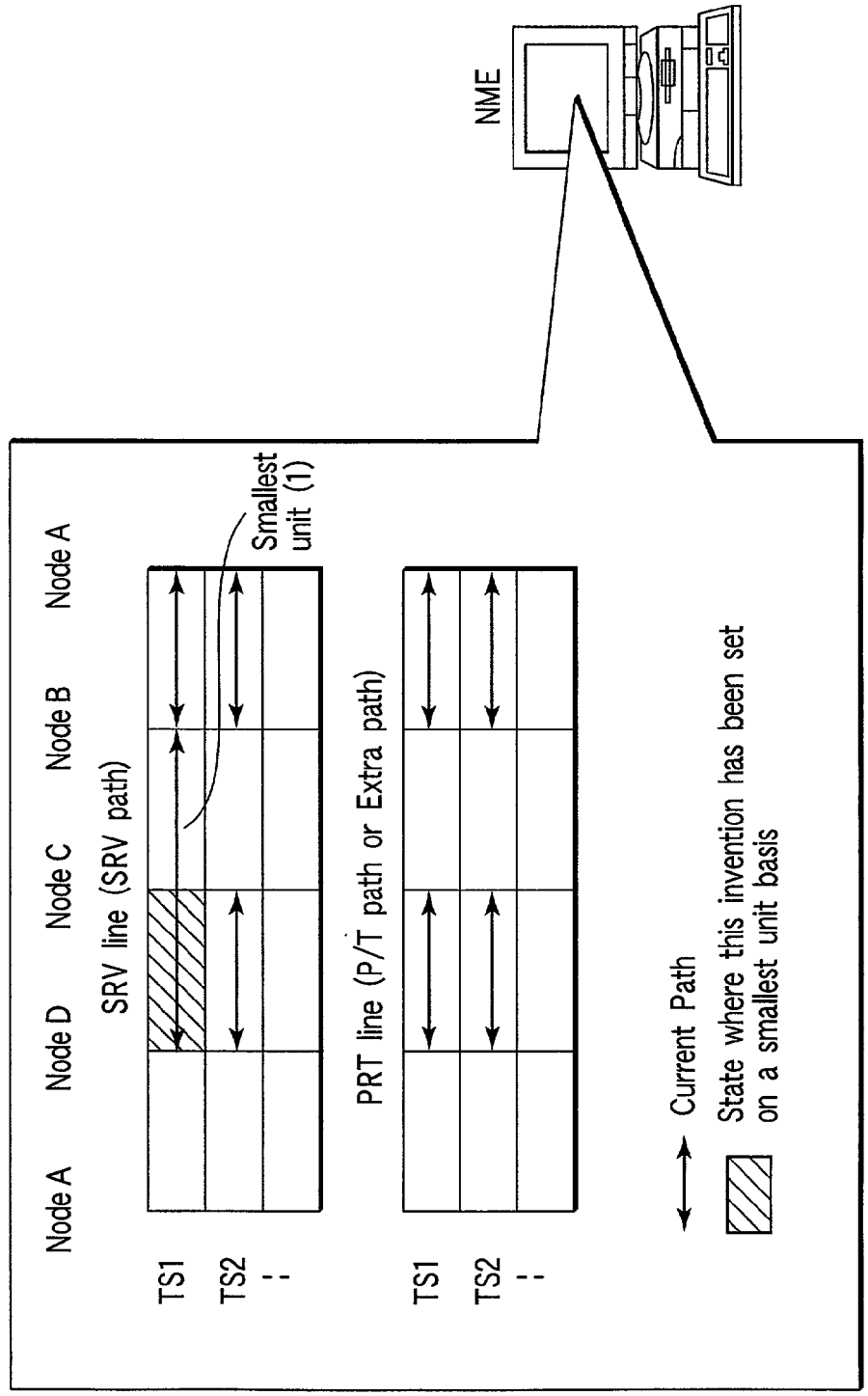
FIG. 33 is an illustration to help explain the operation of the operator in a fourth embodiment of the present invention.

FIG. 33 is an illustration to help explain the operation the operator performs using the display section 25 of the network management equipment 10 in the fourth embodiment.

As shown in FIG. 33, the operator specifies an arbitrary transmission path in the SRV system on the screen of the display section 25. Here, the path in time slot 1 (indicated by reference numeral ①) between node B and node D is specified. After this operation, a set request message is sent to each of node A to node D.

Figure 34:
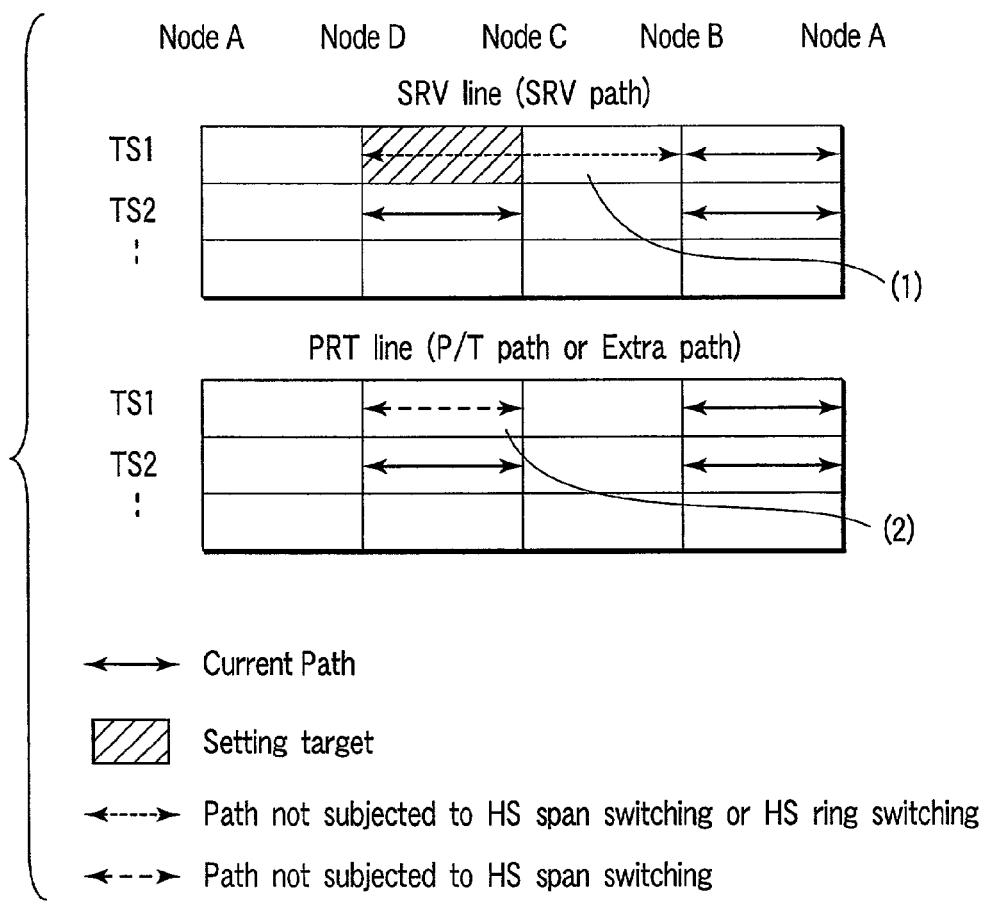
FIG. 34 shows the contents of the setting at node A to node D in the fourth embodiment.

Then, the set request message is received at each of node A to node D. After the necessary processes have been carried out, the setting as shown in FIG. 34 is realized. FIG. 34 shows a case where the setting of the inhibition of switching is expanded only in the SRV system. The restoration of traffic (indicated by reference numeral ①) in the path in which the inhibition of switching by APS has been set is suppressed. This prevents the P/T traffic (indicated by reference numeral ②) from being dropped by span switching related to traffic ①. As a result, the priority of the service traffic becomes equal to that of the P/T traffic.

FIG. 35 shows the management table 6a of the fourth embodiment. As seen from this figure, span switching and ring switching are inhibited only in time slot TS1 on the East side of node D, the East and West sides of node C, and the West side of node B.

Next, concrete examples of switching control by APS with the above setting will be explained using four cases.

<Case 4-1>

In this case, consider a case where a failure has occurred in the service line SL between node C and node D as shown in FIG. 36. At this time, the path between node B and node D in TS1 is not restored by span switching. In contrast, the path between node C and node D in TS2 is not inhibited from switching. Therefore, this path is restored to the protection line and the service traffic is switched to the PRT system. That is, the P/T path indicated by reference numeral ② is dropped, whereas the P/T traffic indicated by reference numeral ① is not dropped.

<Case 4-2>

Figure 37:
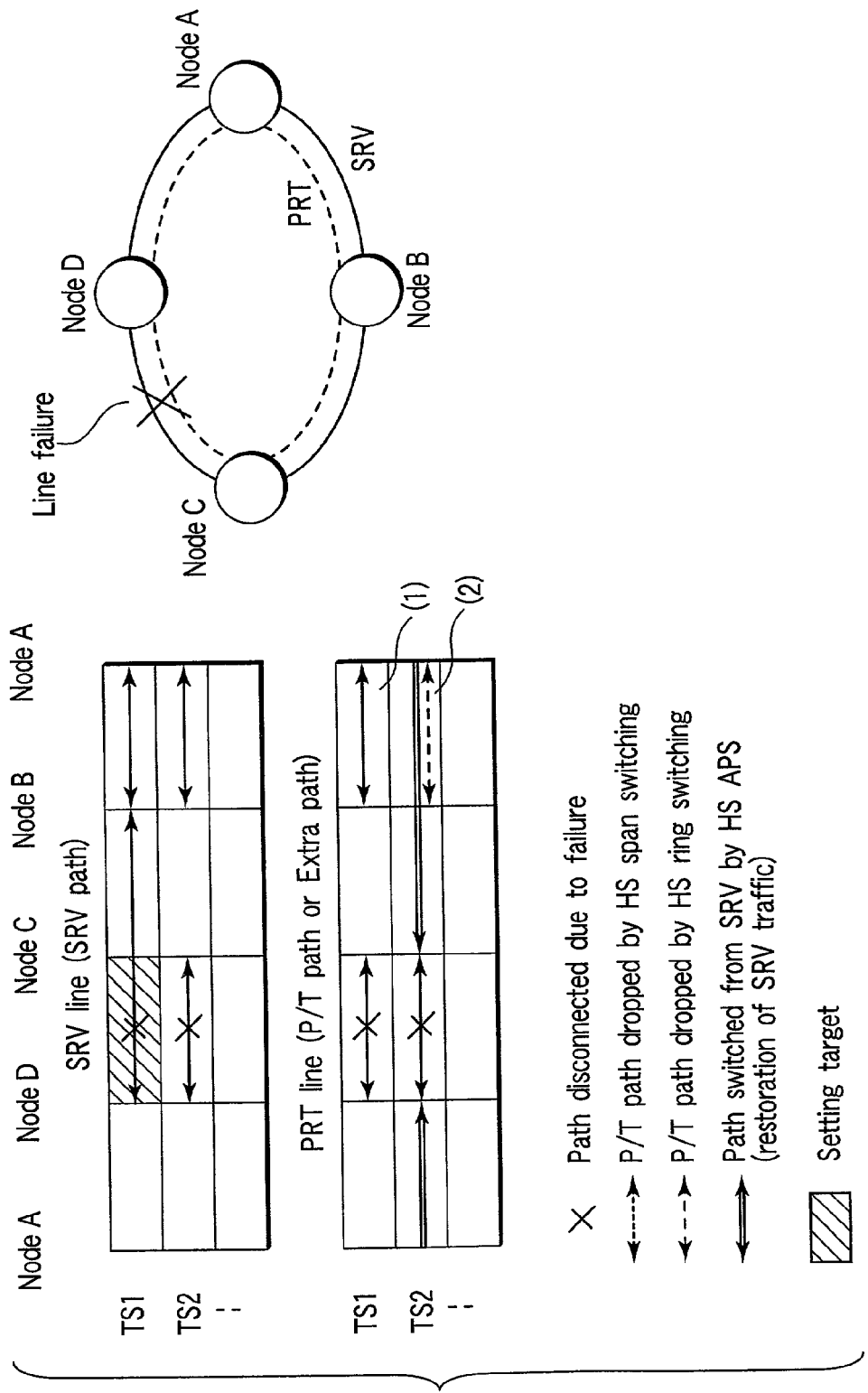
FIG. 37 shows the mode of switching when a failure has occurred in the service line SL and protection line PL between node C and node D in the fourth embodiment.

In case 4-2, consider a case where a failure has occurred in the service line SL and protection line PL between node C and node D as shown in FIG. 37. At this time, the service traffic in TS1 between node B and node D is not salvaged. In contrast, the service traffic in TS2 between node C and D is subjected to ring switching. That is, all the P/T traffic in a segment other than segment CD in the PRT system in TS2 is dropped. Then, the service traffic in TS2 between node C and node D is detoured to the resource in which the R/T traffic has been dropped. That is, the traffic indicated by reference numeral ① is not dropped, whereas the traffic indicated by reference numeral ② is dropped.

<Case 4-3>

Figure 38:
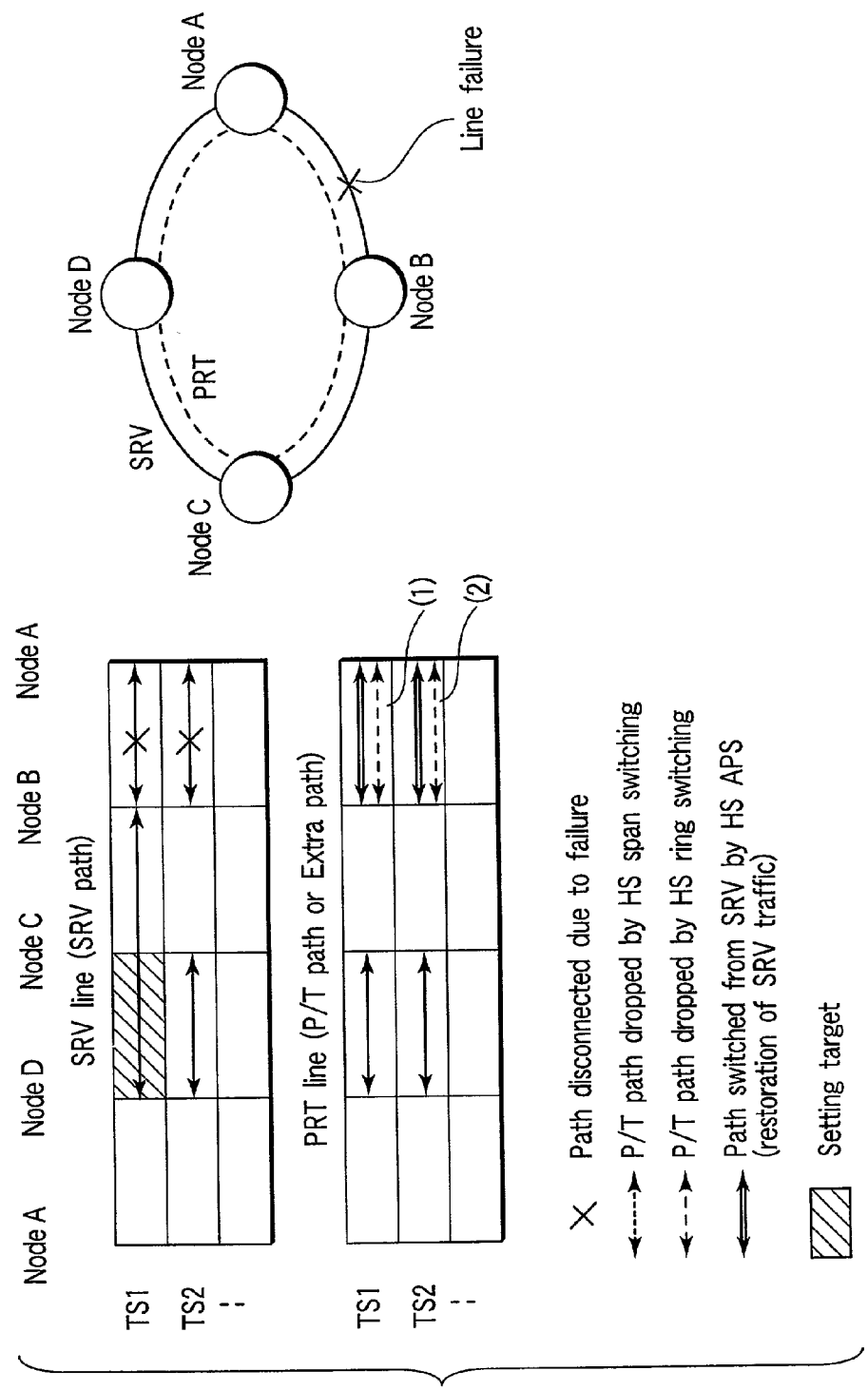
FIG. 38 shows the mode of switching when a failure has occurred in the service line SL between node A and node B in the fourth embodiment.

In case 4-3, consider a case where a failure has occurred in the service line SL between node A and node B as shown in FIG. 38. At this time, APS switching related to segment AB is not inhibited. Therefore, HS span switching is effected, which causes the P/T traffic in segment AB to be dropped. The service traffic in the segment is restored to the PRT system, thereby realizing the states shown by reference numerals ① and ②.

<Case 4-4>

In case 4-4, consider a case where a failure has occurred in the service line SL and protection line PL between node A and node B as shown in FIG. 39. At this time, APS switching related to segment AB is not inhibited. Therefore, HS span switching is effected, which causes the P/T traffic in a segment other than segment AB to be dropped. The service traffic in segment AB is restored to the PRT system, thereby realizing the states shown by reference numerals ① and ②.

<Embodiment to Help Explain the Inhibition of Switching by APS is Set in the Service Line SL and Protection Line PL on a Segment Basis>

(Fifth Embodiment)

Next, a fifth embodiment of the present invention will be explained. In this embodiment, the inhibition of switching by APS is set in the service line SL and protection line PL on a segment basis.

In the fifth embodiment, the specifying section 110a specifies a segment in the service line SL arbitrarily. The management table creating section 110b creates a management table 6a which means that the APS control section 5a is inhibited from detouring to the protection line PL the service traffic set in the transmission path including the resource specified at the specifying section 110a. In addition, the management table creating section 110b writes in the management table 6a information that any service traffic in the service line SL is inhibited from detouring to the protection line PL in the specified segment.

Figure 40:
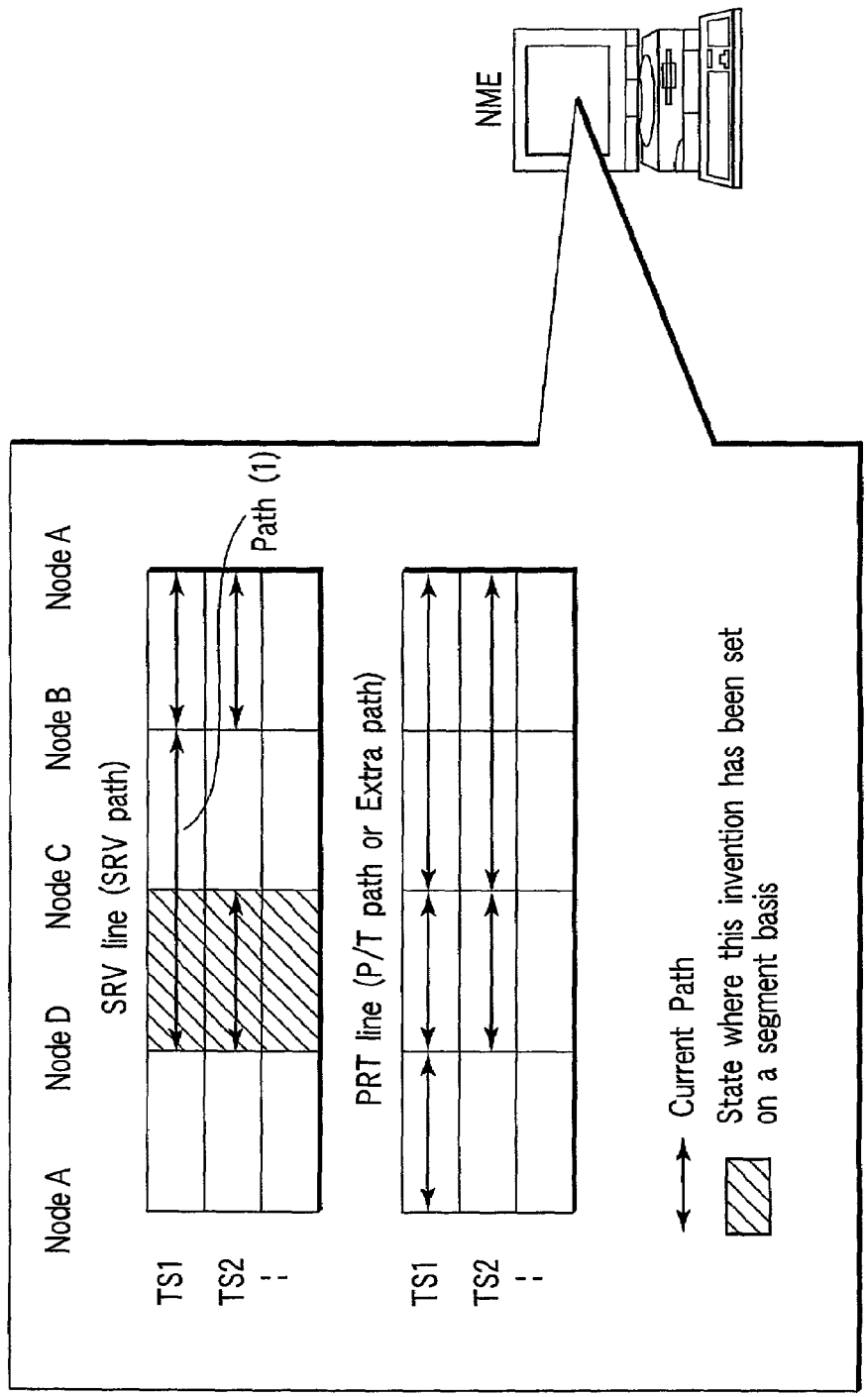
FIG. 40 is an illustration to help explain the operation of the operator in a fifth embodiment of the present invention.

FIG. 40 is an illustration to help explain the operation the operator performs using the display section 25 of the network management equipment 10 in the fifth embodiment. As shown in FIG. 40, the operator specifies an arbitrary segment in the SRV system on the screen of the display section 25. Here, the service-system segment between node C and node D is specified. After this operation, a set request message is sent to each of node A to node D.

Figure 41:
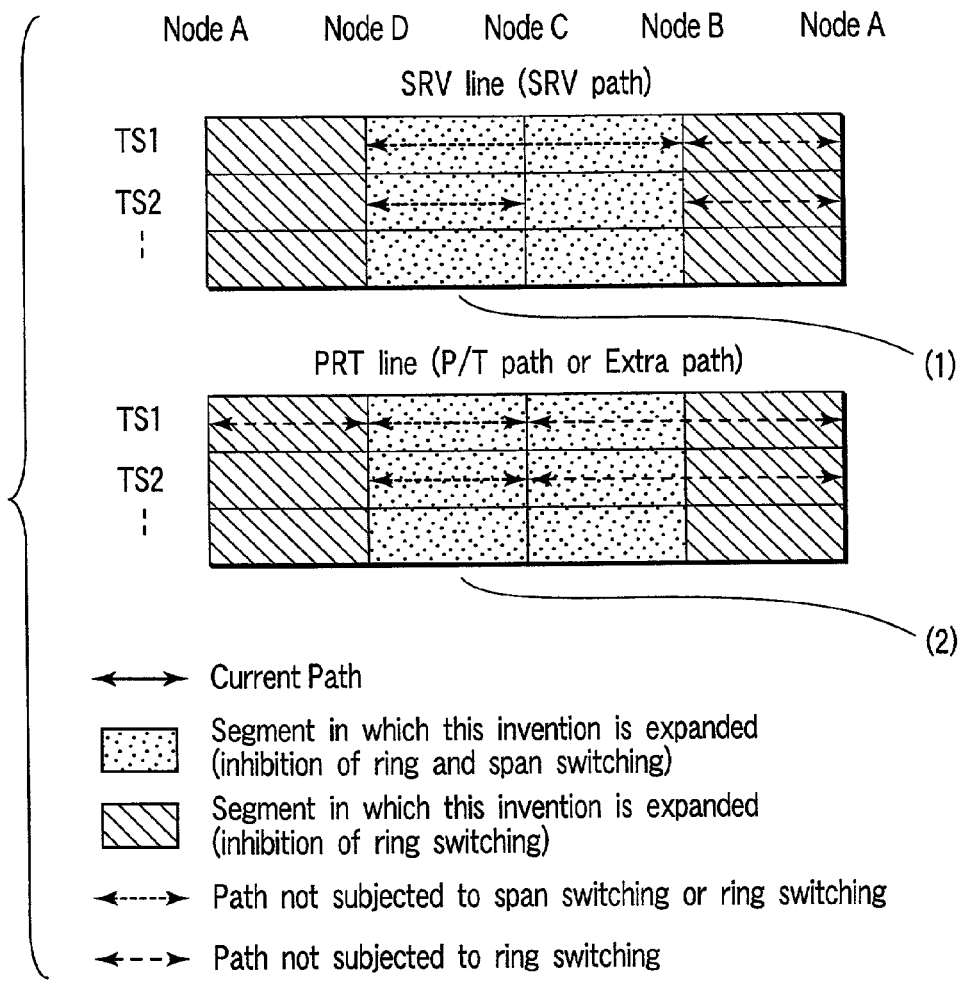
FIG. 41 shows the contents of the setting at node A to node D in the fifth embodiment.

Then, the set request message is received at each of node A to node D. After the necessary processes have been carried out, the setting as shown in FIG. 41 is realized. FIG. 41 shows a case where the setting of the inhibition of switching is expanded not only in the SRV system but also in the PRT system. The restoration of traffic (indicated by reference numeral ①) in the segment in which the inhibition of switching by APS has been set is suppressed. This prevents the P/T traffic related to the segment indicated by reference numeral ② from being dropped. As a result, the priority of the service traffic becomes equal to that of the P/T traffic.

FIG. 42 shows the management table 6a of the fifth embodiment. Explanation will be given in comparison with FIG. 12. The table of FIG. 42 is the same as that of FIG. 12 in that span switching and ring switching are inhibited throughout all the time slots on the Ease side of node D and the West side of node C.

In the fifth embodiment, the P/T path in segment CD in the PRT system is positively inhibited from being dropped. This means that ring switching in all the segments is inhibited. Therefore, the contents of the table of FIG. 42 reflects the inhibition. That is, a bit 1 meaning that ring switching is inhibited over all the segments is written.

Next, concrete examples of switching control by APS with the above setting will be explained using four cases.

<Case 5-1>

Figure 43:
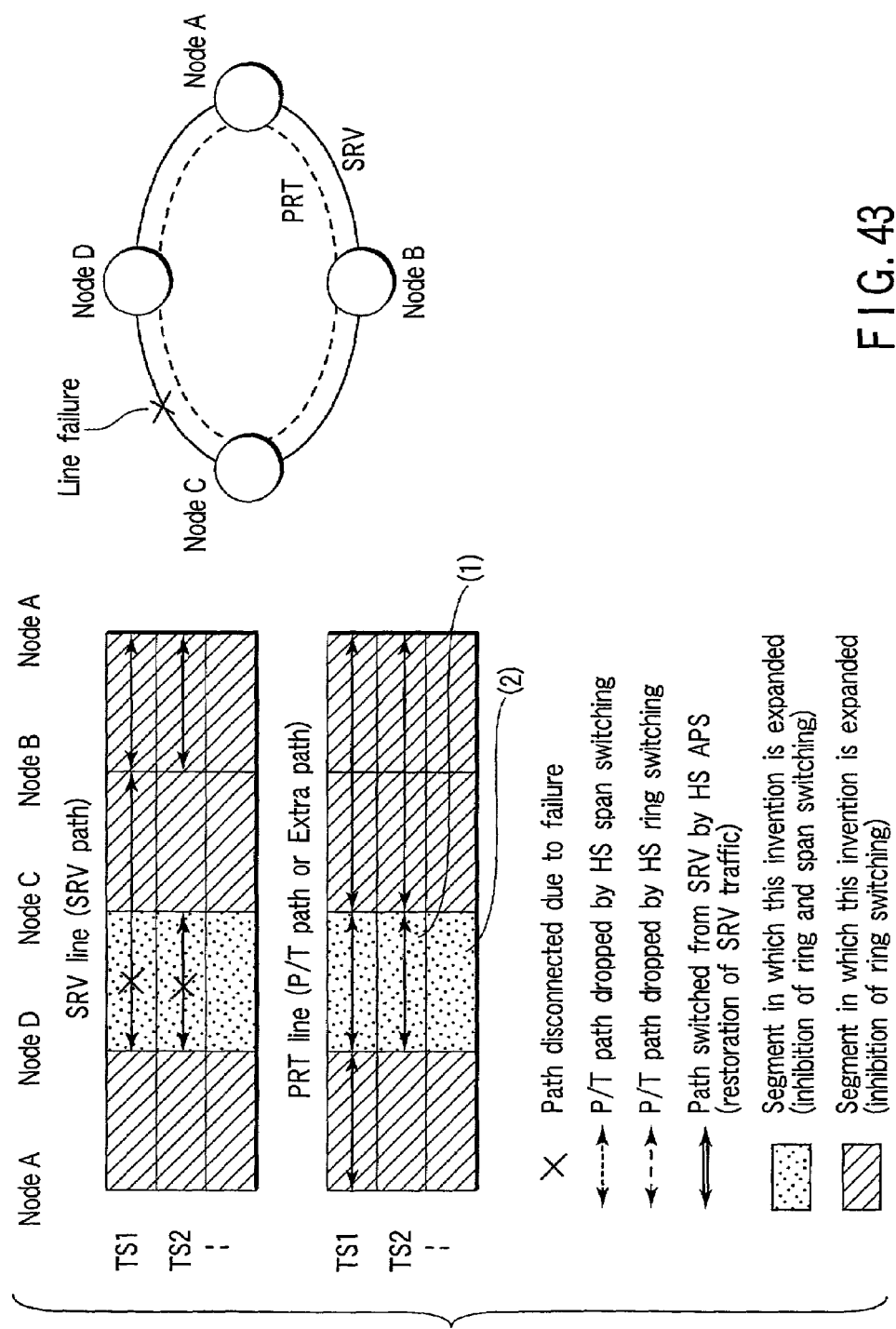
FIG. 43 shows the mode of switching when a failure has occurred in the service line SL between node C and node D in the fifth embodiment.

In this case, consider a case where a failure has occurred in the service line SL between node C and node D as shown in FIG. 43. At this time, HS span switching is going to be done. However, since the switching process in segment CD is inhibited, the service traffic is not restored by span switching. Therefore, the traffic (path) indicated by reference numeral ① and that indicated by reference numeral ② are not dropped.

<Case 5-2>

Figure 44:
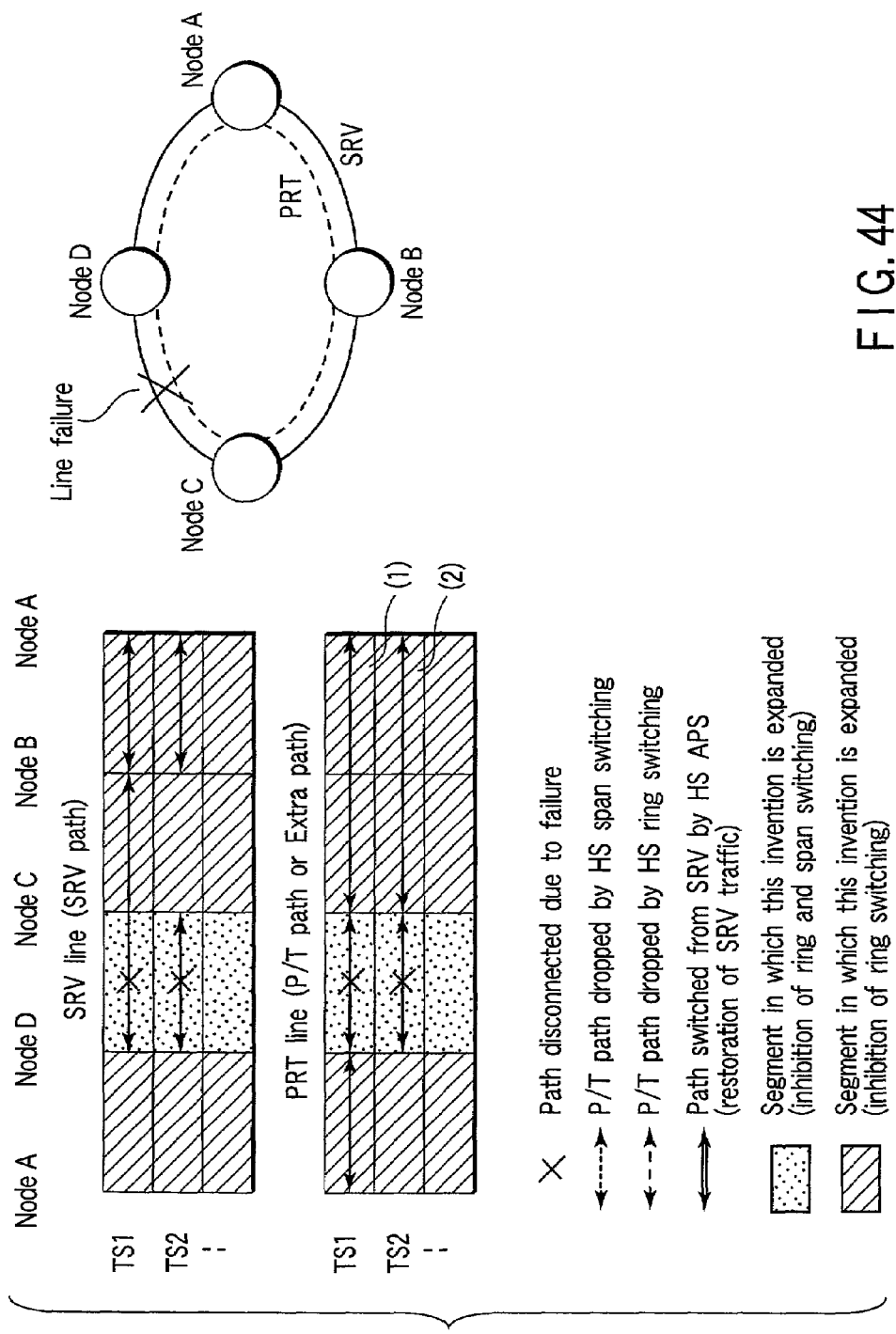
FIG. 44 shows the mode of switching when a failure has occurred in the service line SL and protection line PL between node C and node D in the fifth embodiment.

In case 5-2, consider a case where a failure has occurred in the service line SL and protection line PL between node C and node D as shown in FIG. 44. At this time, HS ring switching is going to be done. However, since the switching process is inhibited in segment CD, the restoration of the traffic related to the segment is inhibited. This prevents the service traffic from being restored by ring switching. Therefore, the traffic (path) indicated by reference numeral ① and that indicated by reference numeral ② are not dropped.

<Case 5-3>

Figure 45:
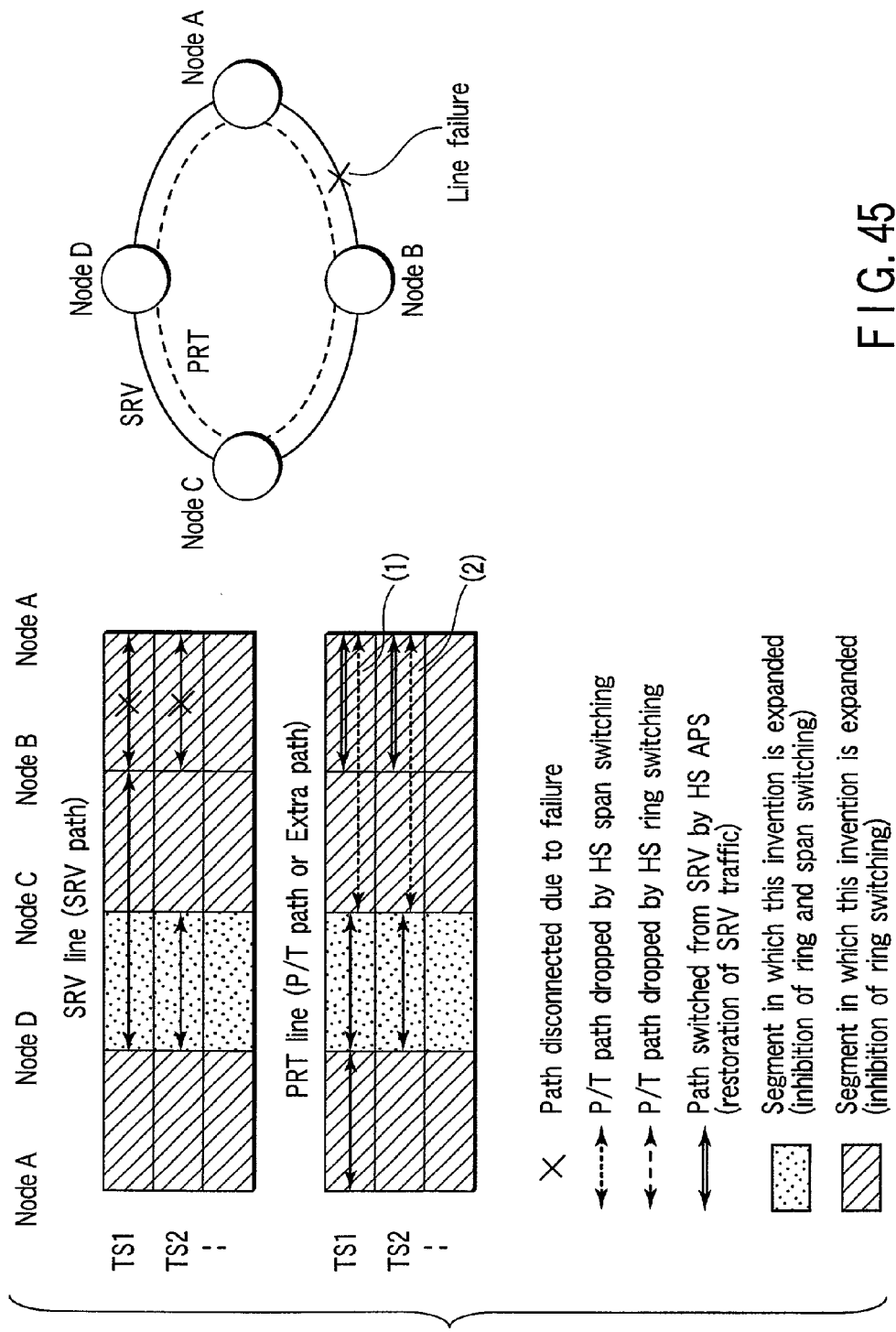
FIG. 45 shows the mode of switching when a failure has occurred in the service line SL between node A and node B in the fifth embodiment.

In case 5-3, consider a case where a failure has occurred in the service line SL between node A and node B as shown in FIG. 45. At this time, since span switching is not inhibited in segment AB, HS span switching is done. This causes the P/T traffic in segment AB to be dropped, thereby restoring the service traffic in the segment to the PRT system. Therefore, the states shown by reference numerals ① and ② are realized.

<Case 5-4>

In case 5-4, consider a case where a failure has occurred in the service line SL and protection line PL between node A and node B as shown in FIG. 46. At this time, normally HS ring switching would be effected and the R/T traffic in a segment other than segment AB would be dropped. In the fifth embodiment, however, the traffic in the protection line PL in segment CD is inhibited from being dropped. As a result of this, ring switching related to the failure in segment AB is inevitably inhibited, even when span switching is permitted in segment AB. Therefore, the service traffic in segment AB is not salvaged and the P/T traffic is kept undropped.

<Embodiment to Help Explain the Inhibition of Switching by APS is Set in the Service Line SL and Protection Line PL on a Transmission Path Basis>

(Sixth Embodiment)

Next, a sixth embodiment of the present invention will be explained. In this embodiment, the inhibition of switching by APS is set in the service line SL and protection line PL on a transmission path basis.

In the sixth embodiment, the specifying section 110a specifies a transmission path in the service line SL arbitrarily. The management table creating section 110b creates a management table 6a which means that the APS control section 5a is inhibited from detouring to the protection line PL the service traffic set in the transmission path including the resource specified at the specifying section 110a. In addition, the management table creating section 110b writes in the management table 6a information that any service traffic in the service line SL is inhibited from detouring to the resource on the side of the protection line PL corresponding to the specified transmission path.

FIG. 47 is an illustration to help explain the operation the operator performs using the display section 25 of the network management equipment 10 in the sixth embodiment. As shown in FIG. 47, the operator specifies an arbitrary transmission path in the SRV system on the screen of the display section 25. Here, the path (indicated by reference numeral ①) in time slot 1 between node B and node D is specified. After this operation, a set request message is sent to each of node A to node D.

Figure 48:
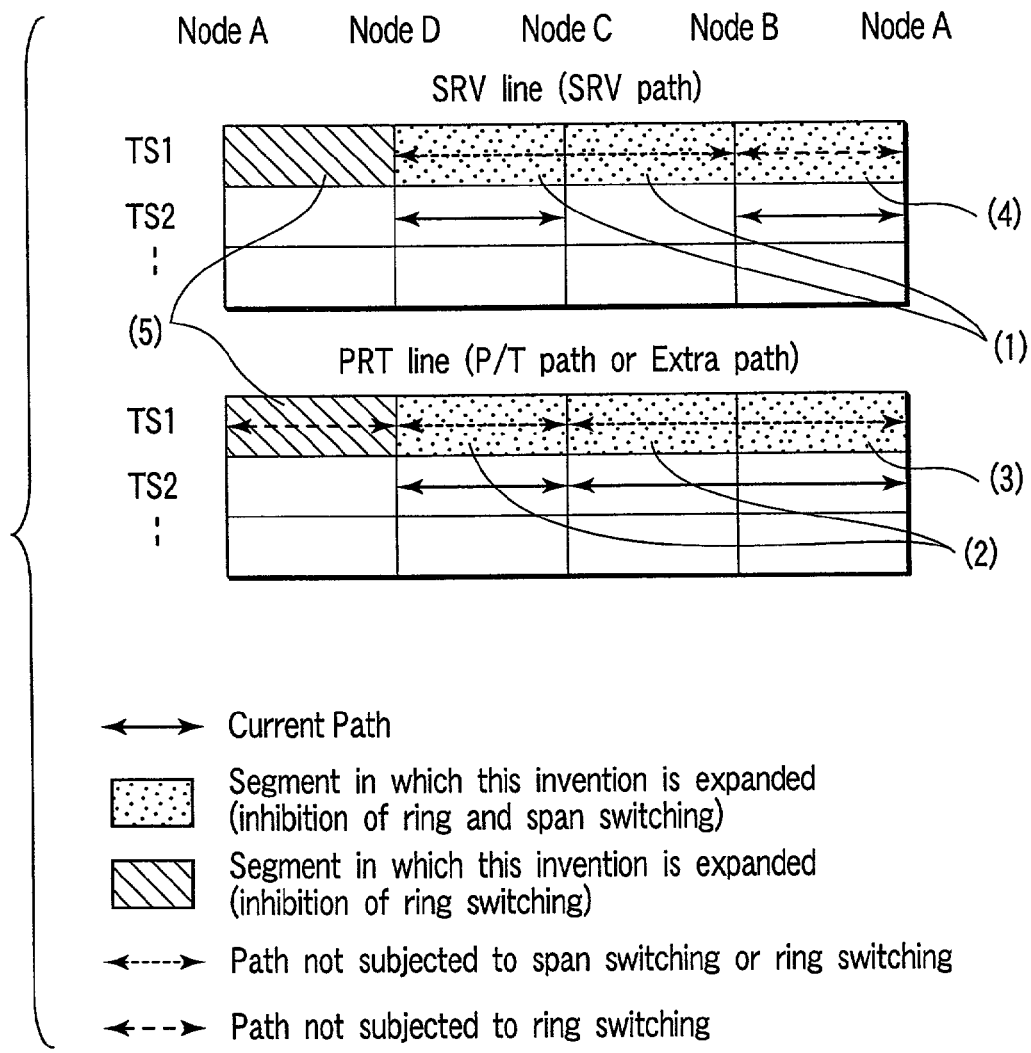
FIG. 48 shows the contents of the setting at node A to node D in the sixth embodiment.

Then, the set request message is received at each of node A to node D. After the necessary processes have been carried out, the setting as shown in FIG. 48 is realized. FIG. 48 shows a case where the setting of the inhibition of switching is expanded not only in the SRV system but also in the PRT system. In FIG. 48, the setting of the inhibition of switching is expanded in the resource of ② making a pair with ①. At this time, when the traffic exists in the resources of ② and ③, the setting of the inhibition of switching is expanded in the resource of ③ as well. Expanding the setting in the resource of ③ causes the setting of the inhibition of switching to be expanded in the resource of ④ as well.

As a result of the above expansions, the traffic related to the resources of ① to ④ are prevented from being dropped by ring switching or span switching. When the traffic exists in the resource of ⑤, the traffic related to the resource of ⑤ is prevented form being dropped by ring switching, since the setting is expanded in the resources of ① to ④. As a result of the above setting, the priority of the service traffic becomes equal to that of the PRT traffic.

In the sixth embodiment, the set request accepting section 5c expands the contents of the management table 6a included in the set request message from the network management equipment. That is, the set request accepting section 5c gives a broad interpretation of the contents of the management table 6a. Thus, the sixth embodiment is characterized in that the memory unit 6 stores the management table 6a having an expanded version of the setting in the network management equipment 10. That is, in the sixth embodiment, the inhibition of switching by APS is set, taking traffic into account.

FIG. 49 shows the management table 6a of the sixth embodiment. Explanation will be given in comparison with FIG. 21. The table of FIG. 49 is the same as that of FIG. 21 in that span switching and ring switching related to the Ease side of node D, the East side and West side of node C, and the West side of node B are inhibited in TS1. In addition, since the P/T between node B and node D in the PRT system is not dropped, the ring switching is inhibited in TS1 in all the segments. Therefore, in the table of FIG. 49, too, a bit 1 meaning that the ring switching in all the segments is inhibited only in TS1 is written.

Furthermore, the sixth embodiment is characterized in that a bit 1 meaning the inhibition of span switching is written on the East side of node B and on the West side of node A in the table of FIG. 49. This is because the contents of the management table 6a have been expanded at node A to node D and correspond to the contents explained in FIG. 48.

Next, concrete examples of switching control by APS with the above setting will be explained using four cases.

<Case 6-1>

Figure 50:
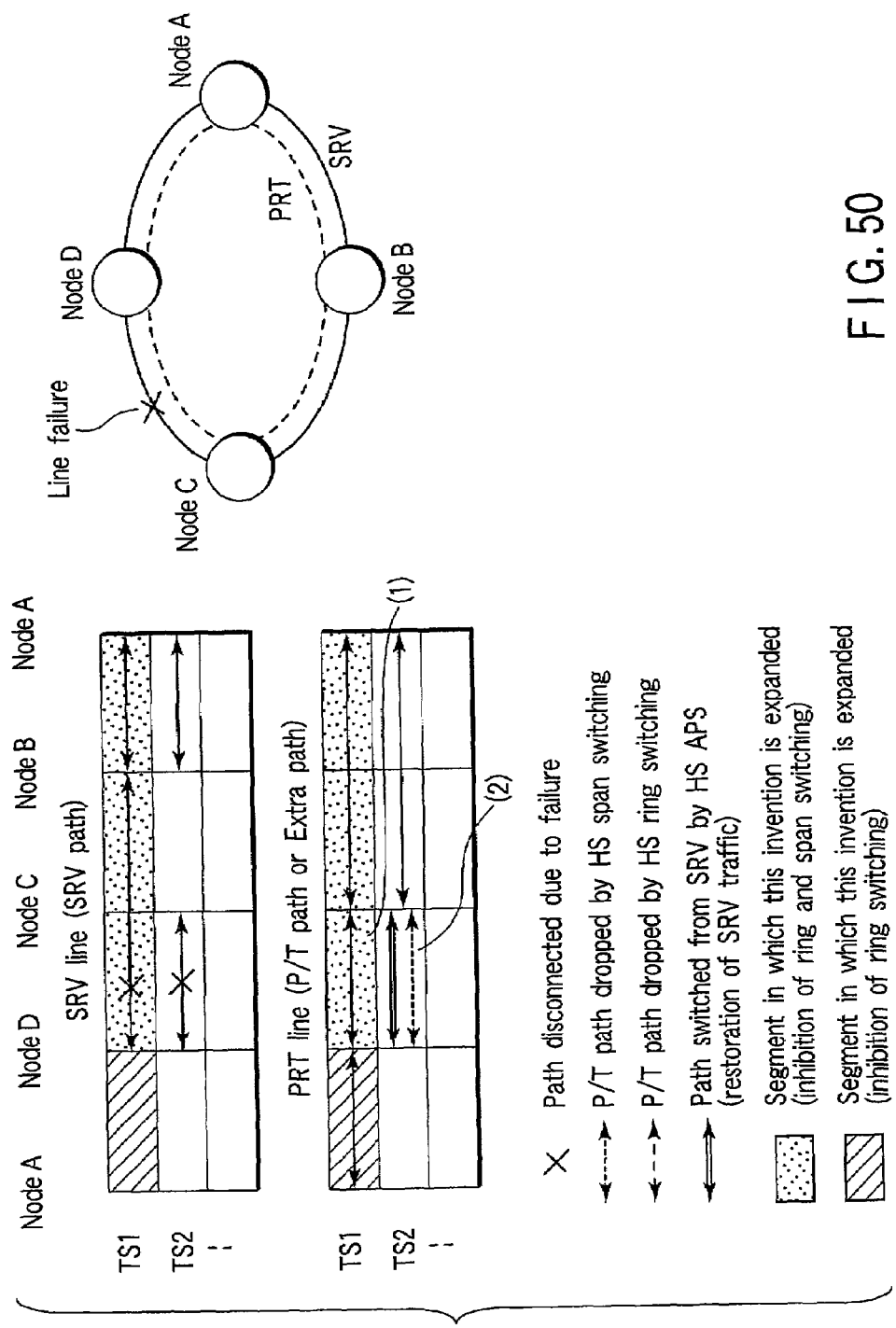
FIG. 50 shows the mode of switching when a failure has occurred in the service line SL between node C and node D in the sixth embodiment.

In this case, consider a case where a failure has occurred in the service line SL between node C and node D as shown in FIG. 50. At this time, the path between node B and node D in TS1 is not restored by span switching. In contrast, since the path between node C and node D in TS2 is not inhibited from switching, it is restored by span switching. Therefore, the transmission route of the service traffic is switched to the PRT system. That is, the P/T path indicated by reference numeral ② is dropped, whereas the P/T traffic (path) indicated by reference numeral ① is not dropped.

<Case 6-2>

Figure 51:
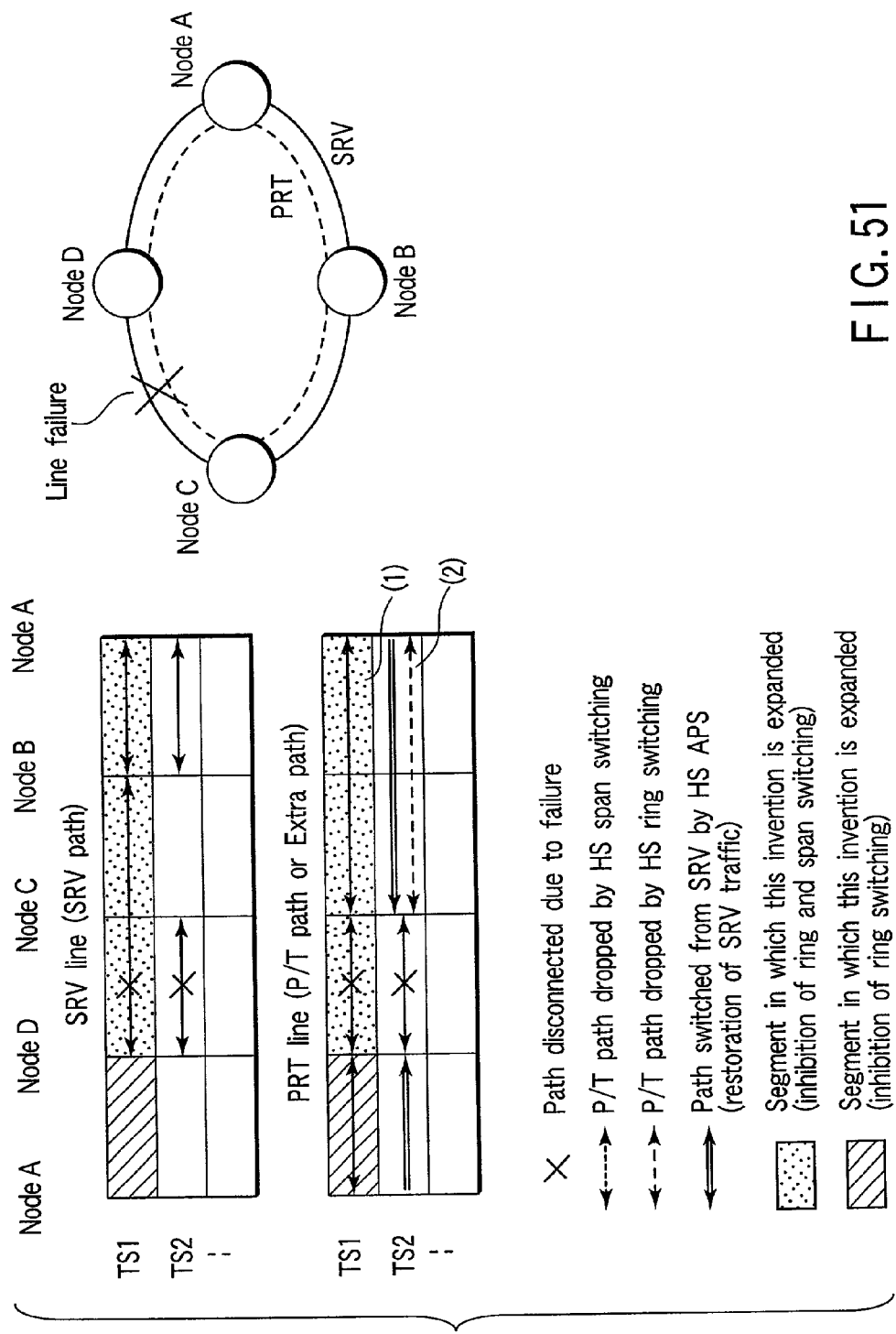
FIG. 51 shows the mode of switching when a failure has occurred in the service line SL and protection line PL between node C and node D in the sixth embodiment.

In case 6-2, consider a case where a failure has occurred in the service line SL and protection line PL between node C and node D as shown in FIG. 51. At this time, the service traffic in TS1 between node B and node D is not salvaged. In contrast, the service traffic in TS2 between node C and node D is salvaged by ring switching. That is, all the traffic in a segment other than the segment CD in the PRT system in TS2 is dropped. Then, the service traffic in TS2 between node C and node D is detoured to the resource in which the P/T traffic has been dropped. That is, the P/T traffic indicated by reference numeral ① is not dropped, whereas the P/T path indicated by reference numeral ② is dropped.

<Case 6-3>

Figure 52:
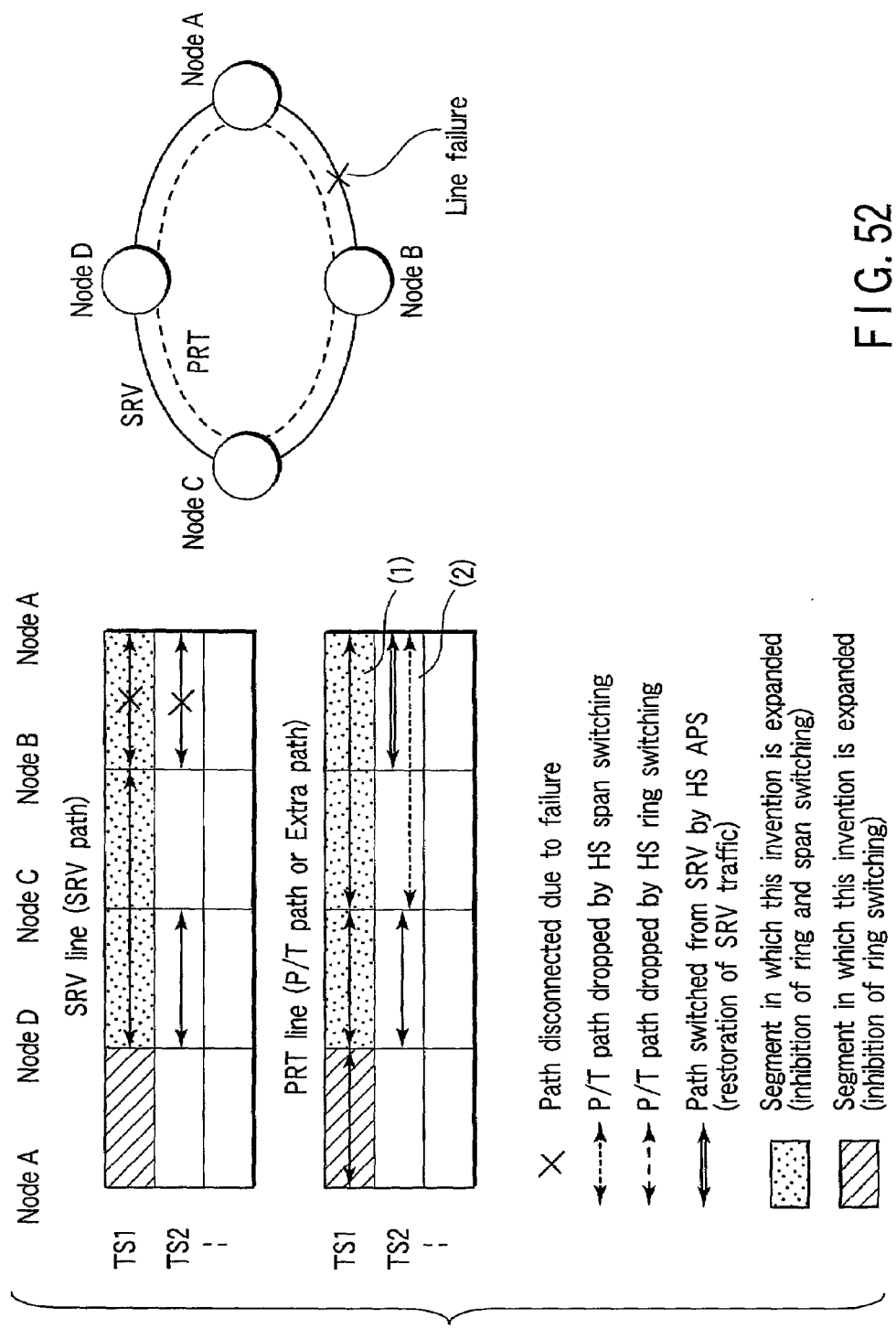
FIG. 52 shows the mode of switching when a failure has occurred in the service line SL between node A and node B in the sixth embodiment.

In case 6-3, consider a case where a failure has occurred in the service line SL between node A and node B as shown in FIG. 52. At this time, since span switching is inhibited in TS1 in segment AB, the P/T traffic between node A and node C in TS1 in the PRT system is not dropped. In contrast, since span switching in TS2 in segment AB is not inhibited, HS span switching is done. This causes the P/T traffic in TS2 in segment AB to be dropped, thereby restoring the service traffic in TS2 in the segment to the PRT system. Therefore, the states shown by reference numerals ① and ② are realized.

<Case 6-4>

Figure 53:
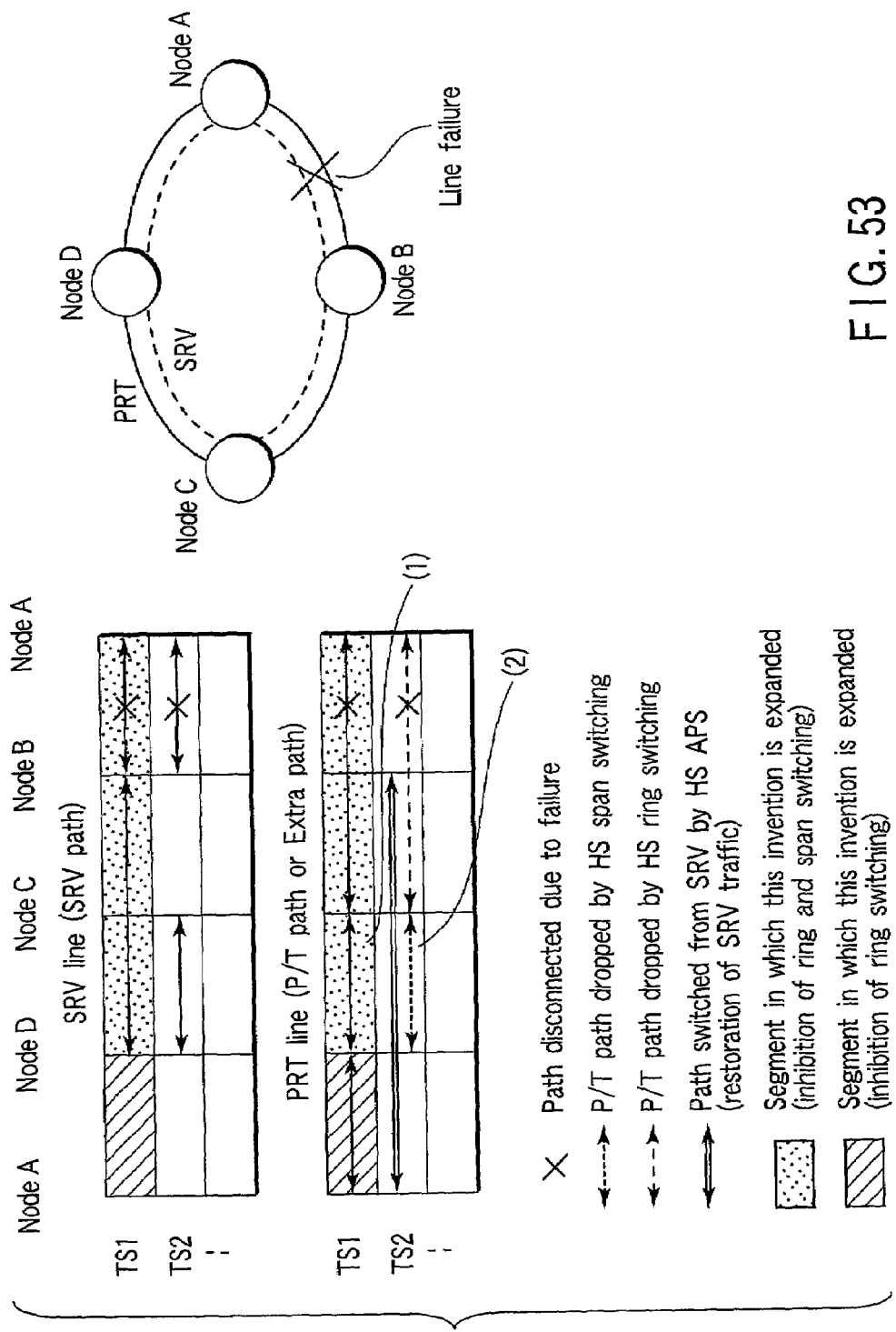
FIG. 53 shows the mode of switching when a failure has occurred in the service line SL and protection line PL between node A and node B in the sixth embodiment.

In case 6-4, consider a case where a failure has occurred in the service line SL and protection line PL between node A and node B as shown in FIG. 53. At this time, since ring switching is inhibited in TS1, the traffic in TS1 in the SRV system does not operate. On the other hand, ring switching in segment AB in TS2 is not inhibited. As a result, HS ring switching is effected, causing the P/T traffic in a segment other than segment AB to be dropped, which restores the service traffic in segment AB to the PRT system. Therefore, the states shown by reference numerals ① and ② are realized.

(Seventh Embodiment)

Next, a seventh embodiment of the present invention will be explained. In this embodiment, the inhibition of switching by APS is set in the service line SL and protection line PL on a transmission path basis.

In the embodiment, the specifying section 110*a* specifies a transmission path in the service line SL arbitrarily. The management table creating section 110*b* creates a management table 6*a* which means that the APS control section 5*a* is inhibited from detouring to the protection line PL the service traffic set in the transmission path specified at the specifying section 110*a*. In addition, the management table creating section 110*b* writes in the management table 6*a* to the effect that any service traffic in the service line SL is inhibited from detouring to the resource on the side of the protection line PL corresponding to the specified transmission path.

In the embodiment, the operation the operator performs using the display section 25 of the network management equipment 10 is the same as in the sixth embodiment. That is, the same operation as explained in FIG. 47 is performed.

In the sixth embodiment, the inhibition of switching by APS has been set in the process, taking traffic into account. In the embodiment, however, the inhibition of switching by APS is set in the process, taking no account of traffic. These two modes differ in that respect. This will be explained by reference to the management table of FIG. 54.

In the embodiment, at the nodes A to D that have received set request messages, the setting of the inhibition of switching is expanded in the resource indicated by reference numeral ② making a pair with reference numeral ①. This is the same as in the sixth embodiment. In the embodiment, however, although the traffic exists in the resources with reference numerals ② and ③, the inhibition of switching is not expanded horizontally in the resource indicated by reference numeral ③. Thus, span switching related to the resource indicated by reference numeral ③ is permitted. Allowing the span switching prevents the setting of the inhibition of switching from being expanded in the resource indicated by reference numeral ④. Therefore, span switching related to the resource indicated by reference numeral ④ is permitted.

To sum up, the traffic transmitted via the resources with reference numerals ① and ② is not dropped by ring switching or span switching. The traffic transmitted via the resources with reference numerals ③ and ④ is not dropped by ring switching, but is dropped by span switching. When the traffic exists in the resource with ⑤, this traffic is inhibited from dropping by ring switching. The above setting makes the priority of the service traffic equal to that of the PRT traffic.

FIG. 54 shows the management table 6*a* of the embodiment. FIG. 54 differs from FIG. 49 in that span switching is permitted on the East side of node B and on the West side of node A. That is, a bit 1 has not been written in the cell corresponding to the resource. This is because the inhibition of switching by APS has been set, taking no account of traffic.

Figure 55:
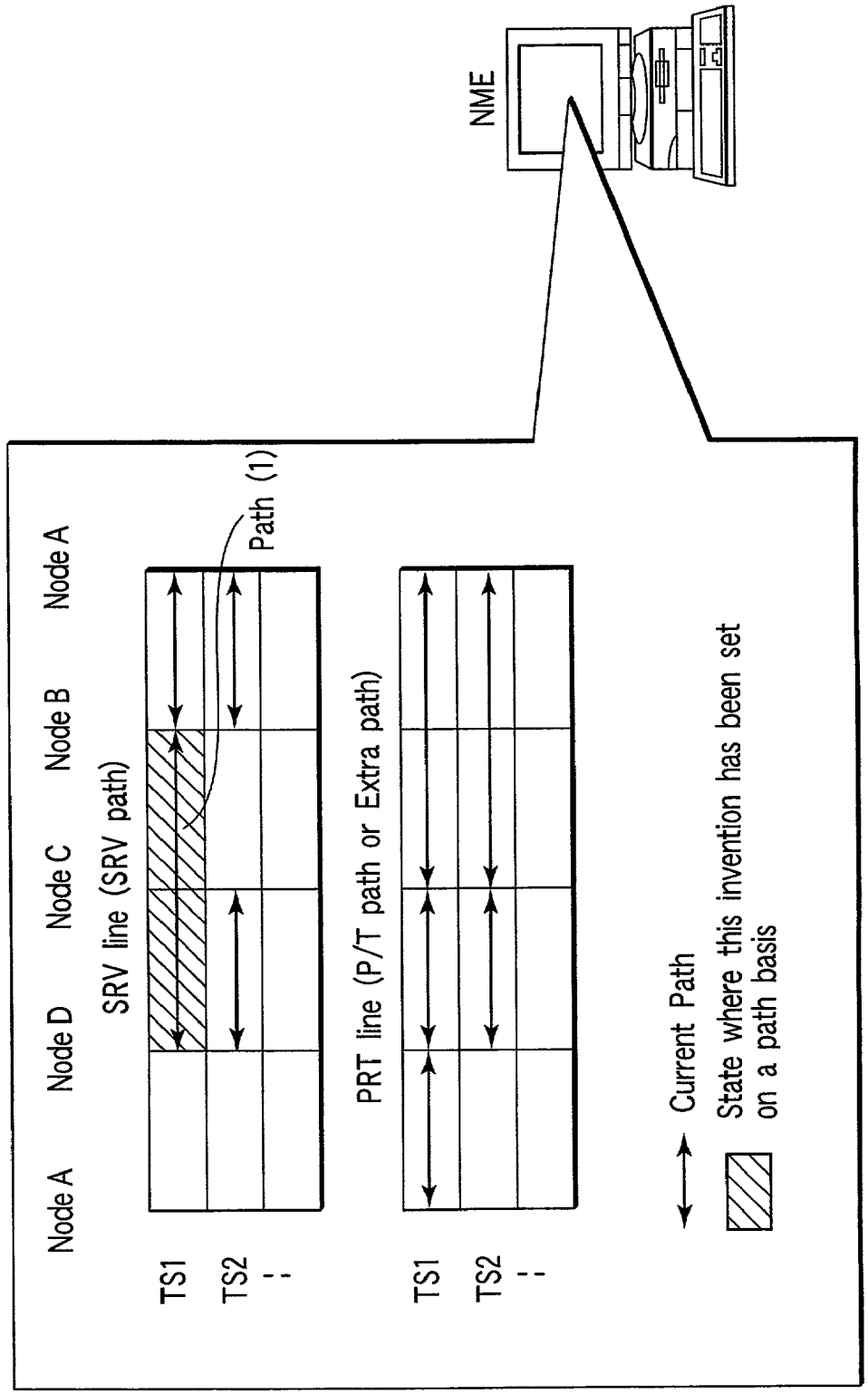
FIG. 55 is an illustration to help explain the operation of the operator in the seventh embodiment.

The operation of the embodiment will be explained more concretely. FIG. 55 is an illustration to help explain the operation the operator performs using the display section 25 of the network management equipment 10. As shown in FIG. 55, the operator specifies an arbitrary transmission path in the SRV system on the screen of the display section 25. Here, the path (indicated by reference numeral ①) in time slot 1 between node B and node D is specified. After this operation, a set request message is sent to each of node A to node D.

Figure 56:
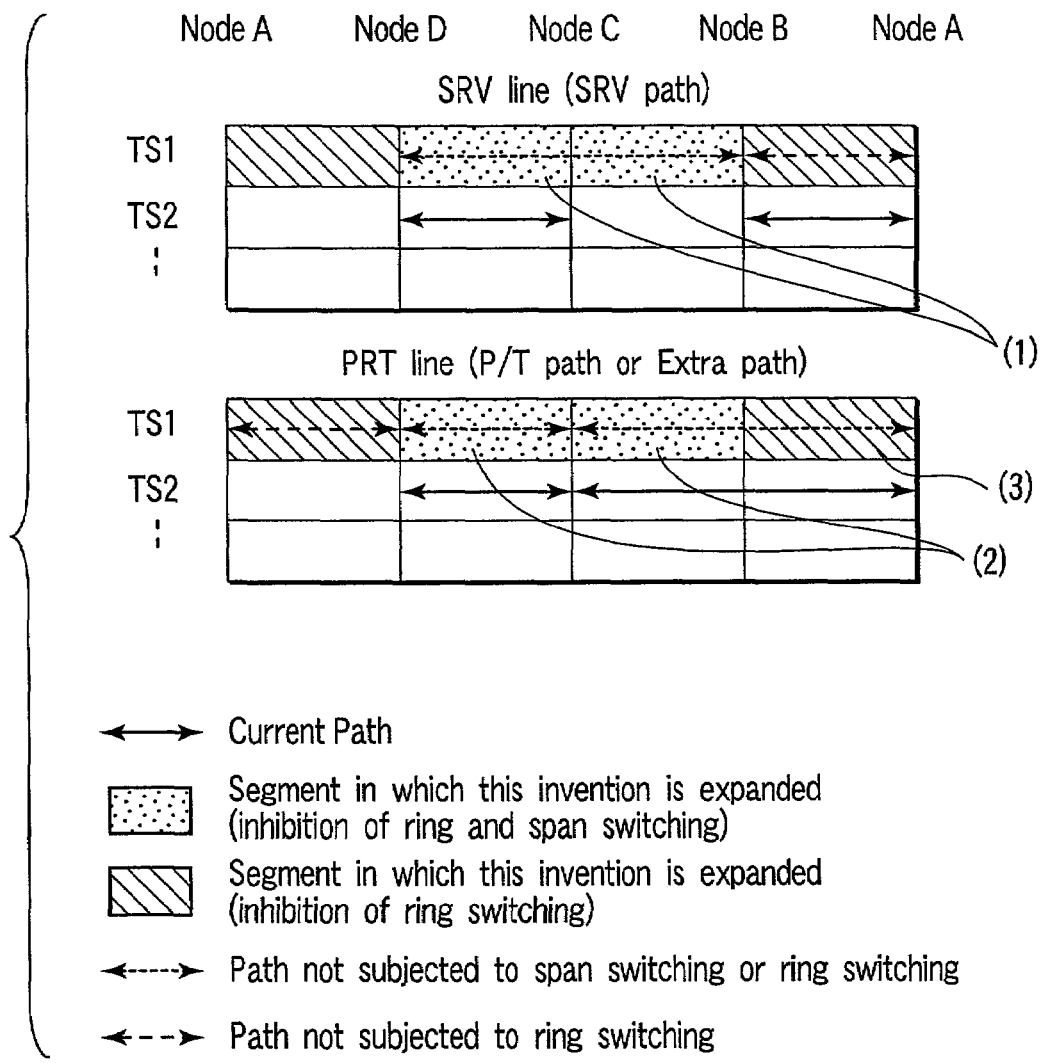
FIG. 56 shows the contents of the setting at node A to node D in the seventh embodiment.

Then, the set request message is received at each of node A to node D. After the necessary processes have been carried out, the setting as shown in FIG. 56 is realized. FIG. 56 shows a case where the setting of the inhibition of switching is expanded not only in the SRV system but also in the PRT system. In FIG. 56, the setting of the inhibition of switching is expanded in the resource with ② making a pair with ①. At this time, when the traffic exists in the resources of ② and ③, the setting of the inhibition of switching is not expanded horizontally in the resource of ③. The above expansion prevents the traffic transmitted via the segments indicated by reference numerals ① and ② from being dropped by ring switching and span switching.

Next, concrete examples of switching control by APS with the above setting will be explained using four cases.

<Case 7-1>

Figure 57:
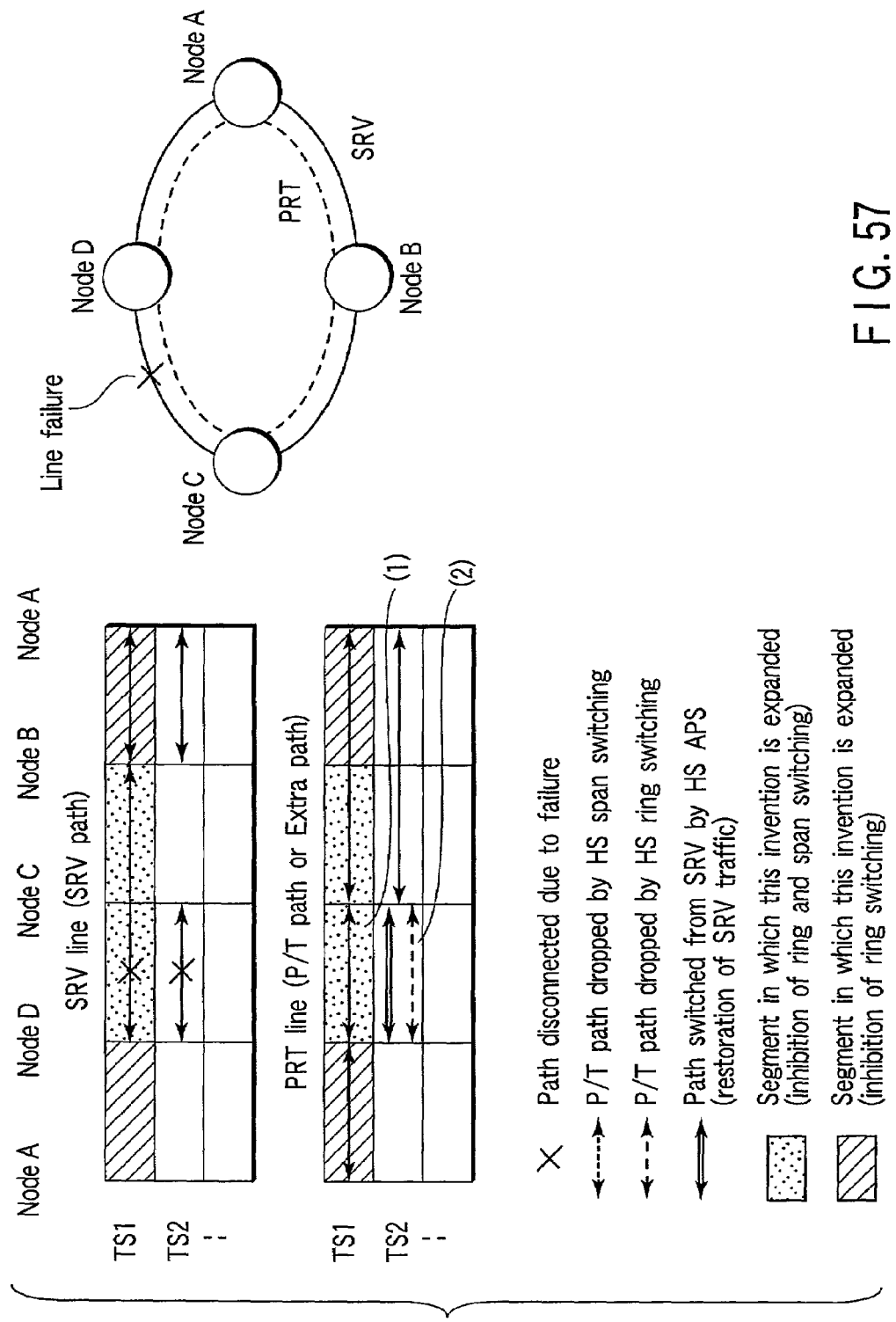
FIG. 57 shows the mode of switching when a failure has occurred in the service line SL between node C and node D in the seventh embodiment.

In this case, consider a case where a failure has occurred in the service line SL between node C and node D as shown in FIG. 57. At this time, the traffic flowing through the path between node B and node D in TS1 is not salvaged. In contrast, the traffic flowing through the path between node C and node D in TS2 is restored by span switching to the PRT system. That is, the P/T path indicated by reference numeral ② is dropped, whereas the P/T traffic (path) indicated by reference numeral ① is not dropped.

<Case 7-2>

Figure 58:
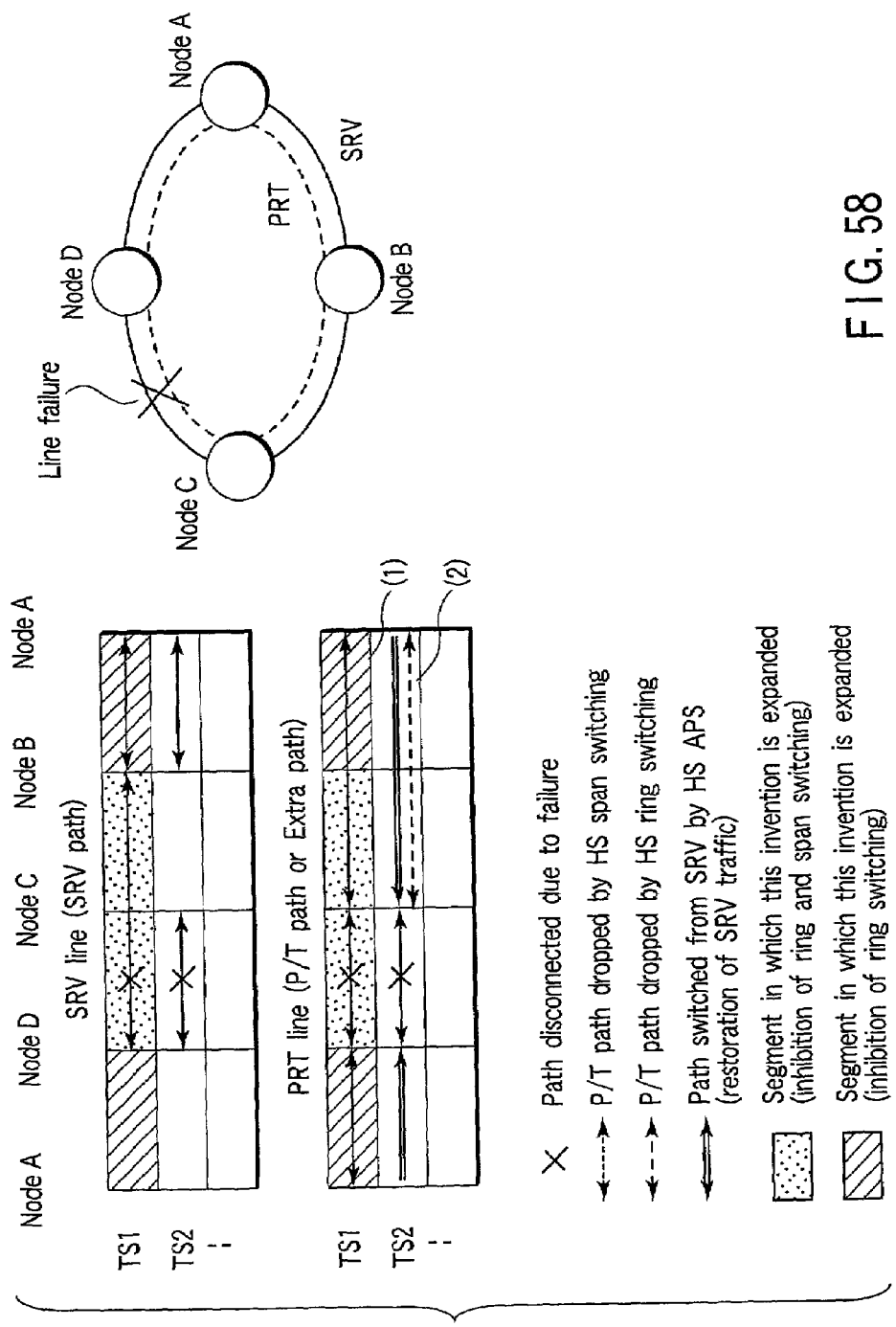
FIG. 58 shows the mode of switching when a failure has occurred in the service line SL and protection line PL between node C and node D in the seventh embodiment.

In case 7-2, consider a case where a failure has occurred in the service line SL and protection line PL between node C and node D as shown in FIG. 58. At this time, the service traffic in TS1 between node B and node D is not salvaged. In contrast, the service traffic in TS2 between node C and node D is subjected to ring switching. That is, all the P/T traffic in a segment other than segment CD in the PRT system in TS2 is dropped. Then, the service traffic in TS2 between node C and node D is detoured to the resource in which the P/T traffic has been dropped. That is, the traffic indicated by reference numeral ① is not dropped, whereas the traffic indicated by reference numeral ② is dropped.

<Case 7-3>

Figure 59:
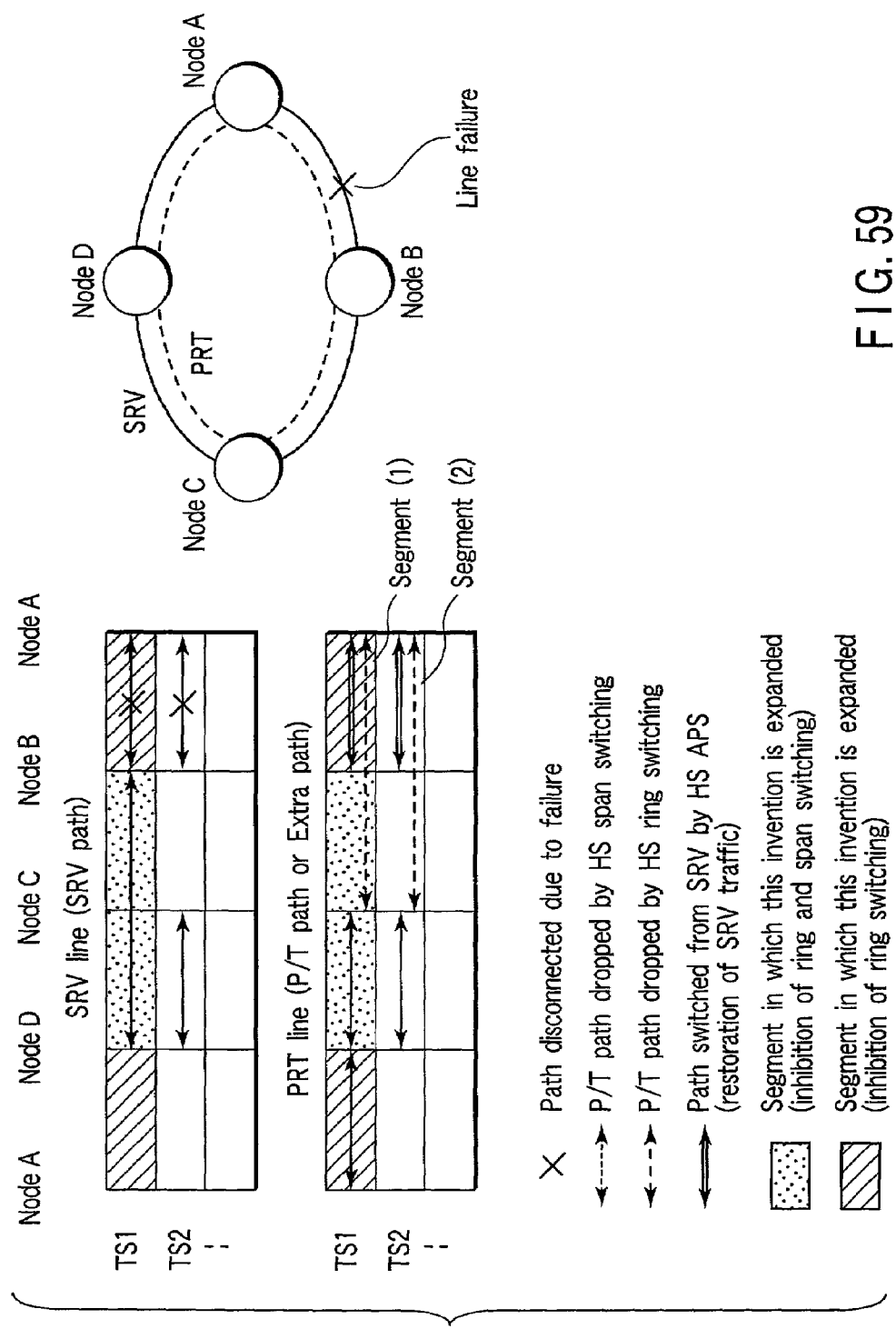
FIG. 59 shows the mode of switching when a failure has occurred in the service line SL between node A and node B in the seventh embodiment.

In case 7-3, consider a case where a failure has occurred in the service line SL between node A and node B as shown in FIG. 59. At this time, span switching is not inhibited in TS1 in segment AB. Thus, HS span switching is effected, causing the P/T traffic in TS1 in segment AB is dropped. The service traffic in TS1 in the segment is restored to the PRT system.

In TS2 in segment AB, span switching is not inhibited. Thus, HS span switching is done, causing the P/T traffic in TS2 in segment AB to be dropped. The service traffic in TS2 in the segment is restored to the PRT system. Therefore, the states shown by reference numerals ① and ② are realized.

<Case 7-4>

Figure 60:
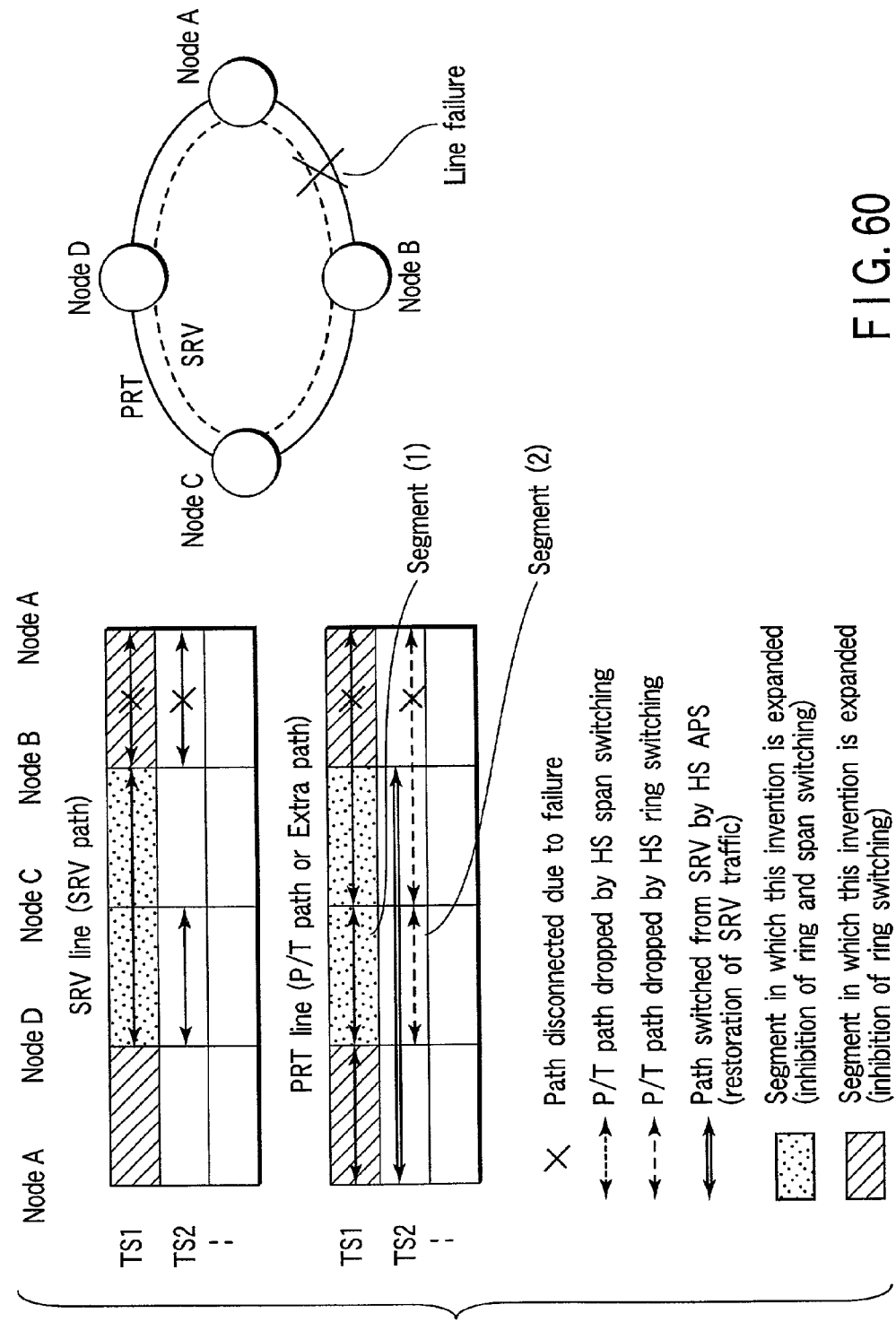
FIG. 60 shows the mode of switching when a failure has occurred in the service line SL and protection line PL between node A and node B in the seventh embodiment.

In case 7-4, consider a case where a failure has occurred in the service line SL and protection line PL between node A and node B as shown in FIG. 60. At this time, since ring switching is inhibited in TS1, the traffic in TS1 in the SRV system does not operate. On the other hand, ring switching in segment AB in TS2 is not inhibited. As a result, HS ring switching is effected, causing the P/T traffic in a segment other than segment AB to be dropped. Then, the service traffic in segment AB is restored to the PRT system, realizing the states shown by reference numerals ① and ②.

<Embodiment to Help Explain the Inhibition of Switching by APS is Set in the Service Line SL and Protection Line PL on a Timeslot Basis>

(Eighth Embodiment)

Next, a eighth embodiment of the present invention will be explained. In this embodiment, the inhibition of switching by APS is set in the service line SL and protection line PL on a time slot basis.

In the eighth embodiment, the specifying section 110a specifies a time slot in the service line SL arbitrarily. The management table creating section 110b creates a management table 6a which means that the APS control section 5a is inhibited from detouring to the protection line PL the service traffic set in the time slot specified at the specifying section 110a. In addition, the management table creating section 110b writes in the management table 6a information that any service traffic in the service line SL is inhibited from detouring to the protection line PL in the specified time slot.

FIG. 61 is an illustration to help explain the operation the operator performs using the display section 25 of the network management equipment 10 in the eighth embodiment. As shown in FIG. 61, the operator specifies an arbitrary time slot in the SRV system on the screen of the display section 25. Here, time slot 1 is specified. After this operation, a set request message is sent to each of node A to node D.

Figure 62:
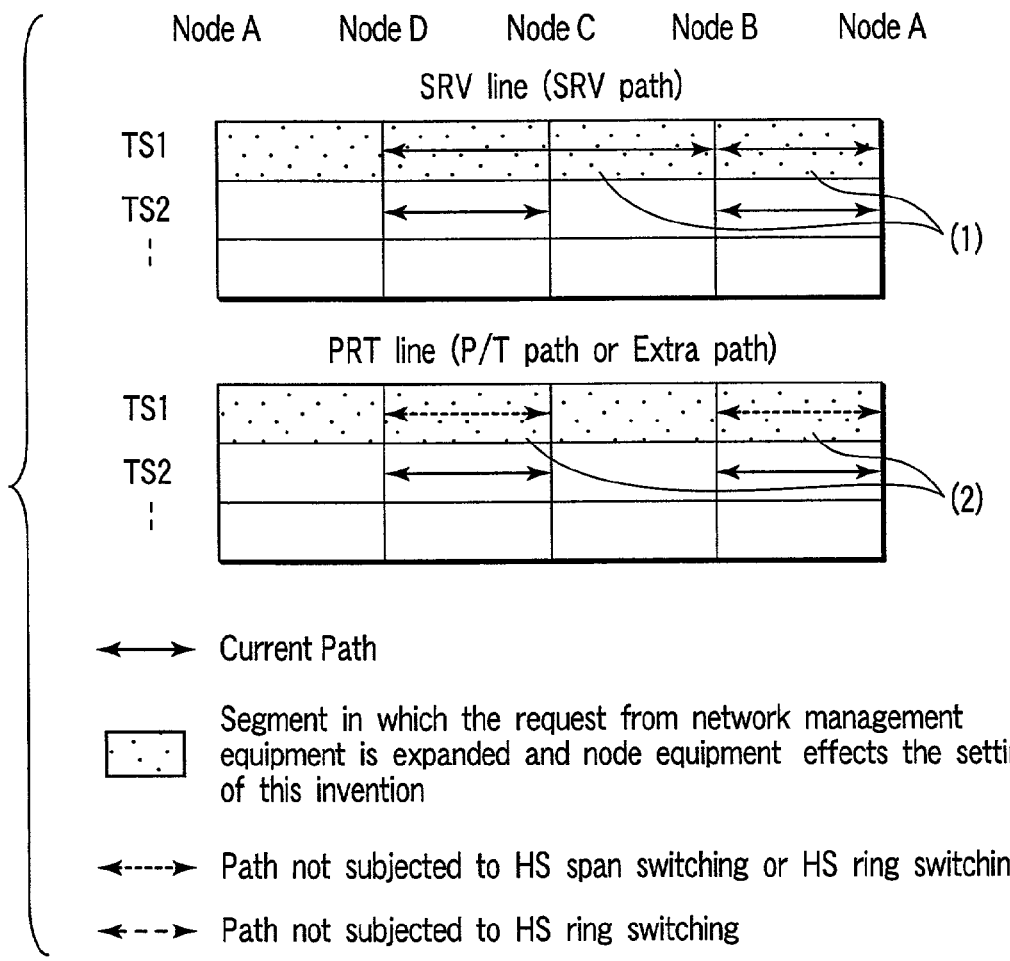
FIG. 62 shows the contents of the setting at node A to node D in the eighth embodiment.

Then, the set request message is received at each of node A to node D. After the necessary processes have been carried out, the setting as shown in FIG. 62 is realized. FIG. 62 shows a case where the setting of the inhibition of switching is expanded not only in the SRV system but also in the PRT system. The restoration of traffic (indicated by reference numeral ①) transmitted via the time slot in which the inhibition of switching by APS has been set is suppressed. This prevents the P/T traffic (indicated by reference numeral ②) from being dropped by both span switching and ring switching related to the path ①. As a result, the priority of service traffic becomes equal to that of the P/T traffic.

FIG. 63 shows the management table 6a of the eighth embodiment. The management table 6a of FIG. 63 has the identical contents with those of the table shown in FIG. 28. The reason for this is that span switching and ring switching are inhibited only in TS1 on the East side and West side of each of all the nodes A to D.

Next, concrete examples of switching control by APS with the above setting will be explained using four cases.

<Case 8-1>

In this case, consider a case where a failure has occurred in the service line SL between node C and node D as shown in FIG. 64. At this time, the path in TS1 is not restored by span switching to the protection system side. In contrast, since the path between node C and node D in TS2 is not inhibited from switching, the path is switched by span switching to the PRT system. That is, the P/T path indicated by reference numeral ② is dropped, whereas the P/T traffic indicated by reference numeral ① is not dropped.

<Case 8-2>

In case 8-2, consider a case where a failure has occurred in the service line SL and protection line PL between node C and node D as shown in FIG. 65. At this time, the service traffic in TS1 is not salvaged. In contrast, the service traffic in TS2 between node C and D is salvaged by ring switching. That is, all the P/T traffic in a segment other than segment CD in TS2 in the PRT system is dropped. Then, the service traffic in TS2 between node C and node D is detoured to the resource in which the R/T traffic has been dropped. That is, the traffic indicated by reference numeral ① is not dropped, whereas the traffic indicated by reference numeral ② is dropped.

<Case 8-3>

In case 8-3, consider a case where a failure has occurred in the service line SL between node A and node B as shown in FIG. 66. At this time, in the path in TS1, the service traffic is not restored by span switching. In contrast, the path in TS2 is not inhibited from APS switching. Therefore, HS span switching is done in TS2, which causes the P/T traffic in TS2 in segment AB to be dropped. This causes the service traffic in TS2 in this segment to be restored to the PRT system, thereby realizing the states shown by reference numerals ① and ②.

<Case 8-4>

Figure 67:
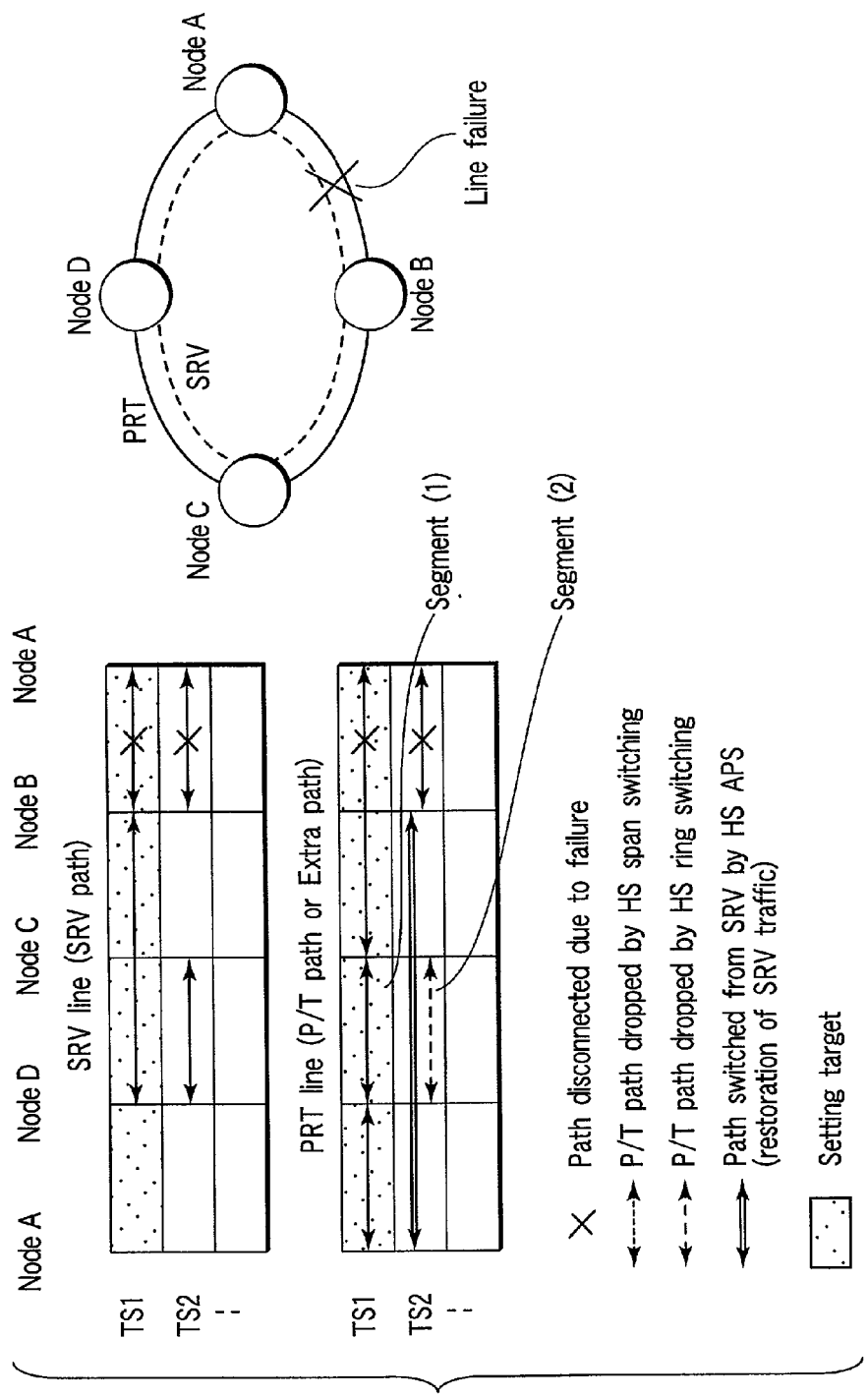
FIG. 67 shows the mode of switching when a failure has occurred in the service line SL and protection line PL between node A and node B in the eighth embodiment.

In case 8-4, consider a case where a failure has occurred in the service line SL and protection line PL between node A and node B as shown in FIG. 67. At this time, the service traffic in TS1 is not salvaged. In contrast, the service traffic in TS2 in segment AB is salvaged by APS switching. Therefore, HS ring switching is effected, which causes the P/T traffic in a segment other than segment AB to be dropped in TS2. Then, the service traffic in TS2 in segment AB is restored to the PRT system. As a result, the states shown by reference numerals ① and ② is realized. That is, the P/T traffic indicated by reference numeral ② is dropped, whereas the P/T traffic indicated by reference numeral ① is not dropped.

<Embodiment to Help Explain the Inhibition of Switching by APS is Set in the Service Line SL and Protection Line PL on a Smallest Unit in the Transmission Resource Basis>

(Ninth Embodiment)

Next, a ninth embodiment of the present invention will be explained. In this embodiment, the inhibition of switching by APS is set in the service line SL and protection line PL on a smallest unit in the transmission resource basis.

In the ninth embodiment, the specifying section 110a specifies a smallest unit in the transmission resource in the service line SL arbitrarily. The management table creating section 110b creates a management table 6a which means that the APS control section 5a is inhibited from detouring to the protection line PL the service traffic set in the smallest unit including the resource specified at the specifying section 110a. In addition, the management table creating section 110b writes in the management table 6a information that any service traffic in the service line SL is inhibited from detouring to the resource on the side of the protection line PL corresponding to the specified unit.

Figure 68:
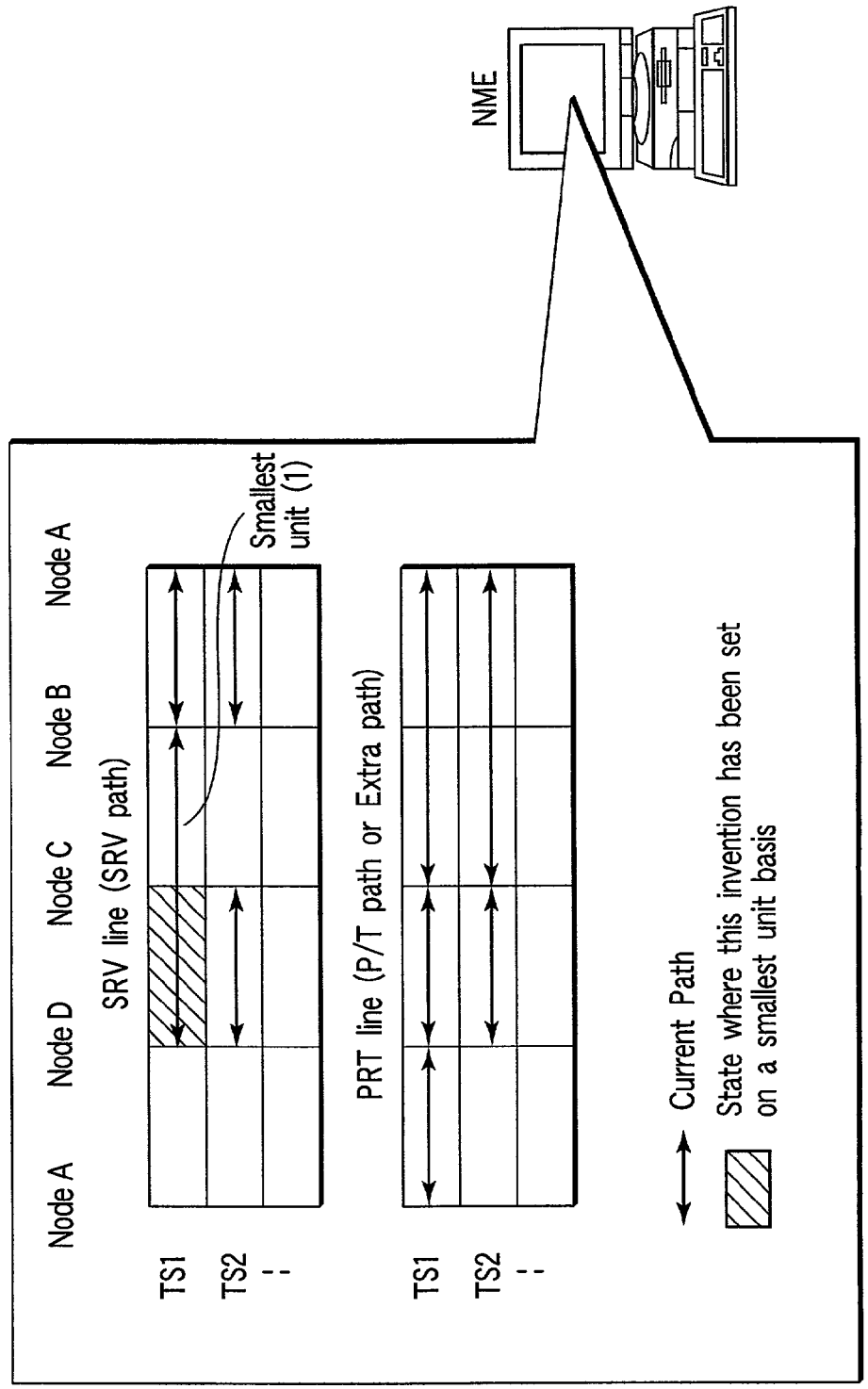
FIG. 68 is an illustration to help explain the operation of the operator in a ninth embodiment of the present invention.

FIG. 68 is an illustration to help explain the operation the operator performs using the display section 25 of the network management equipment 10 in the ninth embodiment. As shown in FIG. 68, the operator specifies an arbitrary transmission path in the SRV system on the screen of the display section 25. Here, the unit (indicated by reference numeral ①) between node B and node C is specified. After this operation, a set request message is sent to each of node A to node D.

Figure 69:
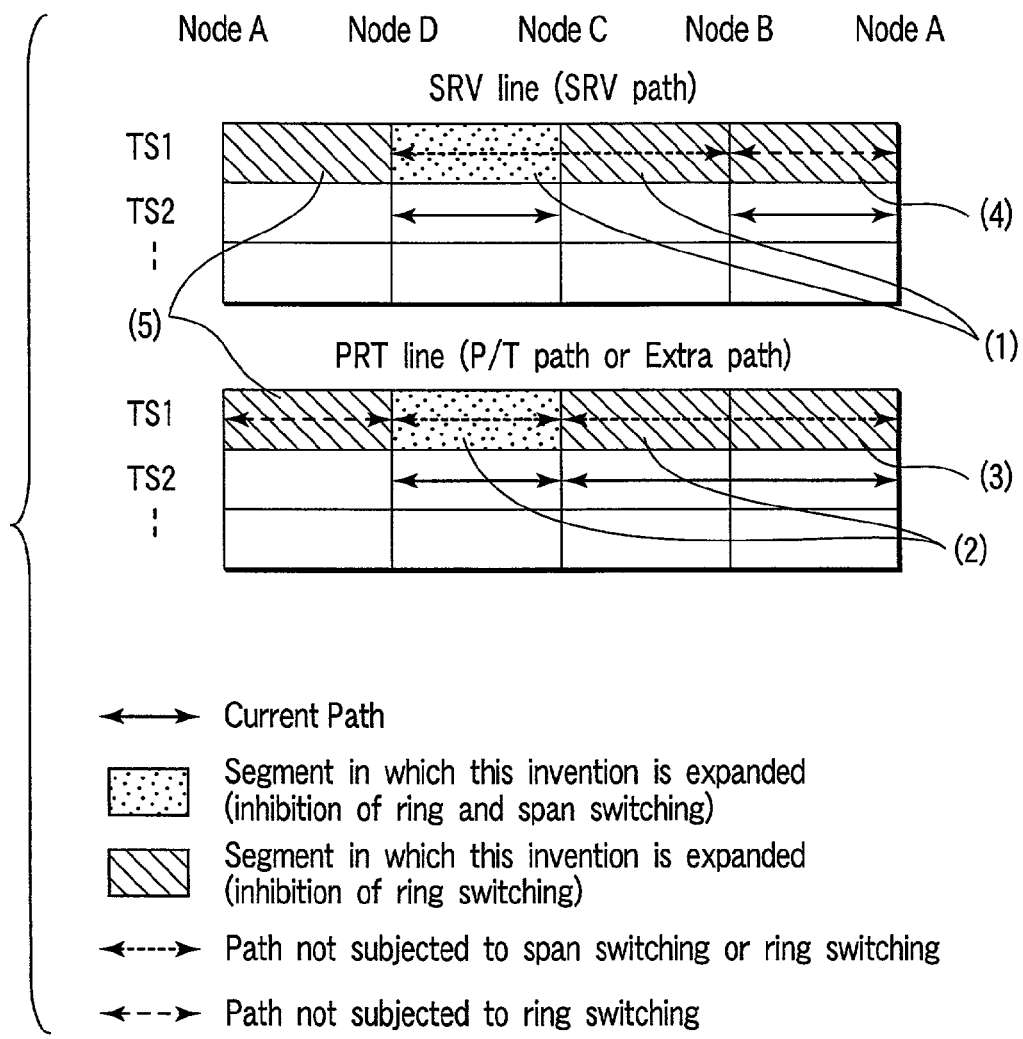
FIG. 69 shows the contents of the setting at node A to node D in the ninth embodiment.

Then, the set request message is received at each of node A to node D. After the necessary processes have been carried out, the setting as shown in FIG. 69 is realized. FIG. 69 shows a case where the setting of the inhibition of switching is expanded not only in the SRV system but also in the PRT system. In FIG. 69, the setting of the inhibition of switching is expanded in the resource of ② making a pair with ①. At this time, when the traffic exists in the resources of ② and ③, the setting of the inhibition of switching is expanded in the resource of ③ as well. Expanding the setting in the resource of ③ causes the setting of the inhibition of switching to be expanded in the resource of ④ as well.

As a result of the above expansions, the traffic related to the resources of ① to ④ are prevented from being dropped by ring switching or span switching. When the traffic exists in the resource of ⑤, the traffic related to the resource of ⑤ is prevented form being dropped by ring switching, since the setting is expanded in the resources of ① to ④. As a result of the above setting, the priority of the service traffic becomes equal to that of the PRT traffic.

In the ninth embodiment, the set request accepting section 5c expands the contents of the management table 6a included in the set request message from the network management equipment. That is, the set request accepting section 5c gives a broad interpretation of the contents of the management table 6a. Thus, the ninth embodiment is characterized in that the memory unit 6 stores the management table 6a having an expanded version of the setting in the network management equipment 10. That is, in the ninth embodiment, the inhibition of switching by APS is set, taking traffic into account.

FIG. 70 shows the management table 6a of the ninth embodiment. Explanation will be given in comparison with FIG. 35. The table of FIG. 70 is the same as that of FIG. 21 83 that span switching and ring switching related to the Ease side of node D, the East side and West side of node C, and the West side of node B are inhibited in TS1. In addition, since the P/T between node B and node D in the PRT system is not dropped, the ring switching is inhibited in TS1 in all the segments. Therefore, in the table of FIG. 70, too, a bit 1 meaning that the ring switching in all the segments is inhibited only in TS1 is written.

Furthermore, the ninth embodiment is characterized in that a bit 1 meaning the inhibition of span switching is written on the East side of node B and on the West side of node A in the table of FIG. 70. This is because the contents of the management table 6a have been expanded at node A to node D and correspond to the contents explained in FIG. 69.

Next, concrete examples of switching control by APS with the above setting will be explained using four cases.

<Case 9-1>

Figure 71:
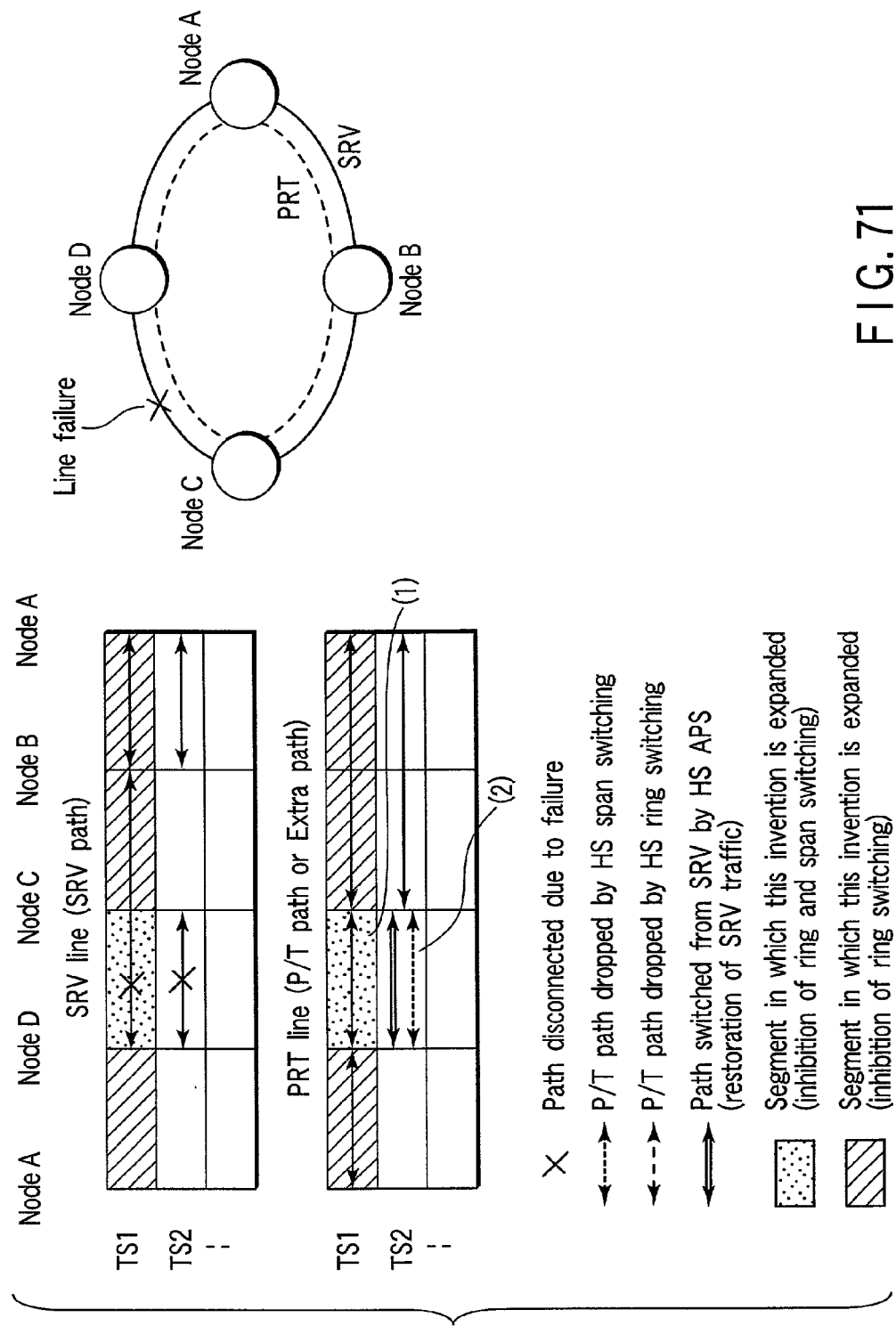
FIG. 71 shows the mode of switching when a failure has occurred in the service line SL between node C and node D in the ninth embodiment.

In this case, consider a case where a failure has occurred in the service line SL between node C and node D as shown in FIG. 71. At this time, the path between node B and node D in TS1 is not restored by span switching. In contrast, since the path between node C and node D in TS2 is not inhibited from switching, it is restored by span switching. Therefore, the transmission route of the service traffic is switched to the PRT system. That is, the P/T path indicated by reference numeral ② is dropped, whereas the P/T traffic (path) indicated by reference numeral ① is not dropped.

<Case 9-2>

Figure 72:
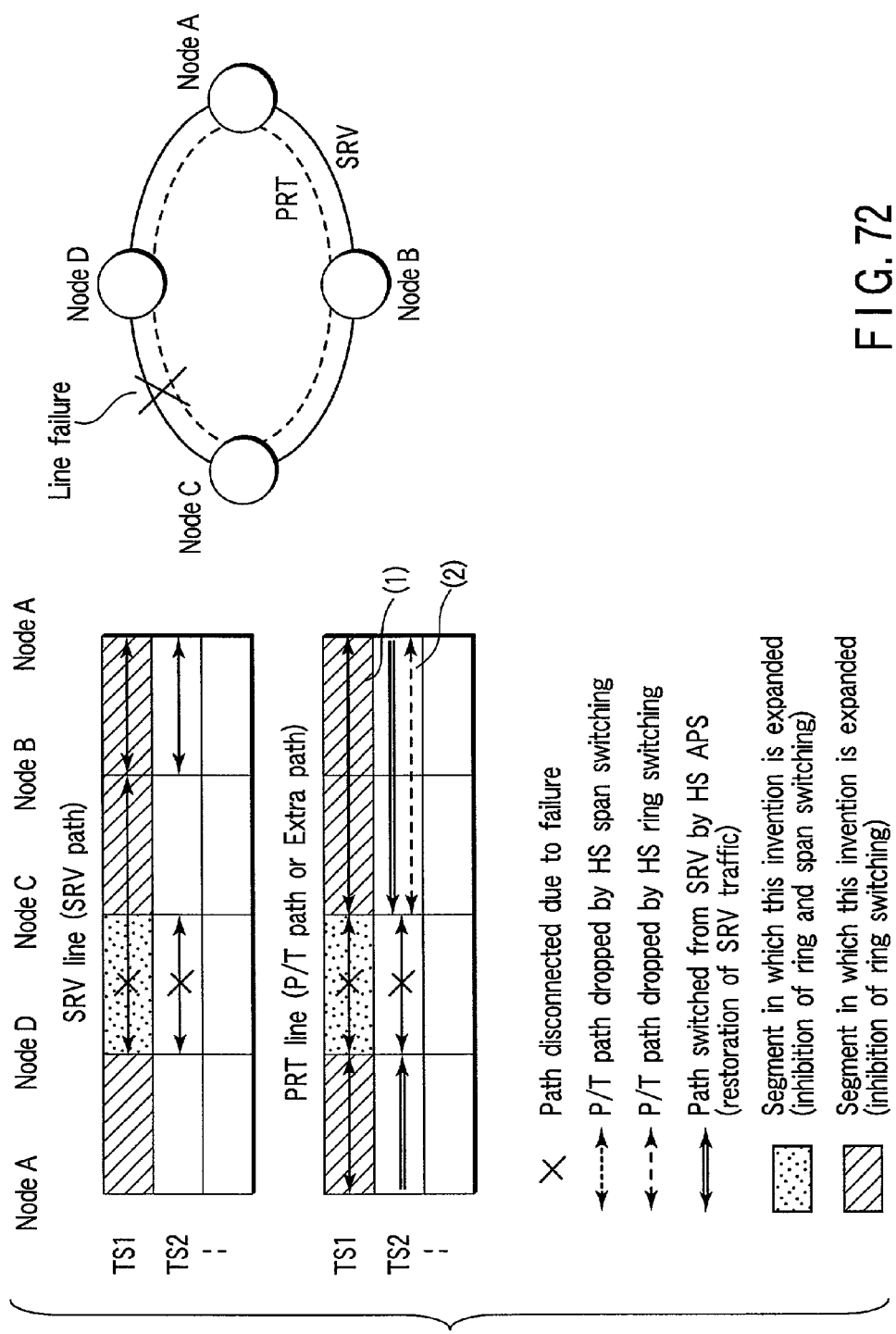
FIG. 72 shows the mode of switching when a failure has occurred in the service line SL and protection line PL between node C and node D in the ninth embodiment.

In case 6-2, consider a case where a failure has occurred in the service line SL and protection line PL between node C and node D as shown in FIG. 72. At this time, the service traffic in TS1 between node B and node D is not salvaged. In contrast, the service traffic in TS2 between node C and node D is salvaged by ring switching. That is, all the traffic in a segment other than the segment CD in the PRT system in TS2 is dropped. Then, the service traffic in TS2 between node C and node D is detoured to the resource in which the P/T traffic has been dropped. That is, the P/T traffic indicated by reference numeral ① is not dropped, whereas the P/T path indicated by reference numeral ② is dropped.

<Case 9-3>

Figure 73:
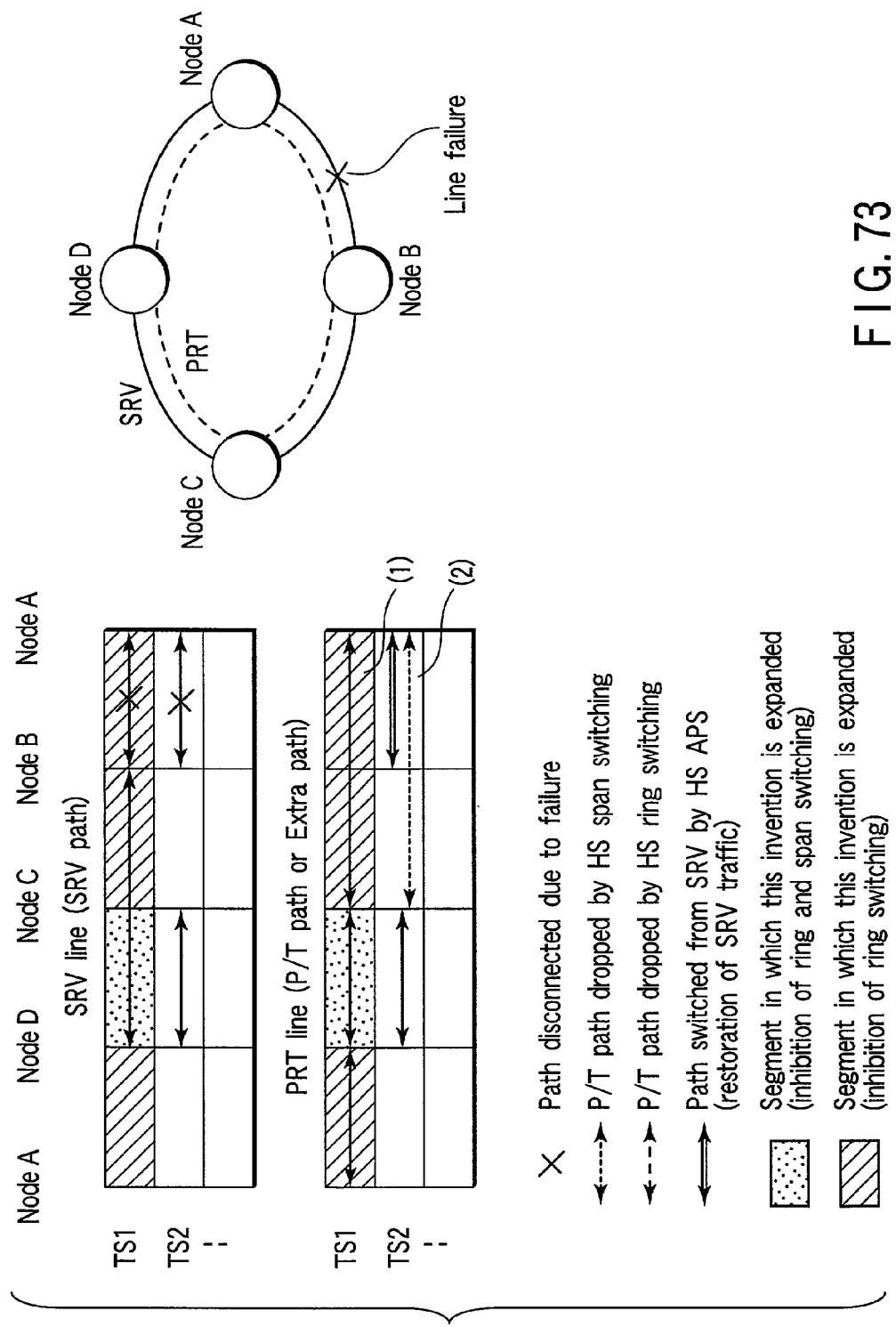
FIG. 73 shows the mode of switching when a failure has occurred in the service line SL between node A and node B in the ninth embodiment.

In case 9-3, consider a case where a failure has occurred in the service line SL between node A and node B as shown in FIG. 73. At this time, since span switching is inhibited in TS1 in segment AB, the P/T traffic between node A and node C in TS1 in the PRT system is not dropped. In contrast, since span switching in TS2 in segment AB is not inhibited, HS span switching is done. This causes the P/T traffic in TS2 in segment AB to be dropped, thereby restoring the service traffic in TS2 in the segment to the PRT system. Therefore, the states shown by reference numerals ① and ② are realized.

<Case 9-4>

Figure 74:
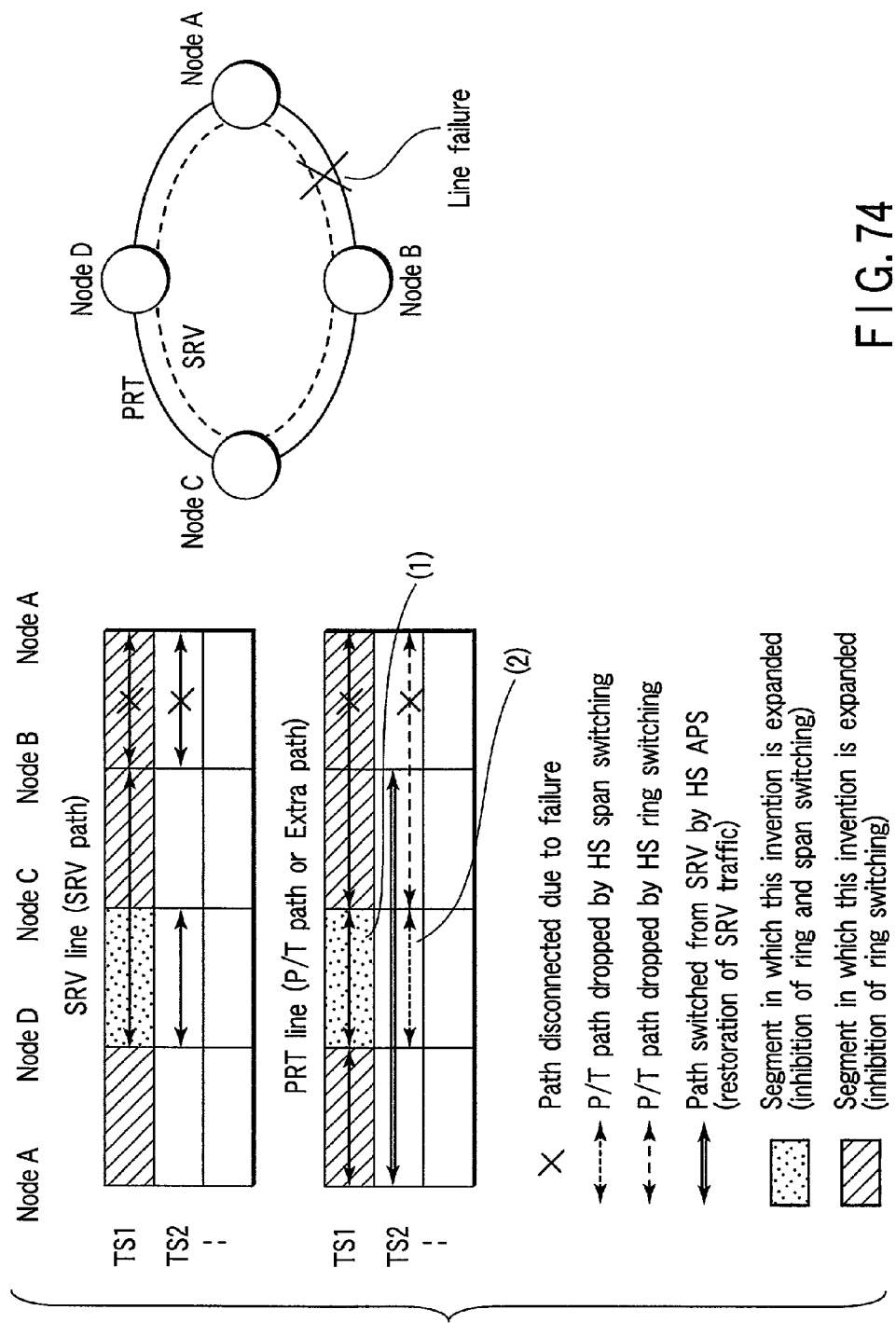
FIG. 74 shows the mode of switching when a failure has occurred in the service line SL and protection line PL between node A and node B in the ninth embodiment.

In case 9-4, consider a case where a failure has occurred in the service line SL and protection line PL between node A and node B as shown in FIG. 74. At this time, since ring switching is inhibited in TS1, the traffic in TS1 in the SRV system does not operate. On the other hand, ring switching in segment AB in TS2 is not inhibited. As a result, HS ring switching is effected, causing the P/T traffic in a segment other than segment AB to be dropped, which restores the service traffic in segment AB to the PRT system. Therefore, the states shown by reference numerals ① and ② are realized.

<Embodiment to Help Explain the Inhibition of Switching by APS is Set in the Protection Line PL on a Segment Basis>

(Tenth Embodiment)

Next, a tenth embodiment of the present invention will be explained. In this embodiment, the inhibition of switching by APS is set in the protection line PL on a segment basis.

In the tenth embodiment, the specifying section 110a specifies a segment in the protection line PL arbitrarily. The management table creating section 110b creates a management table 6a which means that the APS control section 5a is inhibited from detouring to the protection line PL the service traffic in the resource on the service line SL side corresponding to the specified segment.

<Embodiment to Help Explain the Inhibition of Switching by APS is Set in the Protection Line PL on a Transmission Path Basis>

(Eleventh Embodiment)

Next, a eleventh embodiment of the present invention will be explained. In this embodiment, the inhibition of switching by APS is set in the protection line PL on a transmission path basis.

In the eleventh embodiment, the specifying section 110a specifies a transmission path in the protection line PL arbitrarily. The management table creating section 110*b* creates a management table 6*a* which means that the APS control section 5*a* is inhibited from detouring the service traffic to the transmission resource in the P/T or extra traffic set in the specified transmission path.

<Embodiment to Help Explain the Inhibition of Switching by APS is Set in the Protection Line PL on a Timeslot Basis>

(Twelfth Embodiment)

Next, a twelfth embodiment of the present invention will be explained. In this embodiment, the inhibition of switching by APS is set in the protection line PL on a timeslot basis.

In the twelfth embodiment, the specifying section 110*a* specifies a timeslot in the protection line PL arbitrarily. The management table creating section 110*b* creates a management table 6*a* which means that the APS control section 5*a* is inhibited from detouring the service traffic to the transmission resource in the P/T or extra traffic set in the specified timeslot.

<Embodiment to Help Explain the Inhibition of Switching by APS is Set in the Protection Line PL on a Smallest Unit in the Transmission Resource Basis>

(Thirteenth Embodiment)

Next, a thirteenth embodiment of the present invention will be explained. In this embodiment, the inhibition of switching by APS is set in the protection line PL on a smallest unit in the transmission resource basis.

<Embodiment to Help Explain the Inhibition of Switching by APS is Set in the Service Line SL and Protection Line PL on a Segment Basis>

(Fourteenth Embodiment)

Next, a fourteenth embodiment of the present invention will be explained. In this embodiment, the inhibition of switching by APS is set in the service line SL and protection line PL on a segment basis.

In the fourteenth embodiment, the specifying section 110*a* specifies a segment path in the protection line PL arbitrarily. The management table creating section 110*b* creates a management table 6*a* which means that the APS control section 5*a* is inhibited from detouring the service traffic to the transmission resource in the P/T or extra traffic set in the specified segment. In addition, the management table creating section 110*b* writes in the management table 6*a* information that the APS control section 5*a* is inhibited from detouring to the protection line PL the service traffic in the resource on the service line SL side corresponding to the specified segment.

<Embodiment to Help Explain the Inhibition of Switching by APS is Set in the Service Line SL and Protection Line PL on a Transmission Path Basis>

(Fifteenth Embodiment)

Next, an fifteenth embodiment of the present invention will be explained. In the fifteenth embodiment, the inhibition of switching by APS is set in the service line SL and protection line PL on a transmission path basis.

In the fifteenth embodiment, the specifying section 110*a* specifies a transmission path in the protection line PL arbitrarily. The management table creating section 110*b* creates a management table 6*a* which means that the APS control section 5*a* is inhibited from detouring the service traffic to the transmission resource in the P/T or extra traffic set in the specified transmission path. In addition, the management table creating section 110*b* writes in the management table 6*a* information that the APS control section 5*a* is inhibited from detouring to the protection line PL the service traffic in the resource on the service line SL side corresponding to the specified path.

Figure 75:
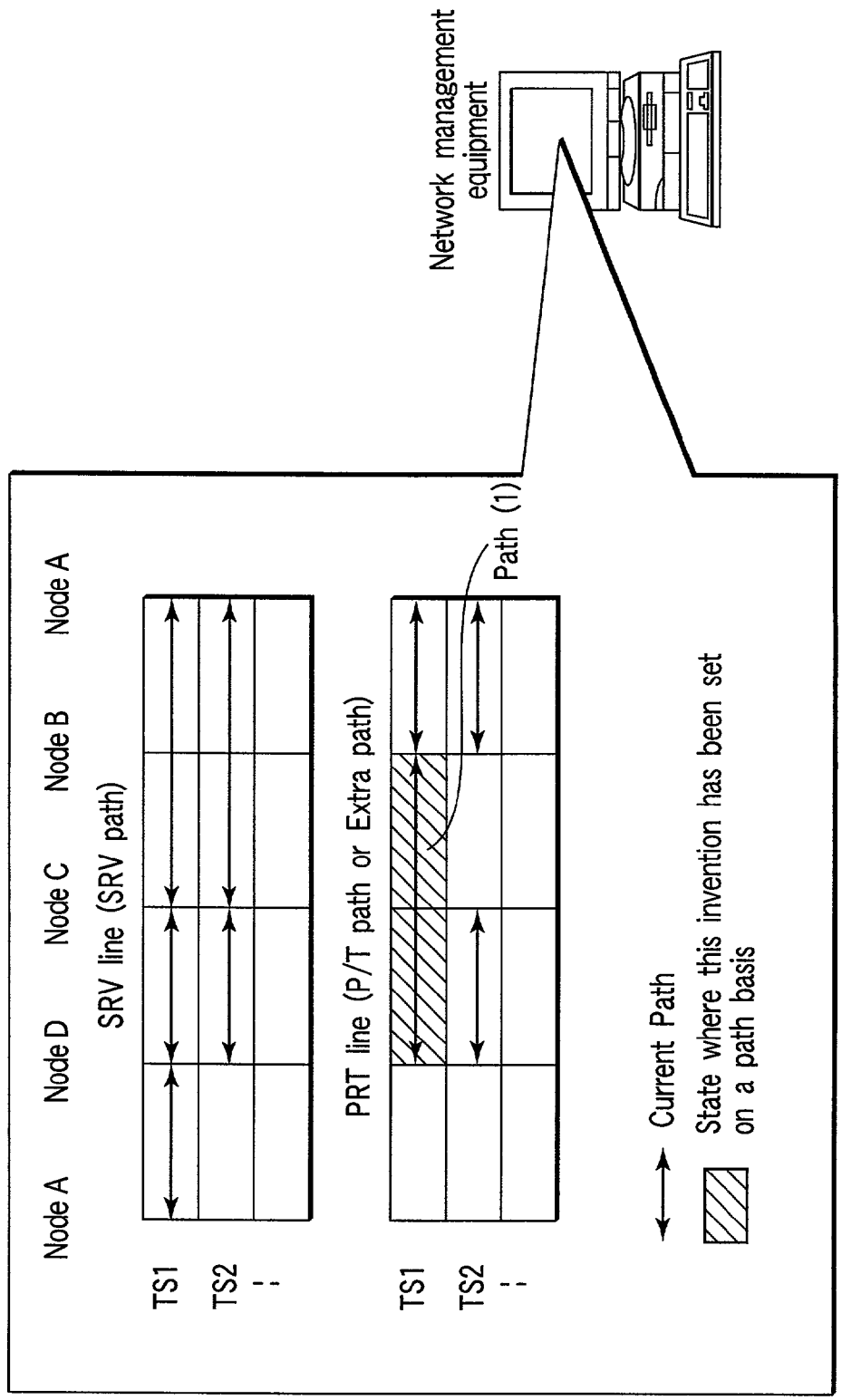
FIG. 75 is an illustration to help explain the operation of the operator in an fifteenth embodiment of the present invention.

FIG. 75 is an illustration to help explain the operation the operator performs using the display section 25 of the network management equipment 10 in the fifteenth embodiment. As shown in FIG. 75, the operator specifies an arbitrary transmission path in the PRT system on the screen of the display section 25. Here, the path (indicated by reference numeral ①) in time slot 1 between node B and node D is specified. After this operation, a set request message is sent to each of node A to node D.

Figure 76:
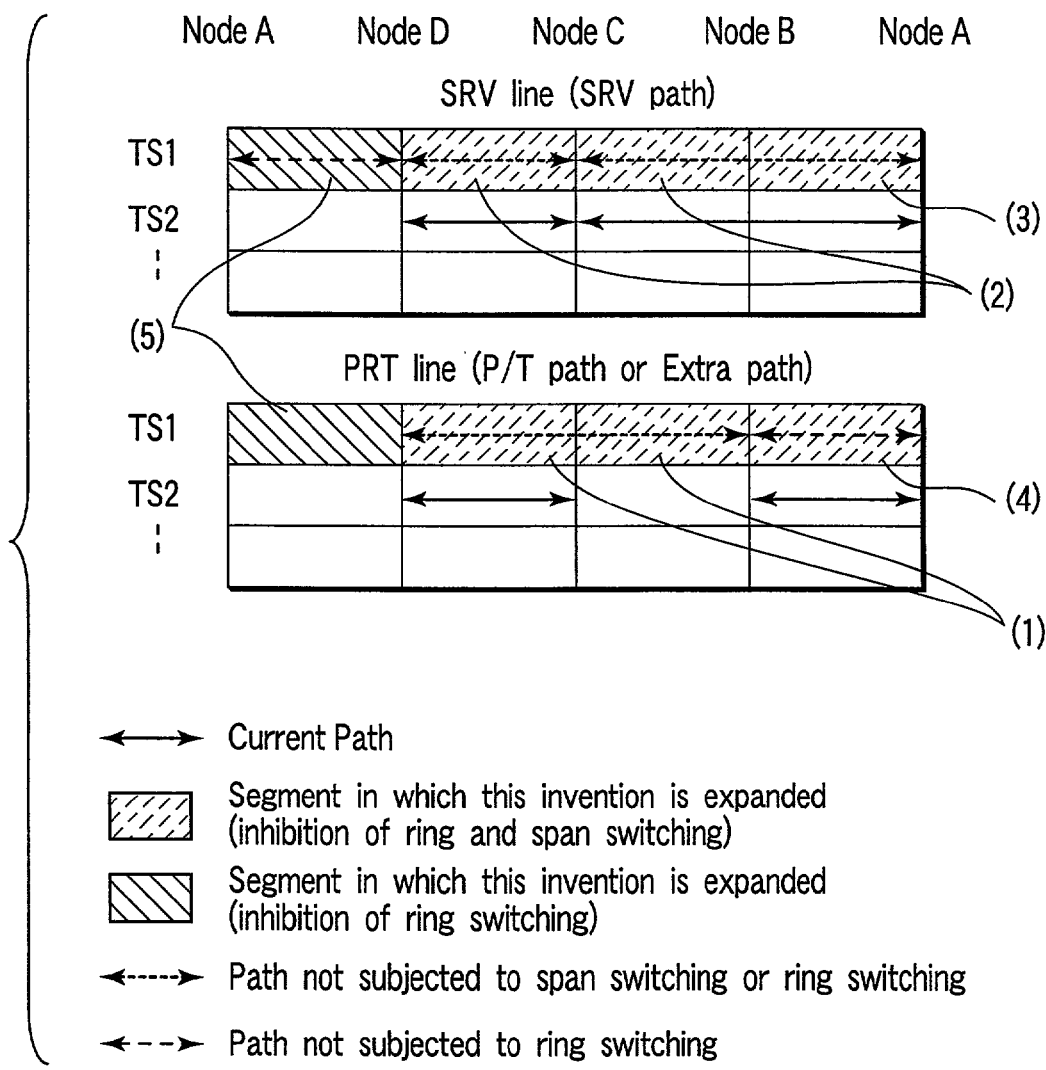
FIG. 76 shows the contents of the setting at node A to node D in the fifteenth embodiment.

Then, the set request message is received at each of node A to node D. After the necessary processes have been carried out, the setting as shown in FIG. 76 is realized. FIG. 76 shows a case where the setting of the inhibition of switching is expanded not only in the SRV system but also in the PRT system. In FIG. 76, the setting of the inhibition of switching is expanded in the resource with reference numeral ② making a pair with reference numeral ①. At this time, when the traffic transmitted via the resources with reference numerals ② and ③ has been present, the setting of the inhibition of switching is also expanded horizontally in the resource with reference numeral ③. Expanding the setting on the resource with reference numeral ③ causes the setting of the inhibition of switching to be expanded in the resource with reference numeral ④ as well.

As a result of the above expansions, the traffic transmitted via the resources of ① to ④ are prevented from being dropped by ring switching or span switching. Since the setting is expanded in the resources of ① to ④, when the traffic that transmits the resource of ⑤ has been present, this traffic is prevented from being dropped by ring switching. As a result of the above setting, the priority of the service traffic becomes equal to that of the PRT traffic.

In the fifteenth embodiment, the set request accepting section 5*c* expands the contents of the management table 6*a* included in the set request message from the network management equipment 10. That is, the set request accepting section 5*c* gives a broad interpretation of the contents of the management table 6*a*. Thus, the fifteenth embodiment is characterized in that the memory unit 6 stores the management table 6*a* having an expanded version of the setting in the network management equipment 10. Therefore, the inhibition of switching by APS is set, taking traffic into account.

The contents of the management table 6*a* in the fifteenth embodiment are the same as in FIG. 49.

Next, concrete examples of switching control by APS with the above setting will be explained using four cases.

<Case 15-1>

Figure 77:
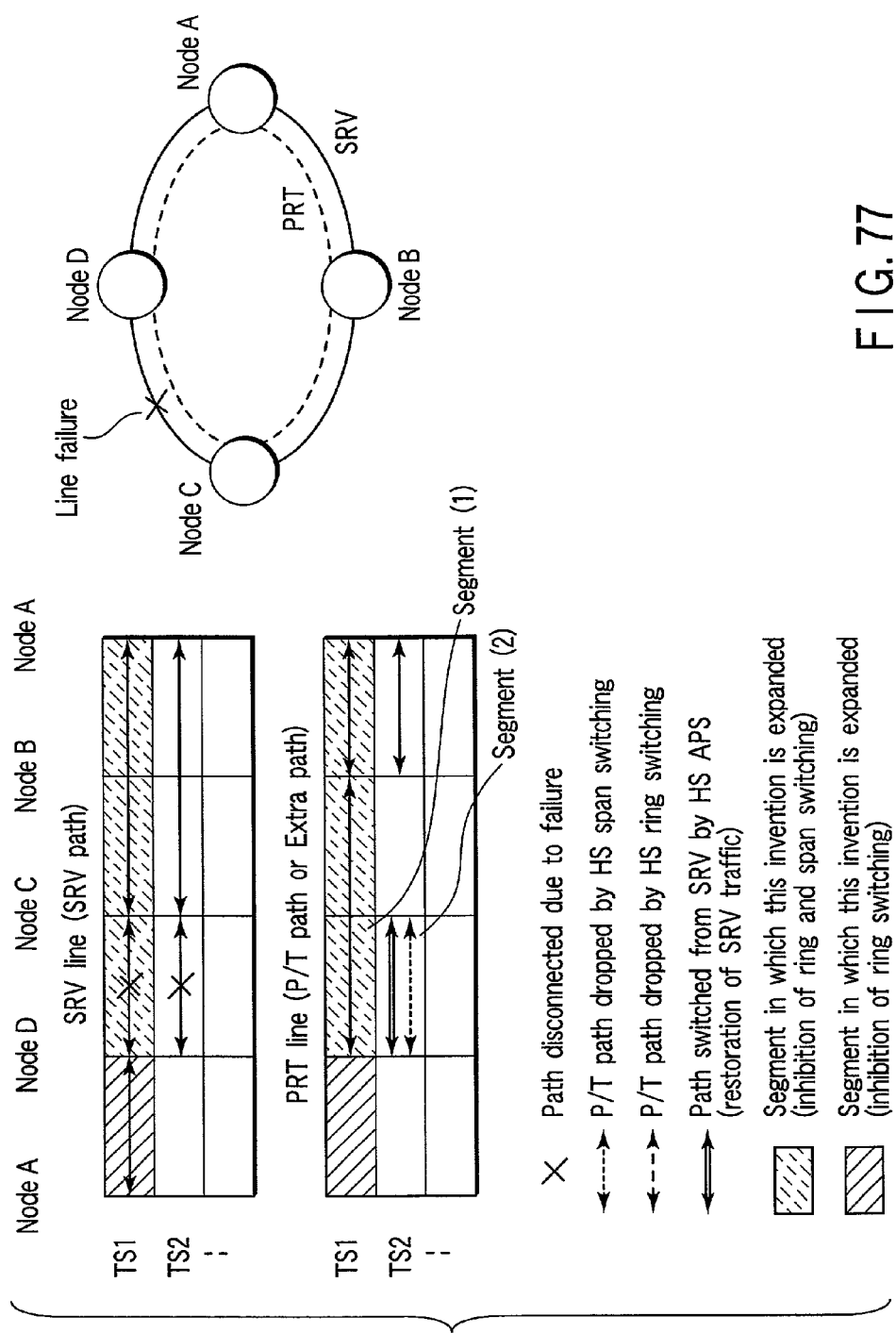
FIG. 77 shows the mode of switching when a failure has occurred in the service line SL between node C and node D in the fifteenth embodiment.

In this case, consider a case where a failure has occurred in the service line SL between node C and node D as shown in FIG. 77. At this time, the path between node B and node D in TS1 is not restored by span switching. In contrast, the path between node C and node D in TS2 is not inhibited from switching. Thus, the service traffic is restored by span switching to the PRT system. That is, the P/T path indicated by reference numeral ② is dropped, whereas the P/T traffic (path) indicated by reference numeral ① is not dropped.

<Case 15-2>

Figure 78:
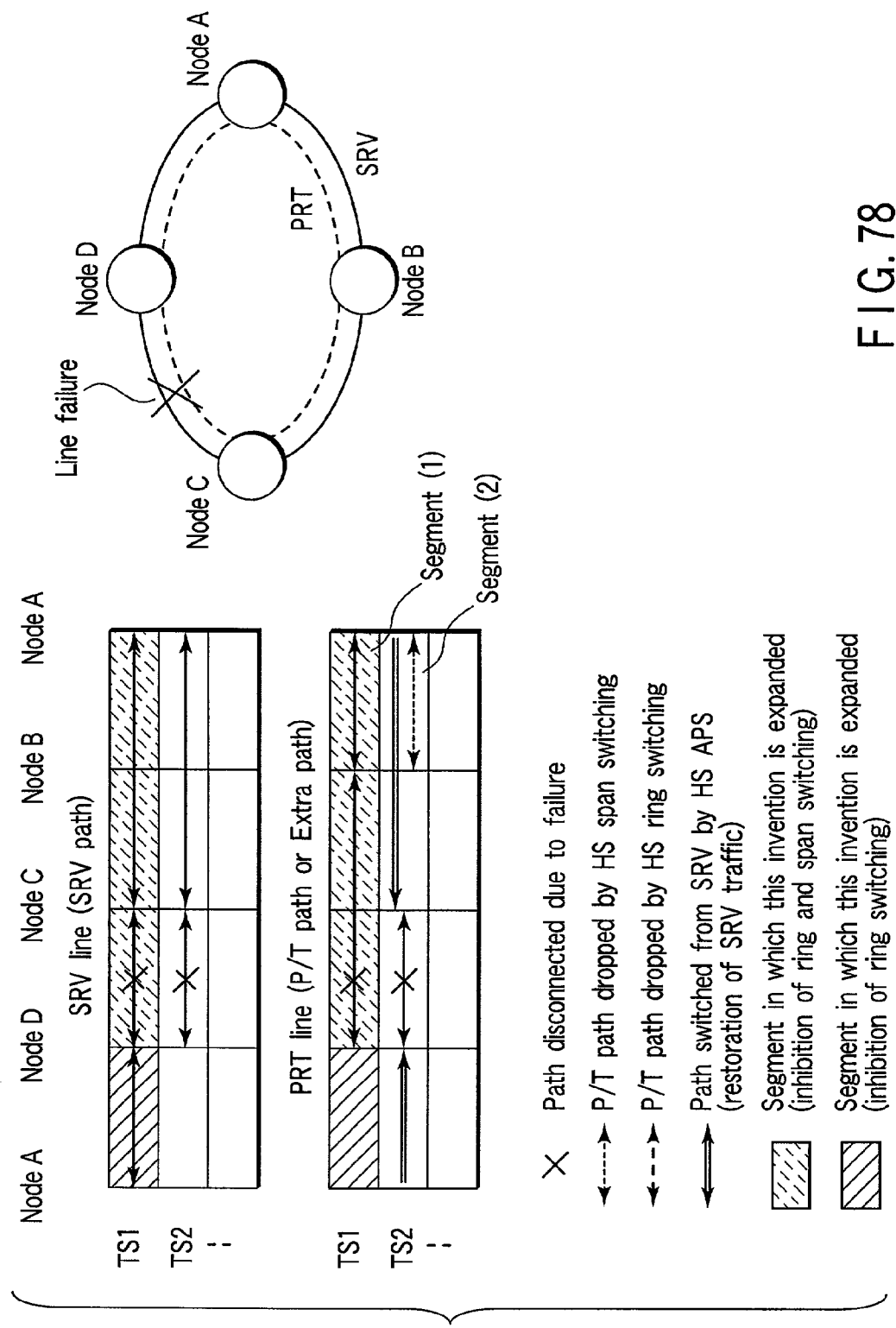
FIG. 78 shows the mode of switching when a failure has occurred in the service line SL and protection line PL between node C and node D in the fifteenth embodiment.

In case 15-2, consider a case where a failure has occurred in the service line SL and protection line PL between node C and node D as shown in FIG. 78. At this time, the service traffic in TS1 between node C and node D is not salvaged. In contrast, the service traffic in TS2 between node C and node D is salvaged by ring switching. That is, all the P/T traffic in a segment other than segment CD in TS2 in the PRT system is dropped. Then, the service traffic in TS2 between node C and node D is detoured to the resource in which the P/T traffic has been dropped. That is, the traffic indicated by reference numeral (1) is not dropped, whereas the path indicated by reference numeral (2) is dropped.

<Case 15-3>

Figure 79:
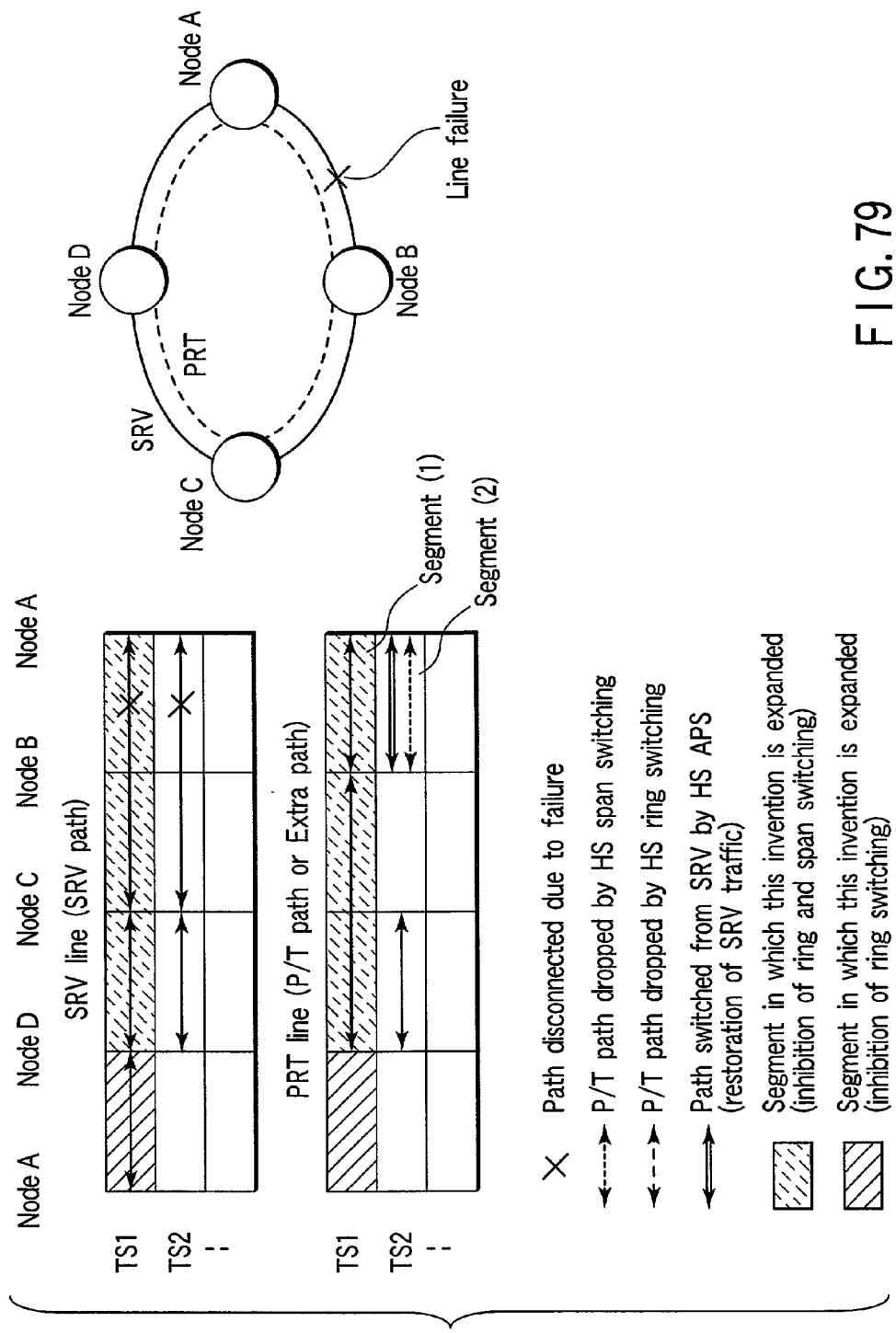
FIG. 79 shows the mode of switching when a failure has occurred in the service line SL between node A and node B in the fifteenth embodiment.

In case 15-3, consider a case where a failure has occurred in the service line SL between node A and node B as shown in FIG. 79. At this time, span switching in TS1 in segment AB is inhibited. Thus, the P/T traffic between node A and node B in TS1 in the PRT system is not dropped. In contrast, since span switching in TS2 in segment AB is not inhibited, HS span switching is done. This causes the P/T traffic in TS2 in segment AB to be dropped, thereby restoring the service traffic in TS2 in the segment to the PRT system. As a result, the states shown by reference numerals (1) and (2) are realized.

<Case 15-4>

Figure 80:
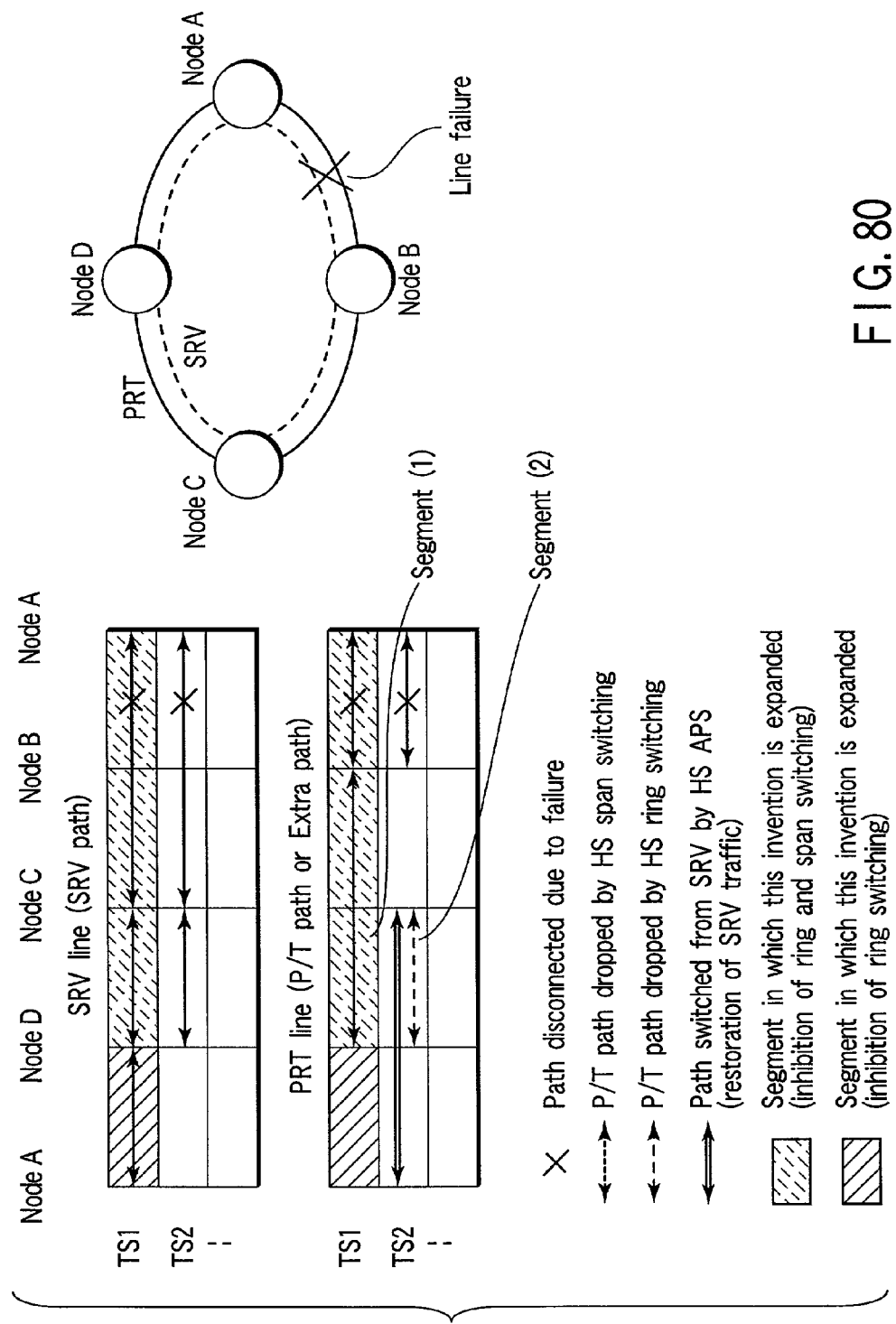
FIG. 80 shows the mode of switching when a failure has occurred in the service line SL and protection line PL between node A and node B in the fifteenth embodiment.

In case 15-4, consider a case where a failure has occurred in the service line SL and protection line PL between node A and node B as shown in FIG. 80. At this time, since ring switching is inhibited in TS1, the traffic in TS1 in the SRV system does not operate. On the other hand, ring switching in segment AB in TS2 is not inhibited. Thus, HS ring switching is effected. Then, the P/T traffic in a segment other than segment AB is dropped, which restores the service traffic in segment AB to the PRT system. As a result, the states shown by reference numerals (1) and (2) are realized.

(Sixteenth Embodiment)

Next, a sixteenth embodiment of the present invention will be explained. In this embodiment, the inhibition of switching by APS is set in the service line SL and protection line PL on a transmission path basis.

In the embodiment, the specifying section 110a specifies a transmission path in the protection line PL arbitrarily. The management table creating section 110b creates a management table 6a which means that the APS control section 5a is inhibited from detouring to the protection line PL the service traffic set in the transmission path specified at the specifying section 110. In addition, the management table creating section 110b writes in the management table 6a information that any service traffic in the service line SL is inhibited from detouring to the resource on the protection line PL side corresponding to the specified transmission line.

In this embodiment, the inhibition of switching by APS is set, taking no account of traffic. On the other hand, in the fifteenth embodiment, the inhibition of switching by APS is set, taking traffic into account. In this respect, they differ.

Figure 81:
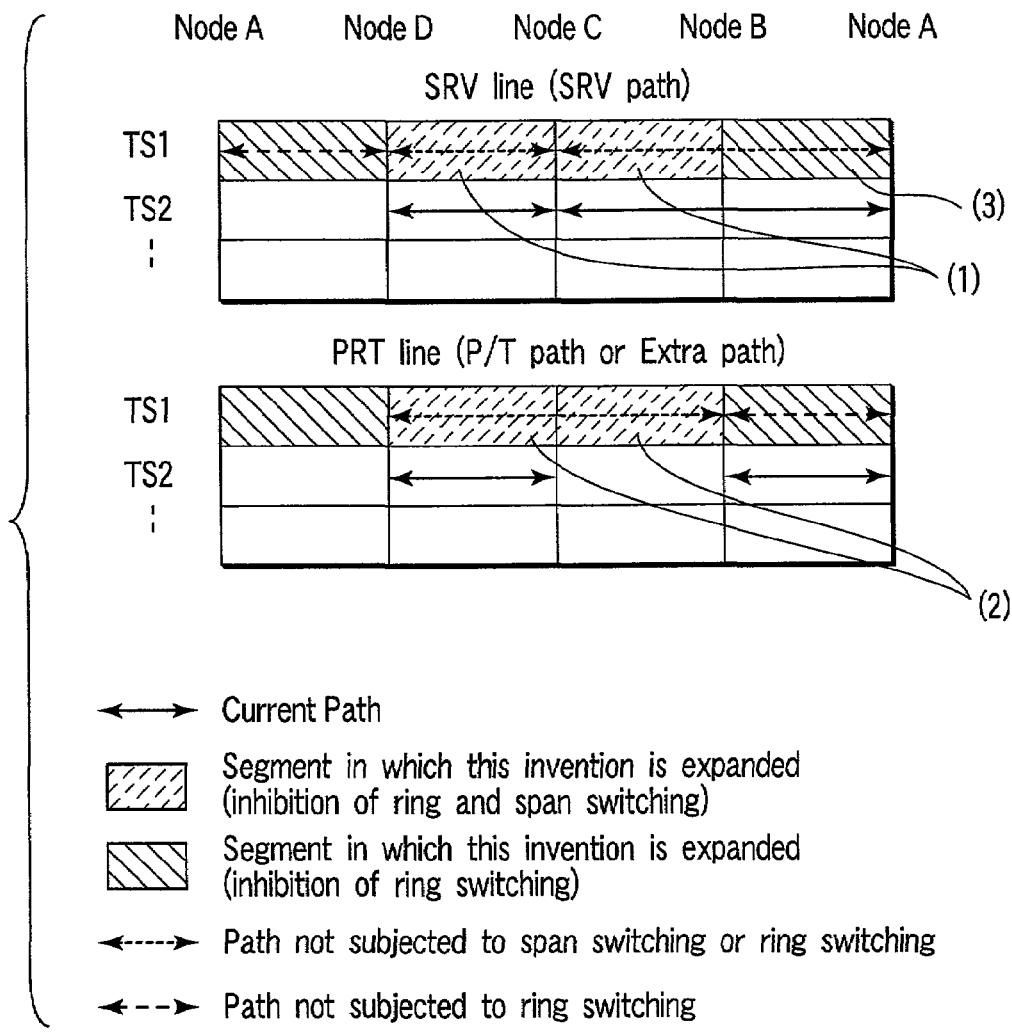
FIG. 81 shows the contents of the setting at node A to node D in the sixteenth embodiment.

Specifically, in this embodiment, as shown in FIG. 81, the setting of the inhibition of switching is expanded in the resource with reference numeral (1) making a pair with reference numeral (2). In this respect, the embodiment is the same as the fifteenth embodiment. In the embodiment, however, although the traffic exists in the resources of (1) and (3), the setting of the inhibition of switching is not expanded horizontally in the resource of (3). Therefore, span switching is permitted to the resource of (3).

To sum up, the traffic transmitted via the resources of (1) and (2) is prevented from being dropped by ring switching or span switching. The traffic transmitted via the resource of (3) is prevented from being dropped by ring switching but is allowed to be dropped by span switching. As a result of the above setting, the priority of the service traffic becomes equal to that of the PRT traffic.

In this embodiment, the operation the operator performs using the display section 25 of the network management equipment 10 is the same as in FIG. 75. After this operation, a set request message is sent to each of node A to node D.

Figure 82:
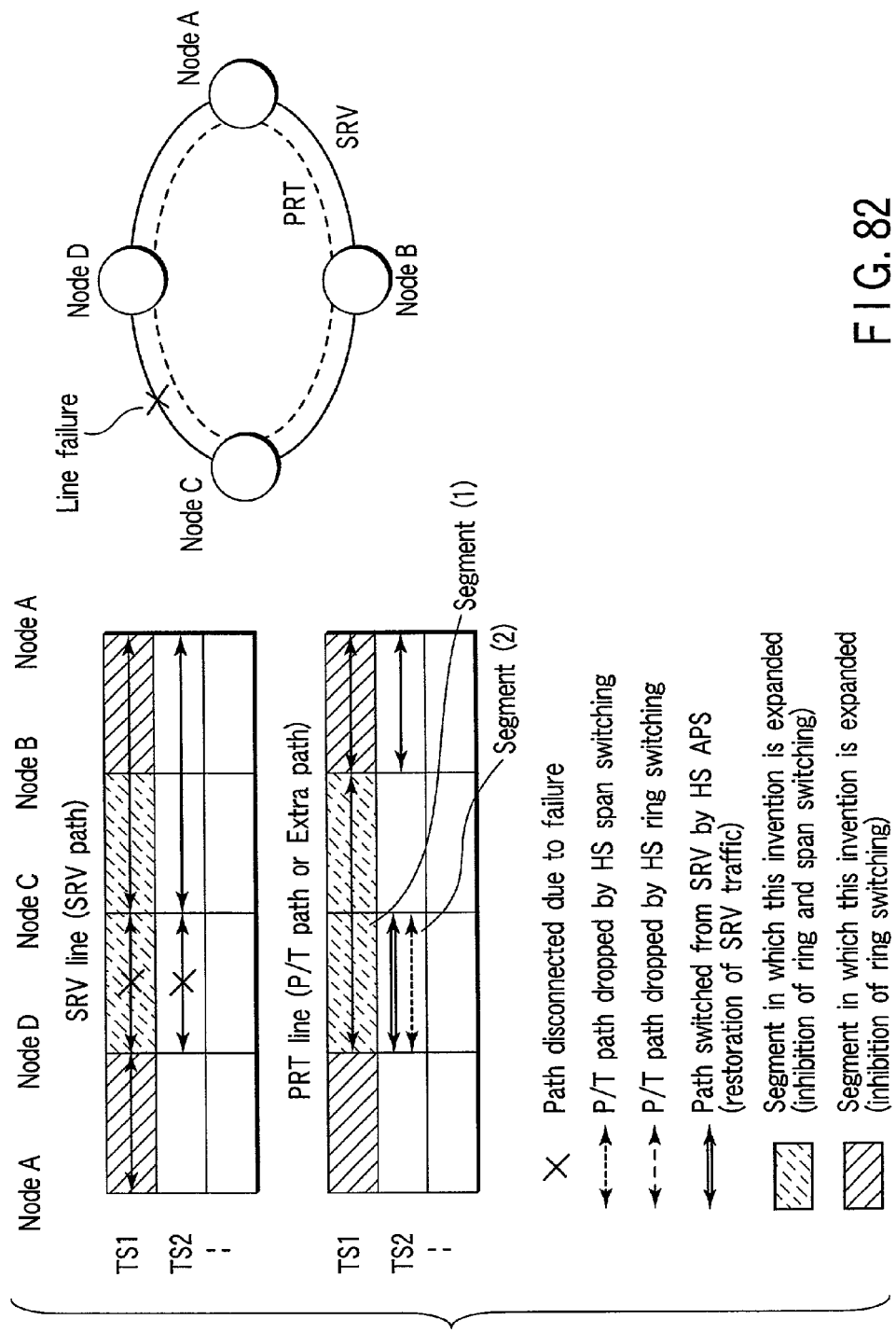
FIG. 82 shows the mode of switching when a failure has occurred in the service line SL between node C and node D in the sixteenth embodiment.

Then, the set request message is received at each of node A to node D. After the necessary processes have been carried out, the setting as shown in FIG. 81 is realized. FIG. 81 shows a case where the setting of the inhibition of switching is expanded not only in the SRV system but also in the PRT system. In FIG. 82, the setting of the inhibition of switching is expanded in the resource with reference numeral (1) making a pair with reference numeral (2). At this time, when the traffic is present in the resources with reference numerals (1) and (3), the setting of the inhibition of switching is not expanded in the resource with reference numeral (3). The above expansion prevents the traffic transmitting the segments of (1) and (2) from being dropped by span switching.

Next, concrete examples of switching control by APS with the above setting will be explained using four cases.

<Case 16-1>

In this case, consider a case where a failure has occurred in the service line SL between node C and node D as shown in FIG. 82. At this time, the traffic flowing through the path between node C and node D in TS1 is not restored to the PRT system side by span switching. In contrast, the path between node C and node D in TS2 is not inhibited from switching. Thus, the service traffic is switched to the PRT system side by span switching. That is, the P/T path of (2) is dropped, whereas the P/T traffic (path) of (1) is not dropped.

<Case 16-2>

Figure 83:
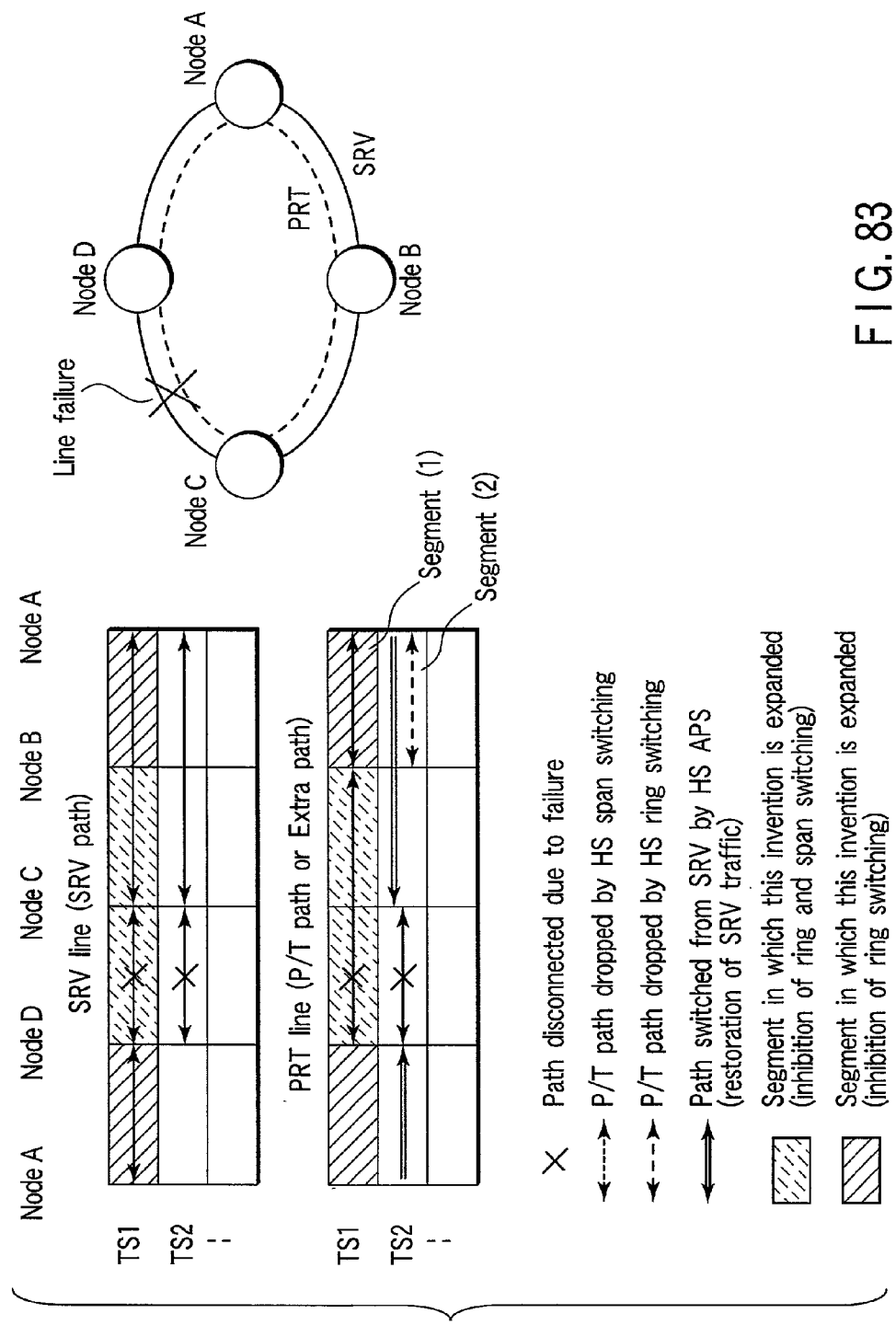
FIG. 83 shows the mode of switching when a failure has occurred in the service line SL and protection line PL between node C and node D in the sixteenth embodiment.

In case 16-2, consider a case where a failure has occurred in the service line SL and protection line PL between node C and node D as shown in FIG. 83. At this time, the service traffic in TS1 between node C and node D is not salvaged. In contrast, the service traffic in TS2 between node C and node D is subjected to ring switching. That is, all the P/T traffic in a segment other than segment CD in TS2 in the PRT system is dropped. Then, the service traffic in TS2 between node C and node D is detoured to the resource in which the P/T traffic has been dropped. That is, the traffic of (1) is not dropped, whereas the traffic of (2) is dropped.

<Case 16-3>

Figure 84:
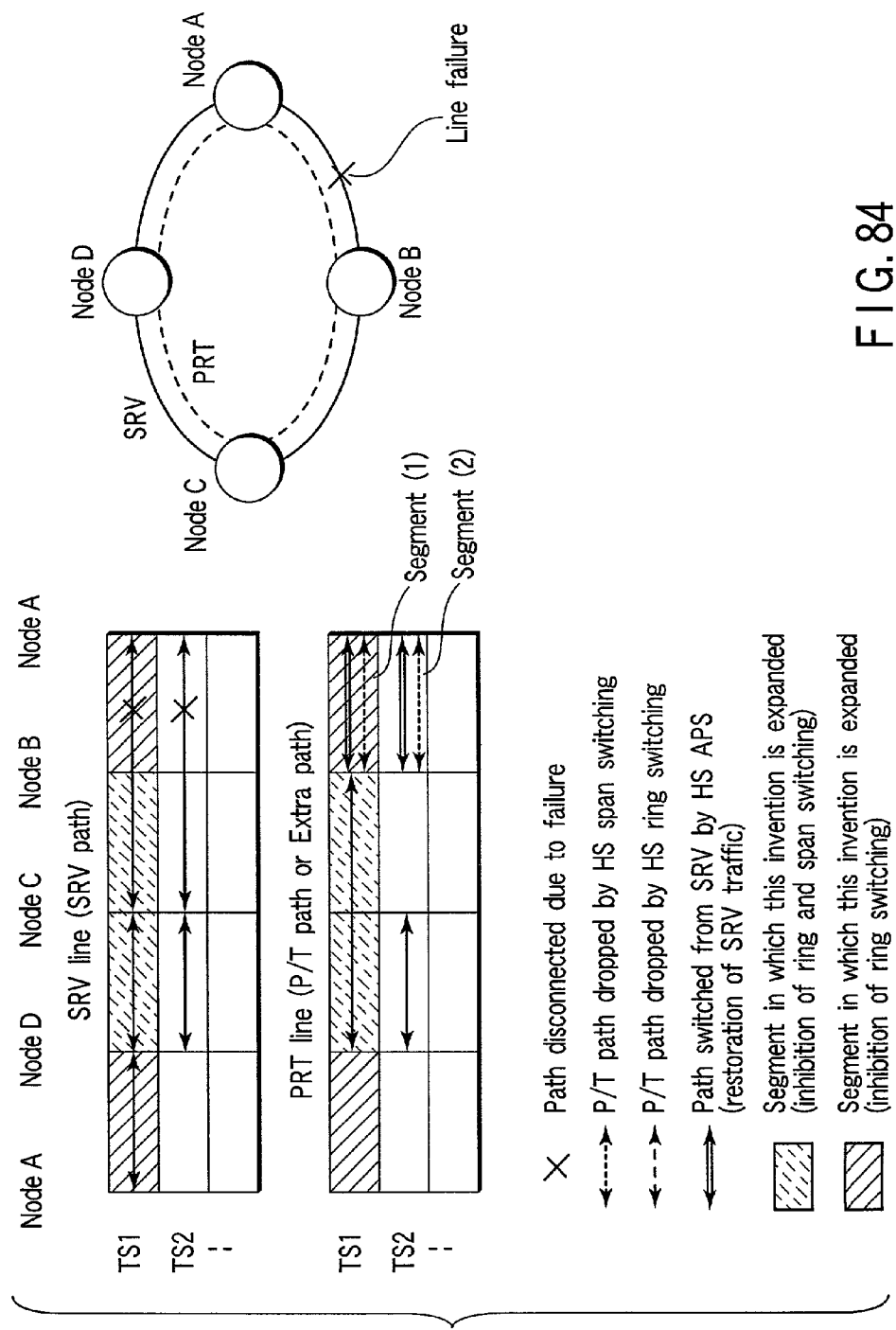
FIG. 84 shows the mode of switching when a failure has occurred in the service line SL between node A and node B in the sixteenth embodiment.

In case 16-3, consider a case where a failure has occurred in the service line SL between node A and node B as shown in FIG. 84. At this time, span switching in TS1 in segment AB is not inhibited. Thus, HS span switching is done. The P/T traffic in TS1 in segment AB is dropped, thereby restoring the service traffic in TS1 in the segment to the PRT system. In addition, span switching in TS2 in segment AB is not inhibited either. Therefore, HS span switching is effected. The P/T traffic in TS2 in the segment AB is dropped, thereby restoring the service traffic in T2 in the segment to the PRT system. In this way, the restoration states shown by reference numerals (1) and (2) are realized.

<Case 16-4>

Figure 85:
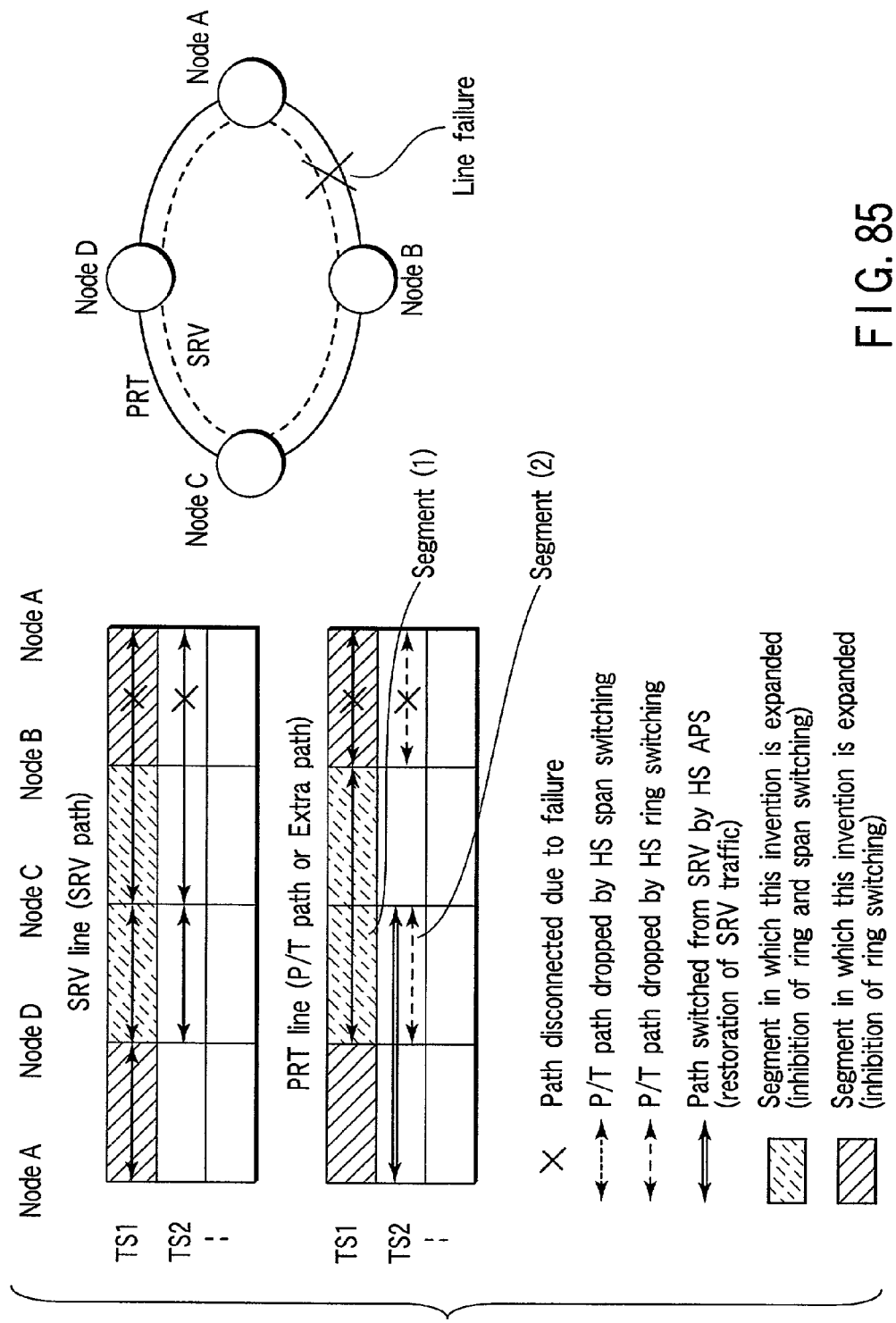
FIG. 85 shows the mode of switching when a failure has occurred in the service line SL and protection line PL between node A and node B in the sixteenth embodiment.

In case 16-4, consider a case where a failure has occurred in the service line SL and protection line PL between node A and node B as shown in FIG. 85. At this time, since ring switching is inhibited in TS1, the traffic in TS1 in the SRV system does not operate. On the other hand, ring switching in segment AB in TS2 is not inhibited. Thus, HS ring switching is effected, causing the P/T traffic in a segment other than segment AB to be dropped. Then, the service traffic in the segment AB is restored to the PRT system. As a result, the states shown by reference numerals (1) and (2) are realized.

<Embodiment to Help Explain the Inhibition of Switching by APS is Set in the Service Line SL and Protection Line PL on a Timeslot Basis>

(Seventeenth Embodiment)

Next, a seventeenth embodiment of the present invention will be explained. In this embodiment, the inhibition of switching by APS is set in the service line SL and protection line PL on a time slot basis.

In the seventeenth embodiment, the specifying section 110a specifies a timeslot in the protection line PL arbitrarily. The management table creating section 110b creates a management table 6a which means that the APS control section 5a is inhibited from detouring the service traffic to the transmission resource in the P/T or extra traffic set in the specified timeslot. In addition, the management table creating section 110b writes in the management table 6a information that the APS control section 5a is inhibited from detouring to the protection line PL the service traffic in the resource on the service line SL side corresponding to the specified timeslot.

<Embodiment to Help Explain the Inhibition of Switching by APS is Set in the Service Line SL and Protection Line PL on a Smallest Unit in the Transmission Resource Basis>

(Eighteenth Embodiment)

Next, a eighteenth embodiment of the present invention will be explained. In this embodiment, the inhibition of switching by APS is set in the service line SL and protection line PL on a smallest unit in the transmission resource basis.

As described above, with the fifteenth embodiment, each of the nodes A to D is caused to store the management table 6a which shows whether to inhibit any resource in the system from being switched by APS or allow it to be switched. In addition, each of the nodes A to D is provided with not only the APS control section 5a serving to realize the APS function but also the switching inhibit control section 5b which partially inhibits the switching process of the APS control section 5a on the basis of the management table 6a and the set request accepting section 5c which accepts a set request message including the management table 6a, interprets the management table included in the message, and creates a management table 6a to be stored in the memory unit 6.

Therefore, it is possible to provide more flexibility in management. The present invention is not limited to the above embodiments.

For example, in each of the embodiments, the systems complying with SDH have been described. The idea of the present invention, however, is not restricted to SDH and may be applied to, for example, SONET (Synchronous Optical Network), an ANSI (American National Standards Institute) standard.

When persons having ordinary skill in the art implement nodes complying with Recommendation G. 841, nodes that cause TAS (2-0, 2-1) to carry out an Add/Drop process using electric signals (hereinafter, referred to as ADM (Add Drop Multiplexer)) are widely used at present. In the future, however, nodes that carry out an Add/Drop process in an optical signal region (hereinafter, referred to as OADM (Optical Add Drop Multiplexer)) are expected to be widely used.

The ADM uses each time-division-multiplexed slot as a path, whereas the OADM uses a wavelength-division-multiplexed optical signal of each wavelength as a path. This is the point where the ADM and OADM basically differs. Specifically, the ADM does multiplexing on a time slot basis, whereas the OADM effects multiplexing on a wavelength basis. The present invention, however, may also be applied to this type of node (OADM), because the invention does not require paths to be time-division-multiplexed.

Furthermore, while in the above embodiments, the present invention has been applied to a 4-fiber ring system, it may be applied to a 2-fiber ring system.

In addition, although in the sixth and fifteenth embodiments, the setting has been done, taking traffic (path) into account, the same setting may be done in the other embodiments.

This invention may be practiced or embodied in still other ways without departing from what has been described in this specification.

Additional advantages and embodiments will readily occur to those skilled in the art. Therefore, the invention in its broader aspects is not limited to the specific details and representative embodiments shown and described herein. Accordingly, various embodiments may be made without departing from the spirit or scope of the general inventive concept as defined by the appended claims and their equivalents.

What is claimed is:

1. A data transmission system including a resource holding main traffic, and a resource holding sub-traffic different from said main traffic, said data transmission system comprising:

a self-healing function of, when a failure related to said main traffic has occurred, detouring said main traffic to the resource of said sub-traffic to salvage said main traffic;

a means for suppressing said self-healing function for a specific unit defined in the system;

a service line transmitting said main traffic, a protection line which is capable of transmitting sub-traffic different from said main traffic, self-healing function control means for, when a failure related to said main traffic has occurred, carrying out a switching process which switches the transmission path of said main traffic to said protection line to detour said main traffic to said protection line; and switching inhibit control means, when a segment sandwiched between adjacent pieces of node equipment is specified arbitrarily, inhibiting the main traffic set in the transmission path including the specified segment of said service line from being detoured to said protection line by said switching process at said self-healing function control means.

2. The data transmission system according to claim 1, wherein said switching inhibit control means inhibits the main traffic in said service line from detouring to said protection line in said specified segment.

3. A data transmission system including a resource holding main traffic, and a resource holding sub-traffic different from said main traffic, said data transmission system comprising:

a self-healing function of, when a failure related to said main traffic has occurred, detouring said main traffic to the resource of said sub-traffic to salvage said main traffic;

a means for suppressing said self-healing function for a specific unit defined in the system;

a service line transmitting said main traffic, a protection line which is capable of transmitting sub-traffic different from said main traffic, self-healing function control means for, when a failure related to said main traffic has occurred, carrying out a switching process which switches the transmission path of said main traffic to said protection line to detour said main traffic to said protection line; and switching inhibit control means, when a transmission path set in said service line is specified arbitrarily, inhibiting the main traffic set in the transmission path from being detoured to said protection line by said switching process at said self-healing function control means.

4. The data transmission system according to claim 3, wherein said switching inhibit control means inhibits the main traffic in said service line from detouring to the resource on said protection line side corresponding to said specified transmission path.

5. The data transmission system according to claim 4, wherein,
when there is a transmission path for said sub-traffic in said protection line and the transmission path for said sub-traffic includes a resource on said protection line side corresponding to said specified transmission path,
said switching inhibit control means inhibits the main traffic in said service line from detouring to all of the resources in which the transmission path for said sub-traffic has been set.

6. A data transmission system including a resource holding main traffic, and a resource holding sub-traffic different from said main traffic, said data transmission system comprising:
a self-healing function of, when a failure related to said main traffic has occurred, detouring said main traffic to the resource of said sub-traffic to salvage said main traffic;
a means for suppressing said self-healing function for a specific unit defined in the system;
a service line transmitting said main traffic,
a protection line which is capable of transmitting sub-traffic different from said main traffic,
self-healing function control means for, when a failure related to said main traffic has occurred, carrying out a switching process which switches the transmission path of said main traffic to said protection line to detour said main traffic to said protection line; and
switching inhibit control means, when a resource serving as a unit of multiplexing in said service line is specified arbitrarily, inhibiting the main traffic set in the transmission path including the resource from being detoured to said protection line by said switching process at said self-healing function control means.

7. The data transmission system according to claim 6, wherein said switching inhibit control means inhibits the main traffic in said service line from detouring to a resource on said protection line side corresponding to said specified resource serving as a unit of multiplexing.

8. A data transmission system including a resource holding main traffic, and a resource holding sub-traffic different from said main traffic, said data transmission system comprising:
a self-healing function of, when a failure related to said main traffic has occurred, detouring said main traffic to the resource of said sub-traffic to salvage said main traffic;
a means for suppressing said self-healing function for a specific unit defined in the system;
a service line transmitting said main traffic,
a protection line which is capable of transmitting sub-traffic different from said main traffic,
self-healing function control means for, when a failure related to said main traffic has occurred, carrying out a switching process which switches the transmission path of said main traffic to said protection line to detour said main traffic to said protection line; and switching inhibit control means, when a resource serving as the smallest unit in setting a transmission path in said service line is specified arbitrarily, inhibiting the main traffic set in the transmission path including the resource from being detoured to said protection line by said switching process at said self healing function control means.

9. The data transmission system according to claim 8, wherein said switching inhibit control means inhibits the main traffic in said service line from detouring to the resource on said protection line side corresponding to said specified resource serving as the smallest unit in setting a transmission path.

10. The data transmission system according to any one of claim 1 to claim 9, further comprising means for creating a transmission path with an attribute of inhibiting the main traffic from being detoured to said protection line by said switching process at said self-healing function control means.

11. The data transmission system according to any one of claim 1 to claim 9, further comprising means for, when there is a transmission path in which the main traffic is inhibited from being detoured to said protection line by said switching process at said self-healing function control means, canceling the inhibition of the main traffic from detouring to the transmission path.

12. The data transmission system according to any one of claim 1 to claim 9, wherein,
when said service line and protection line are both multiplex lines and transmission paths concatenated over a plurality of adjacent multiplexing units include said specified object,
said switching inhibit control means inhibits the main traffic set in the concatenated transmission paths from being detoured to said protection line by said switching process at said self-healing function control means.

13. A data transmission system including a resource holding main traffic, and a resource holding sub-traffic different from said main traffic, said data transmission system comprising:
a self-healing function of, when a failure related to said main traffic has occurred, detouring said main traffic to the resource of said sub-traffic to salvage said main traffic;
a means for suppressing said self-healing function for a specific unit defined in the system;
a service line transmitting said main traffic,
a protection line which is capable of transmitting sub-traffic different from said main traffic,
self-healing function control means for, when a failure related to said main traffic has occurred, carrying out a switching process which switches the transmission path of said main traffic to said protection line to detour said main traffic to said protection line; and
switching inhibit control means for, when a resource in the system is specified arbitrarily, inhibiting the main traffic set in the resource from being detoured to said protection line by said switching process at said self-healing function control means, regardless of the presence or absence of a transmission path in the resource.

14. The data transmission system according to claim 13, wherein said switching inhibit control means inhibits the main traffic in said service line from detouring to said protection line of said specified resource.

15. A network management equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said network management equipment comprising:

means for suppressing said self-healing function for a specific unit defined in the data transmission system;

specifying means for specifying arbitrarily a segment sandwiched between adjacent pieces of node equipment;

management information creating means for, when the specifying means has specified a segment, creating management information that the main traffic set in the transmission path including the specified segment of said service line is inhibited from being detoured to said protection line by said switching process at said self-healing function control means; and management information setting means for sending a set request message including said management information created at the management information creating means and setting said management information in each of said plurality of pieces of node equipment.

16. The network management equipment according to claim 15, wherein said management information creating means causes said management information to include information that the main traffic in said service line is inhibited from detouring to said protection line in said specified segment.

17. A network management equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said network management equipment comprising:

means for suppressing said self-healing function for a specific unit defined in the data transmission system;

specifying means for specifying arbitrarily a transmission path set in said service line;

management information creating means for, when the specifying means has specified a transmission path, creating management information that the main traffic set in the transmission path is inhibited from being detoured to said protection line by said switching process at said self-healing function control means; and management information setting means for sending a set request message including said management information created at the management information creating means and setting said management information in each of said plurality of pieces of node equipment.

18. The network management equipment according to claim 17, wherein said management information creating means causes said management information to include information that the main traffic in said service line is inhibited from being detoured to the resource on said protection line side corresponding to said specified transmission path.

19. The network management equipment according to claim 18, wherein, when a transmission path for said sub-traffic exists in said protection line and the transmission path for said sub-traffic includes the resource on the protection line side corresponding to said specified transmission path, said management information creating means causes said management information to include information that the main traffic in said service line is inhibited from detouring to all the resources in which the transmission path for said sub-traffic has been set.

20. A network management equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said network management equipment comprising:

means for suppressing said self-healing function for a specific unit defined in the data transmission system;

specifying means for specifying arbitrarily a resource serving as a unit of multiplexing in said service line;

management information creating means for, when the specifying means has specified a resource, creating management information that the main traffic set in the transmission path including the resource is inhibited from being detoured to said protection line by said switching process at said self-healing function control means; and management information setting means for sending a set request message including said management information created at the management information creating means and setting said management information in each of said plurality of pieces of node equipment.

21. The network management equipment according to claim 20, wherein said management information creating means causes said management information to include information that the main traffic in said service line is inhibited from detouring to the resource on said protection line side corresponding to said specified resource serving as a unit of multiplexing.

22. A network management equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said network management equipment comprising:

means for suppressing said self-healing function for a specific unit defined in the data transmission system;

specifying means for specifying arbitrarily a resource serving as the smallest unit in setting a transmission path in said service line;

management information creating means for, when the specifying means has specified a resource, creating management information that the main traffic set in the transmission path including the resource is inhibited from being detoured to said protection line by said switching process at said self-healing function control means; and management information setting means for sending a set request message including said management information created at the management information creating means and setting said management information in each of said plurality of pieces of node equipment.

23. The network management equipment according to claim 22, wherein said management information creating means causes said management information to include information that the main traffic in said service line is inhibited from detouring to the resource on said protection line side corresponding to said specified resource serving as the smallest unit in setting a transmission path.

24. The network management equipment according to any one of claim 15 to claim 23, further comprising path creating means for creating a transmission path with an attribute of inhibiting the main traffic from being detoured to said protection line by said switching process at said self-healing function control means.

25. The network management equipment according to any one of claim 15 to claim 23, further comprising canceling means for, when there is a transmission path in which the main traffic is inhibited from being detoured to said protection line by said switching process at said self-healing function control means, canceling the inhibition of the main traffic from detouring to the transmission path.

26. The network management equipment according to any one of claim 15 to claim 23, wherein, when said service line and protection line are both multiplex lines and transmission paths concatenated over a plurality of adjacent multiplexing units include said specified object, said management information creating means causes said management information to include information that the main traffic set in the concatenated transmission paths is inhibited from being detoured to said protection line by said switching process at said self-healing function control means.

27. The network management equipment according to any one of claim 15 to claim 23, further comprising matching means for matching the management information set in each of said plurality of pieces of node equipment by said management information setting means among the pieces of node equipment under the control of at least the present network management equipment.

28. The network management equipment according to claim 24, wherein said path creating means creates in said protection line a transmission path with an attribute of inhibiting the main traffic from being detoured to its own transmission resource by said switching process at said self-healing function control means.

29. A network management equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said network management equipment comprising:

means for suppressing said self-healing function for a specific unit defined in the data transmission system;

specifying means for specifying a resource in the system arbitrarily;

management information creating means for, when the specifying means has specified a resource, inhibiting the main traffic set in the transmission path including the specified resource in said service line from being detoured to said protection line by said switching process at said self-healing function control means, regardless of the presence or absence of a transmission path in the resource; and management information setting means for sending a set request message including said management information created at the management information creating means and setting said management information in each of said plurality of pieces of node equipment.

30. The network management equipment according to claim 29, wherein said management information creating means causes said management information to include information that the main traffic in said service line is inhibited from detouring to said protection line of said specified resource.

31. A node equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said node equipment comprising:

means for suppressing said self-healing function for a specific unit defined in the data transmission system;

self-healing function control means for, when a failure related to said main traffic has occurred, carrying out a switching process which switches the transmission path of said main traffic to said protection line to detour said main traffic to said protection line;

set request accepting means for specifying a segment sandwiched between adjacent pieces of node equipment and, when receiving a set request message including management information that the main traffic set in the transmission path including the specified segment of said service line is inhibited from being detoured to said protection line by said switching process at said self-healing function control means, accepting the set request message, interpreting the management information included in the message, and creating management information to be set in the present piece of node equipment;

memory means for storing the management information created at the set request accepting means; and switching inhibit control means for partially inhibiting said switching process by said self-healing function control means on the basis of the management information stored in the memory means.

32. The node equipment according to claim 31, wherein said set request accepting means causes the management information to be set in said present piece of node equipment to include information that the main traffic in said service line is inhibited from detouring to said protection line in said specified segment.

33. A node equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said node equipment comprising:
- means for suppressing said self-healing function for a specific unit defined in the data transmission system;
- self-healing function control means for, when a failure related to said main traffic has occurred, carrying out a switching process which switches the transmission path of said main traffic to said protection line to detour said main traffic to said protection line;
- set request accepting means for specifying any one of the transmission paths set in said service line and, when receiving a set request message including management information that the main traffic set in the transmission path is inhibited from being detoured to said protection line by said switching process at said self-healing function control means, accepting the set request message, interpreting the management information included in the message, and creating management information to be set in the present piece of node equipment;
- memory means for storing the management information created at the set request accepting means; and
- switching inhibit control means for partially inhibiting said switching process by said self-healing function control means on the basis of the management information stored in the memory means.

34. The node equipment according to claim 33, wherein said set request accepting means causes the management information to be set in said present piece of node equipment to include information that the main traffic in said service line is inhibited from detouring to the resource on said protection line side corresponding to said specified transmission path.

35. The node equipment according to claim 34, wherein, when a transmission path for said sub-traffic exists in said protection line and the transmission path for said sub-traffic includes the resource on the protection line side corresponding to said specified transmission path,
said set request accepting means causes said management information to be set in said present piece of node equipment to include information that the main traffic in said service line is inhibited from detouring to all the resources in which the transmission path for said sub-traffic has been set.

36. A node equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said node equipment comprising:
- means for suppressing said self-healing function for a specific unit defined in the data transmission system:
- self-healing function control means for, when a failure related to said main traffic has occurred, carrying out a switching process which switches the transmission path of said main traffic to said protection line to detour said main traffic to said protection line;
- set request accepting means for specifying any one of the resources serving as a unit of multiplexing in said service line and, when receiving a set request message including management information that the main traffic set in the transmission path including the resource is inhibited from being detoured to said protection line by said switching process at said self-healing function control means, accepting the set request message, interpreting the management information included in the message, and creating management information to be set in the present piece of node equipment;
- memory means for storing the management information created at the set request accepting means; and
- switching inhibit control means for partially inhibiting said switching process by said self-healing function control means on the basis of the management information stored in the memory means.

37. The node equipment according to claim 36, wherein said set request accepting means causes the management information to be set in said present piece of node equipment to include information that the main traffic in said service line is inhibited from detouring to the resource on said protection line side corresponding to said specified resource serving as a unit of multiplexing.

38. A node equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said node equipment comprising:
- means for suppressing said self-healing function for a specific unit defined in the data transmission system;
- self-healing function control means for, when a failure related to said main traffic has occurred, carrying out a switching process which switches the transmission path of said main traffic to said protection line to detour said main traffic to said protection line;
- set request accepting means for specifying any one of the resources serving as the smallest unit in setting a transmission path in said service line and, when receiving a set request message including management information that the main traffic set in the transmission path including the resource is inhibited from being detoured to said protection line by said switching process at said self-healing function control means, accepting the set request message, interpreting the management information included in the message, and creating management information to be set in the present piece of node equipment;
- memory means for storing the management information created at the set request accepting means; and
- switching inhibit control means for partially inhibiting said switching process by said self-healing function control means on the basis of the management information stored in the memory means.

39. The node equipment according to claim 38, wherein said set request accepting means causes the management information to be set in said present piece of node equipment to include information that the main traffic in said service line is inhibited from detouring to the resource on said protection line side corresponding to said specified resource serving as the smallest unit in setting a transmission path.

40. A node equipment used in a data transmission system which connects a plurality of pieces of node equipment in a ring via a service line transmitting main traffic and a protection line capable of transmitting sub-traffic different from said main traffic and which includes self-healing function control means for, when a failure related to said main traffic has occurred, carrying out a switching process which switches the transmission path of said main traffic to said protection line to detour said main traffic to said protection line, said node equipment comprising:

said node equipment comprising:
means for suppressing said self-healing function for a specific unit defined in the data transmission system;
self-healing function control means for, when a failure related to said main traffic has occurred, carrying out a switching process which switches the transmission path of said main traffic to said protection line to detour said main traffic to said protection line;
set request accepting means for specifying a resource in said data transmission system and, when receiving a set request message including management information that the main traffic set in the transmission path including the specified resource is inhibited from being detoured to said protection line by said switching process at said self-healing function control means, accepting the set request message, interpreting the management information included in the message, and creating management information to be set in the present piece of node equipment;
memory means for storing the management information created at the set request accepting means; and
switching inhibit control means for partially inhibiting said switching process by said self-healing function control means on the basis of the management information stored in the memory means.

41. The node equipment according to claim 40, wherein that said set request accepting means causes the management information to be set in said present piece of node equipment to include information that the main traffic in said service line is inhibited from detouring to said protection line of said specified resource.

* * * * *

UNITED STATES PATENT AND TRADEMARK OFFICE
CERTIFICATE OF CORRECTION

PATENT NO.      : 7,123,582 B2
APPLICATION NO. : 09/992017
DATED           : October 17, 2006
INVENTOR(S)     : Tahara et al.

It is certified that error appears in the above-identified patent and that said Letters Patent is hereby corrected as shown below:

Claim 36, column 41, line 59, change "system:" to --system;--.

Signed and Sealed this

Ninth Day of January, 2007

JON W. DUDAS
*Director of the United States Patent and Trademark Office*